(12) United States Patent
Lablans

(10) Patent No.: US 12,140,855 B2
(45) Date of Patent: *Nov. 12, 2024

(54) CAMERA SYSTEM WITH A PLURALITY OF IMAGE SENSORS

(71) Applicant: Peter Lablans, Morris Township, NJ (US)

(72) Inventor: Peter Lablans, Morris Township, NJ (US)

(*) Notice: Subject to any disclaimer, the term of this patent is extended or adjusted under 35 U.S.C. 154(b) by 571 days.

This patent is subject to a terminal disclaimer.

(21) Appl. No.: 17/472,658

(22) Filed: Sep. 12, 2021

(65) Prior Publication Data

US 2021/0405518 A1 Dec. 30, 2021

Related U.S. Application Data

(63) Continuation-in-part of application No. 17/037,228, filed on Sep. 29, 2020, and a continuation-in-part of application No. 16/814,719, filed on Mar. 10, 2020, now Pat. No. 11,119,396, which is a continuation-in-part of application No. 16/508,031, (Continued)

(51) Int. Cl.
*G03B 35/00* (2021.01)
*H04M 1/72412* (2021.01)
*H04N 5/262* (2006.01)
*H04N 13/239* (2018.01)
*H04N 13/246* (2018.01)
*H04N 23/698* (2023.01)

(52) U.S. Cl.
CPC ........ *G03B 35/00* (2013.01); *H04M 1/72412* (2021.01); *H04N 5/2624* (2013.01); *H04N 13/239* (2018.05); *H04N 13/246* (2018.05); *H04N 23/698* (2023.01); *H04M 2250/16* (2013.01)

(58) Field of Classification Search
CPC .................................................. H04N 13/246
USPC .......................................................... 455/556
See application file for complete search history.

(56) References Cited

U.S. PATENT DOCUMENTS 4,782,402 A 11/1988 Kanamaru
4,866,430 A 9/1989 Chek
(Continued)

OTHER PUBLICATIONS

Szeliski, Richard "Image Alignment and Stitching: A Tutorial Preliminary Draft", Technical Report MSR-TR-2004-92, Microsoft on-line, (Sep. 27, 2004), 59 pp.
(Continued)

*Primary Examiner* — Amir Shahnami

(57) ABSTRACT

Active areas of image sensors are determined by one or more parameters defining a mergeline or memory addresses where image data is stored. Image data generated by active areas of different image sensors are combined to create a panoramic image. Image distortion is detected in image data generated by an active area of an image sensor. Distortion in image data is addressed by configured image processing instructions. A group of one or more processors is assigned to at least each image sensor. At least one set of instructions assures that image data generated by different image sensors creates a combined image of a video with a substantially seamless transition between areas. Curved image sensors limit distortion. Cameras are fixedly held in a calibrated body.

20 Claims, 18 Drawing Sheets

Related U.S. Application Data filed on Jul. 10, 2019, now Pat. No. 10,896,327, and a continuation-in-part of application No. 16/011,319, filed on Jun. 18, 2018, now Pat. No. 10,585,344, which is a continuation-in-part of application No. 15/836,815, filed on Dec. 8, 2017, now Pat. No. 10,331,024, said application No. 16/508,031 is a continuation-in-part of application No. 15/645,545, filed on Jul. 10, 2017, now Pat. No. 10,354,407, which is a continuation-in-part of application No. 14/147,569, filed on Jan. 5, 2014, now Pat. No. 9,736,368, which is a continuation-in-part of application No. 13/844,626, filed on Mar. 15, 2013, now Pat. No. 9,171,221, said application No. 15/836,815 is a continuation of application No. 12/983,168, filed on Dec. 31, 2010, now abandoned, said application No. 13/844,626 is a continuation-in-part of application No. 12/983,168, filed on Dec. 31, 2010, now abandoned, which is a continuation-in-part of application No. 12/634,058, filed on Dec. 9, 2009, now abandoned, said application No. 15/836,815 is a continuation-in-part of application No. 12/435,624, filed on May 5, 2009, now Pat. No. 8,164,655.

(60) Provisional application No. 61/322,875, filed on Apr. 11, 2010, provisional application No. 61/291,868, filed on Jan. 1, 2010, provisional application No. 61/106,768, filed on Oct. 20, 2008, provisional application No. 61/106,025, filed on Oct. 16, 2008, provisional application No. 61/089,727, filed on Aug. 18, 2008, provisional application No. 61/055,272, filed on May 22, 2008, provisional application No. 61/054,290, filed on May 19, 2008.

(56) References Cited

U.S. PATENT DOCUMENTS

| | | | |
|---|---|---|---|
| 5,257,324 A | 12/1993 | Bumgardner | |
| 5,343,243 A | 8/1994 | Maeda | |
| 5,568,192 A | 10/1996 | Hannah | |
| 5,633,946 A | 5/1997 | Lachinski et al. | |
| 5,646,679 A | 7/1997 | Yano et al. | |
| 5,680,649 A | 10/1997 | Akimoto et al. | |
| 5,949,483 A | 9/1999 | Fossum et al. | |
| 6,027,216 A | 2/2000 | Guyton et al. | |
| 6,043,310 A | 3/2000 | Liu et al. | |
| 6,178,144 B1 | 1/2001 | Huiber | |
| 6,282,320 B1 | 8/2001 | Hasegawa et al. | |
| 6,284,085 B1 | 9/2001 | Gwo | |
| 6,323,858 B1 | 11/2001 | Gilbert et al. | |
| 6,445,833 B1 | 9/2002 | Murata et al. | |
| 6,509,927 B1 | 1/2003 | Prater et al. | |
| 6,512,858 B2 | 1/2003 | Lyon et al. | |
| 6,574,417 B1 | 6/2003 | Lin et al. | |
| 6,625,305 B1 | 9/2003 | Keren | |
| 6,669,346 B2 | 12/2003 | Metcalf | |
| 6,696,198 B2 | 2/2004 | Okahisa et al. | |
| 6,727,941 B1 | 4/2004 | Coleman | |
| 6,771,810 B1 | 8/2004 | Zhang et al. | |
| 6,778,207 B1 | 8/2004 | Lee et al. | |
| 6,801,674 B1 | 10/2004 | Turney | |
| 6,813,100 B2 | 11/2004 | Yamaguchi et al. | |
| 6,885,374 B2 | 4/2005 | Doyle et al. | |
| 6,900,837 B2 | 5/2005 | Muramatsu et al. | |
| 6,961,055 B2 | 11/2005 | Doak et al. | |
| 6,972,796 B2 * | 12/2005 | Katta | H04N 7/181 348/E7.086 |
| 6,975,308 B1 | 12/2005 | Bitetto et al. | |
| 6,989,862 B2 | 1/2006 | Baharav et al. | |
| 6,992,733 B1 | 1/2006 | Klein | |
| 7,020,888 B2 | 3/2006 | Reynolds et al. | |
| 7,085,435 B2 | 8/2006 | Takiguchi et al. | |
| 7,085,484 B2 | 8/2006 | Hara | |
| 7,102,686 B1 | 9/2006 | Orimoto et al. | |
| 7,123,745 B1 | 10/2006 | Lee | |
| 7,126,897 B2 | 10/2006 | Takeuchi et al. | |
| 7,136,333 B2 | 11/2006 | Wong et al. | |
| 7,149,178 B2 | 12/2006 | Wong et al. | |
| 7,167,155 B1 | 1/2007 | Albert et al. | |
| 7,218,144 B2 | 5/2007 | Lablans | |
| 7,227,893 B1 | 6/2007 | Srinivasa et al. | |
| 7,259,792 B2 | 8/2007 | Terada | |
| 7,280,745 B2 | 10/2007 | Mollie et al. | |
| 7,301,497 B2 | 11/2007 | Roddy et al. | |
| 7,340,077 B2 | 3/2008 | Gokturk | |
| 7,345,934 B2 | 3/2008 | Guterman et al. | |
| 7,355,444 B2 | 4/2008 | Lablans | |
| 7,365,787 B2 | 4/2008 | Nobels | |
| 7,365,789 B2 | 4/2008 | Ogino | |
| 7,389,580 B2 | 6/2008 | Jenson et al. | |
| 7,397,690 B2 | 7/2008 | Lablans | |
| 7,418,275 B2 | 8/2008 | Mu | |
| 7,424,175 B2 | 9/2008 | Lipton et al. | |
| 7,616,248 B2 | 11/2009 | Parulski et al. | |
| 7,667,765 B2 | 2/2010 | Turley et al. | |
| 7,676,150 B2 | 3/2010 | Nakashima | |
| 7,688,306 B2 | 3/2010 | Wehrenberg et al. | |
| 7,741,734 B2 | 6/2010 | Joannopoulos et al. | |
| 7,835,736 B2 | 11/2010 | Larocca | |
| 7,869,117 B2 | 1/2011 | Choi et al. | |
| 7,911,493 B2 | 3/2011 | Sarma | |
| 8,180,410 B2 | 5/2012 | Kim | |
| 8,265,871 B1 | 9/2012 | Starns et al. | |
| 8,311,513 B1 | 11/2012 | Nasserbakht et al. | |
| 8,320,992 B2 | 11/2012 | Frenkel et al. | |
| 8,355,627 B2 | 1/2013 | Pace et al. | |
| 8,428,341 B2 | 4/2013 | Lee et al. | |
| 8,493,458 B2 | 7/2013 | Matsunage | |
| 9,229,526 B1 | 1/2016 | Neglur et al. | |
| 9,560,298 B2 | 1/2017 | Lewkow et al. | |
| 10,304,880 B2 | 5/2019 | Kim | |
| 2001/0015751 A1 | 8/2001 | Geng | |
| 2003/0030638 A1 | 2/2003 | Astrom et al. | |
| 2004/0252759 A1 * | 12/2004 | John Winder | H04N 19/87 375/E7.251 |
| 2004/0257436 A1 | 12/2004 | Koyanagi et al. | |
| 2005/0122400 A1 | 6/2005 | Kochi et al. | |
| 2006/0061951 A1 | 3/2006 | Hara | |
| 2006/0244831 A1 | 11/2006 | Kraft | |
| 2007/0010200 A1 | 1/2007 | Kaneko | |
| 2007/0031062 A1 | 2/2007 | Pal et al. | |
| 2007/0035516 A1 | 2/2007 | Voto et al. | |
| 2007/0120979 A1 | 5/2007 | Zhang et al. | |
| 2007/0165942 A1 | 7/2007 | Jin et al. | |
| 2007/0177033 A1 | 8/2007 | Bennett et al. | |
| 2007/0237423 A1 | 10/2007 | Tico et al. | |
| 2007/0247697 A1 | 10/2007 | Sohn et al. | |
| 2007/0248260 A1 | 10/2007 | Pockett | |
| 2008/0002023 A1 | 1/2008 | Cutler | |
| 2008/0024594 A1 | 1/2008 | Ritchey | |
| 2008/0024596 A1 | 1/2008 | Li et al. | |
| 2008/0024607 A1 | 1/2008 | Ozaki | |
| 2008/0024614 A1 | 1/2008 | Li et al. | |
| 2008/0106634 A1 | 5/2008 | Masuda | |
| 2008/0239170 A1 | 10/2008 | Klosowiak et al. | |
| 2009/0086015 A1 | 4/2009 | Larsen et al. | |
| 2009/0175323 A1 | 7/2009 | Chung | |
| 2009/0193021 A1 | 7/2009 | Gupta et al. | |
| 2009/0213219 A1 | 7/2009 | Eggert et al. | |
| 2009/0309177 A1 | 12/2009 | Jeung et al. | |
| 2009/0322860 A1 | 12/2009 | Zhang et al. | |
| 2009/0324117 A1 | 12/2009 | Demandolx | |
| 2010/0050779 A1 | 3/2010 | Pushparaj et al. | |
| 2010/0081452 A1 | 4/2010 | Guo et al. | |
| 2010/0111489 A1 | 5/2010 | Presler | |
| 2010/0128015 A1 | 5/2010 | Feenstra et al. | |
| 2010/0171708 A1 | 7/2010 | Chuang | |
| 2012/0105573 A1 | 5/2012 | Apostolopoulos | |
| 2012/0293633 A1 | 11/2012 | Yamato | |
| 2012/0314068 A1 | 12/2012 | Schultz | |

(56) References Cited

U.S. PATENT DOCUMENTS

| | | |
|---|---|---|
| 2012/0327189 A1 | 12/2012 | Muramatsu et al. |
| 2013/0010081 A1 | 1/2013 | Tenney et al. |
| 2013/0044042 A1 | 2/2013 | Olsson et al. |
| 2013/0058582 A1 | 3/2013 | Van Beek |
| 2013/0124471 A1 | 5/2013 | Chen et al. |
| 2019/0035718 A1 | 1/2019 | Sedon et al. |
| 2020/0074716 A1 | 3/2020 | Kaplan |

OTHER PUBLICATIONS

Zitova, Barbara et al., "Image Registration Methods: A Survey", Image and Vision Computing 21, (2003), 977-1000 pp.

PCT International Search Report and Written Opinion in PCT/US2009/043075, (Jul. 6, 2009), 12 pgs. (Previous).

PCT International Search Report & Written Opinion in PCT/US2009/043410, (Jul. 7, 2009), 12 pgs. (Previous).

Schein et al., "Optimization of Image Processing Algorithms: A Case Study", Article dated Sep. 23, 2009 published on website of Intel Corporation, Santa Clara, CA, http://software.intel.com/en-us/articles/optimization-of-image-processing-algorithms-a-cas . . . , 11 pgs.

Mingqin et al., "Real Time Image Rotation System", Proceedings of SPIE vol. 4553 (2001), Bellingham, WA., 5 pgs.

Paul S. Heckbert, "Fundamentals of Texture Mapping and Image Warping", Master Thesis, University of California, Berkeley, CA, Jun. 17, 1989, 94 pgs.

A.D. Jepson DJ Fleet, lecture notes "Segmentation" downloaded from http://www.cs.toronto.edu/~jepson/csc2503/segmentation.pdf, 2007.

Tuomo Rossi, lecture notes, 3D Geometry and Camera Calibration, University of Jyväskylä at http://users.jyu.fi/~tro/TIES411_08/camera.pdf, dated Apr. 11, 2004.

Ramani Duraiswami, Camera Calibration, University of Maryland, Oct. 5, 2000, downloaded from http://www.umiacs.umd.edu/~ramani/cmsc828d/lecture9.pdf.

"On the Direct Estimation of the Fundamental Matrix" by Yaser Sheikh et al. on Apr. 30, 2007 and copyrighted by Radical Eye Software in 2004 and available on-line at http://vision.eecs.ucf.edu/papers/742_submission.pdf.

MatchFeatures Matlab R2018a documentation downloaded from https://www.mathworks.com/help/vision/ref/matchfeatures.html.

Panorama Weaving: Fast and Flexible Seam Processing by Summa et al. published online on Jul. 13, 2012 at https://www-pequan.lip6.fr/~tierny/stuff/papers/summa_siggraph12.pdf.

In U.S. Appl. No. 12/634,058 Appeal Decision mailed on Dec. 4, 2017 in Appeal 2016-000011.

Wei Lyu et al. A Survey on Image and Video Stitching, Oct. 15, 2018, downloaded from https://www.researchgate.net/publication/330288127_A_survey_on_image_and_video_stitching.

Zaragoza et al. As-Projective-As-Possible Image Stitching with Moving DLT, 2013, downloaded from : https://openaccess.thecvf.com/content_cvpr_2013/papers/Zaragoza_As-Projective-As-Possible_Image_Stitching_2013_CVPR_paper.pdf.

Brown et al. Automatic Panoramic Image Stitching using Invariant Features, 2007, 2006, International Journal of Computer Vision 74(1), 59-73, 2007.

El-Saban et al. Fast Stitching of Videos Captured From Freely Moving Devices by Exploiting Temporal Redundancy 2010 downloaded from https://www.researchgate.net/publication/224200459_Fast_stitching_of_videos_captured_from_freely_moving_devices_by_exploiting_temporal_redundancy.

Zhi et al. "Realization of CUDA-based real-time registration and target localization for highresolution video images", May 4, 2016 in J Real-Time Image Proc. (2019) 16:1025-1036.

Pixel Visual Core—downloaded article from Wikipedia at or before submission of this application.

Photoshop manual Adobe® Photoshop® CC Help 2018 downloaded from https://helpx.adobe.com/pdf/photoshop_reference.pdf.

MathWorks Computer Vision Toolbox User's Guide downloaded from https://www.mathworks.com/help/pdf_doc/vision/vision_ug.pdf.

Wei Lyu et al. A survey on image and video stitching in Virtual Reality and Intelligent Hardware, vol. 1, Issue 1, Feb. 2019 pp. 55-83, downloaded from https://www.sciencedirect.com/science/article/pii/S2096579619300063.

Vincent Jordan, Hardware-accelerated video stitching on GPU, Oct. 29, 2020 downloaded from https://levelup.gitconnected.com/faster-video-stitching-with-opengl-9e9132c72def.

Weihang Zhang et al. ,Real-Time Image Stitching, CS205 Computing Foundations for Computational Science Final Project, Group 4: Harvard University, Spring 2018, published on https://cs205-stitching.github.io/.

By Guenter et al., Highly curved image sensors: a practical approach for improved optical performance, 2017, and downloaded from oe-25-12-13010.pdf (osapublishing.org).

I-Micronews article entitled: SIlina, a deep tech startup . . . —An interview by Yole Developpment dated Apr. 22, 2021 downloaded from https://www.i micronews.com/silina-a-deep-tech-startup-to-curve-cmos-image-sensors-at-industrial scale-an-interview-by-yole-developpement/?cn-reloaded=1.

Gaddam et al. , Chapter 20, Camera Synchronization for Panoramic Videos, Springer International Publishing AG, part of Springer Nature 2018 M. Montagud et al. (eds.), MediaSync, https://doi.org/10.1007/978-3-319-65840-7_20, as part of the Bagadus video training system, 2018.

Wei Xu, Panoramic Video Stitching, Ph. D. Thesis, University of Colorado, 2012, from https://scholar.colorado.edu/concern/graduate_thesis_or_dissertations/02870w10j.

Hua Minh Duc, website HomographyLab library available on https://www.i3s.unice.fr/hua/node/6 downloaded on Sep. 1, 2021.

Xilinx® LogiCORE™ IP Video Warp Processor as explained in Video Warp Processor, LogiCORE IP Product Guide PG396 (v1.0) Jul. 15, 2021.

M. Lee et al.: Correction of Barrel Distortion in Fisheye Lens Images Using Image-Based Estimation, IEEE Access, vol. 7, 2019.

Shen et al., Multi-camera Panoramic Stitching with Real-time Chromatic Aberration Correction, 2020 J. Phys.: Conf. Ser. 1617 012046.

Rik Littlefield, Theory of the "No-Parallax" Point in Panorama Photography, version 1.0, Feb. 6, 2006 downloaded from the WWW.

Du et al., GPU based Parallel Optimization for Real Time Panoramic Video Stitching, 2018, downloaded from https://arxiv.org/abs/1810.03988.

* cited by examiner

CAMERA SYSTEM WITH A PLURALITY OF IMAGE SENSORS

STATEMENT OF RELATED CASES

This application claims the benefit and is a continuation-in-part of U.S. Non-provisional patent application Ser. No. 16/814,719 filed on Mar. 10, 2020. Application Ser. No. 16/814,719 claims the benefit and is a continuation-in-part of U.S. Non-provisional patent application Ser. No. 16/011,319 filed on Jun. 30, 2018. Application Ser. No. 16/011,319 claims the benefit and is a continuation-in-part of U.S. Non-provisional patent application Ser. No. 15/836,815 filed on Dec. 8, 2017. Patent application Ser. No. 15/836,815 is a continuation and claims the benefit of U.S. Non-provisional patent application Ser. No. 12/983,168 filed on Dec. 31, 2010. Patent application Ser. No. 12/983,168 claims the benefit of U.S. Provisional Patent Application Ser. No. 61/365,347, filed Jul. 18, 2010, and of U.S. Provisional Patent Application Ser. No. 61/322,875, filed Apr. 11, 2010 and of U.S. Provisional Patent Application Ser. No. 61/291,861, filed Jan. 1, 2010. Patent application Ser. No. 15/836,815 claims the benefit and is a continuation-in-part of U.S. Non-provisional patent application Ser. No. 12/435,624 filed on May 5, 2009. Non-provisional patent application Ser. No. 12/435,624 claims the benefit of U.S. Provisional Patent Application Ser. No. 61/106,768, filed Oct. 20, 2008, and of U.S. Provisional Patent Application Ser. No. 61/106,025, filed Oct. 16, 2008 and of U.S. Provisional Patent Application Ser. No. 61/089,727, filed Aug. 18, 2008 and of U.S. Provisional Patent Application Ser. No. 61/055,272 filed May 22, 2008 and of U.S. Provisional Patent Application Ser. No. 61/054,290, filed May 19, 2008. This application claims the benefit and is a continuation-in-part of U.S. Non-provisional patent application Ser. No. 17/037,228 filed on Sep. 29, 2020. All the above patent applications are incorporated herein by reference.

BACKGROUND OF THE INVENTION

Digital cameras, including those in smartphones are used to record photos and videos of scenes. Videos are often posted on social media. Videos, especially recorded by smartphones, are hampered by a limited angle-of-view of cameras. This leads to images that are limited in view, often cut on the sides and are unable to adequately fill a display. Images of scenes may lose context of the environment wherein a scene takes place. Current solutions require swipe movements of a camera or time consuming digital processing of image data obtained from multiple image sensors to create a panoramic image. This limits the ability to watch and/or review of panoramic images in real-time. Available image processing tools may combine two or more images from a scene into a single, combined, hopefully seamless panoramic image. This process of combining is called registering, stitching or mosaicing. However, stitching on images is commonly time consuming and is difficult to do in real-time.

Accordingly, novel and improved methods and apparatus are required for creating, recording, storing and playing of panoramic and generally registered images.

SUMMARY OF THE INVENTION

One aspect of the present invention presents novel methods and systems for recording, processing storing and concurrent displaying of a plurality of images which may be video programs into a panoramic image.

In accordance with an aspect of the present invention a camera system is provided, comprising: a plurality of cameras fixed in a single body, each of the plurality of cameras including a lens and an image sensor; the image sensors of the plurality of cameras being rotationally aligned in the single body with a rotational misalignment angle that is smaller than a pre-set rotational misalignment angle; a controller to read image data from image sensor elements in an active area of each of the image sensors of the plurality of cameras, the active area of an image sensor in a camera in the plurality of cameras being smaller than a total area of image sensor elements of the image sensor in the camera in the plurality of cameras; a memory to store raw image data generated by the image sensors of the plurality of cameras and only read from the active areas of the image sensors of the plurality of cameras as a substantially registered raw image prior to demosaicing; and a screen to display a panoramic video image based on the registered raw image stored in the memory.

In accordance with a further aspect of the present invention a camera system is provided, wherein the substantially registered raw image has an alignment error of less than 10 pixels.

In accordance with yet another aspect of the present invention a camera is provided, wherein the camera is part of a mobile phone or a computer tablet.

DESCRIPTION OF A PREFERRED EMBODIMENT

In an embodiment of the present invention, a camera is a digital camera with at least 2 lenses and each lens being associated with an image sensor, which may for instance be a CCD image sensor. It may also be a CMOS image sensor, or any other image sensor that can record and provide a digital image. An image sensor has individual pixel element sensors, usually arranged in a rectangular array, which generate electrical signals. The electrical signals can form an image. The image can be stored in a memory. An image stored in a memory has individual pixels, which may be processed by an image processor. An image recorded by a digital camera may be displayed on a display in the camera body. An image may also be provided as a signal to the external world, for further processing, storage or display. An image may be a single still image. An image may also be a series of images or frames, forming a video image when encoded and later decoded and displayed in appropriate form.

Herein a distinction is made between an image, which is image data displayed on a screen or on photographic paper or on film and an image sensor, which is a physical device that is enabled to generate image data based on received radiation. While an image and an image sensor are related, they are distinctively different. An image sensor commonly generates ephemeral image data due to conversion of radiation to electrical signals. The image data has to be stored and processed (such as demosaicing) and then converted to screen data to create an image. An image sensor has properties that are different from images, as one of ordinary skill knows.

Figure 1:
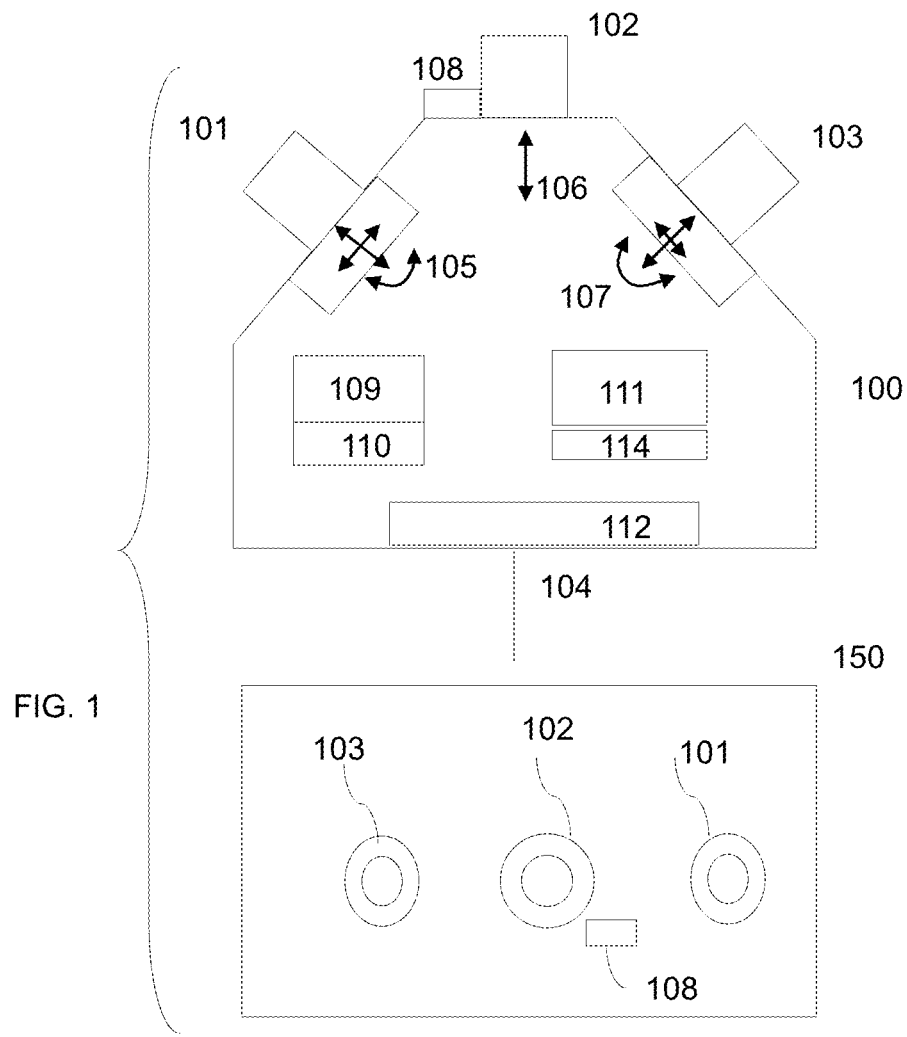
FIG. 1 is a diagram of a camera for panoramic images in accordance with an aspect of the present invention.

In one embodiment, to create a panoramic image a camera has at least two lenses, each lens being associated with an image sensor. This is shown in FIG. 1 in view 100 and 150. As an illustrative example a camera 100 has three lenses 101, 102 and 103. Each lens is associated with an image sensor. Accordingly, 101, 102 and 103 may also be interpreted as a sensor unit, which is an embodiment having a lens and an image sensor, the image sensor being able to provide image data or image signals to an image processor 111, which may store image data, which may have been processed, in a memory 114. The image generated by 111 may be displayed on a display 112. The image may also be provided on a camera output 104. In a further embodiment, image data as generated through a lens by a sensor may be stored in an individual memory, to be processed in a later stage.

The panoramic digital camera of FIG. 1 has, as an illustrative example, one central sensor unit with lens 102. Associated with this sensor unit is an autofocus sensor system 108. Autofocus systems for cameras are well known. The autofocus sensor system 108 senses the distance to an object that is recorded by sensor unit 102. It provides a signal to a motor or mechanism 106 that puts the lens of 102 in the correct focus position for the measured distance. In accordance with an aspect of the present invention, data that represents a position of the lens of 102 is stored in memory 110 and is associated with a signal or data generated by a measurement conducted by autofocus unit 108.

FIG. 1 provides two diagram views of the illustrative embodiment of a panoramic camera. View 100 is a top view. View 150 is a front view. It is to be understood that FIG. 1 only provides an illustrative example. Other configurations, with different orientation of lenses, different number of lenses, different autofocus units (for instance "through the lens"), different aspect ratios of the camera bodies, different viewer options in addition or in place of a display, control buttons, external connectors, covers, positioning of displays, shape of the body, a multi-part body wherein one part has the display and another part has the lenses, etc are all contemplated.

The autofocus system including sensor and mechanism may also include a driver or controller. Such drivers and controllers are known and may be assumed to be present, even if they are not mentioned. Autofocus may be one aspect of a lens/sensor setting. Other aspects may include settings of diaphragm and/or shutter speed based on light conditions and on required depth of field. Sensors, mechanisms and controllers and or drivers for such mechanisms are known and are assumed herein, even if not specifically mentioned.

A panoramic camera may be a self-contained and portable apparatus, with as its main or even only function to create and display panoramic images. The panoramic camera may also be part of another device, such as a mobile computing device, a mobile phone, a smartphone, a tablet, a PDA, a camera phone, or any other device that accommodates a panoramic camera.

Sensor units, motors, controller, memories and image processor as disclosed herein are required to be connected in a proper way. For instance, a communication bus may run between all components, with each component having the appropriate hardware to have an interface to a bus. Direct connections are also possible. Connecting components such as a controller to one or more actuators and memories is known. Connections are not drawn in the diagrams to limit complexity of the diagrams. However, all proper connections are contemplated and should be assumed. Certainly, when herein a connection is mentioned or one component being affected directly by another component is pointed out then such a connection is assumed to exist.

In order to generate a panoramic image in this illustrative example, three sensor units are used, each unit having a lens and each lens having a motor to put the lens in the correct focus position. The lens of image sensing unit 101 has a motor 105 and image sensor unit 103 has a motor 107. The motors may be piezoelectric motors, also called piezo motors. The field of view of the lens of unit 101 has an overlap with the field of view with the lens of unit 102. The field-of-view of the lens of unit 103 has an overlap with the field of view of the lens of unit 102. At least for the focus area wherein the field of view of lenses of 101, 102 and 103 have an overlap, the image processor 111 may register the three images and stitch or combine the registered images to one panoramic image.

The motors 105 and 107 may have limited degree of freedom, for instance, only movement to focus a lens. It may also include a zoom mechanism for a lens. It may also provide a lens to move along the body of the camera. It may also allow a lens to be rotated relative to the center lens.

Image registration or stitching or mosaicing, creating an integrated image or almost perfectly integrated image from two or more images is known. Image registration may include several steps including:

a. finding a region of overlap between two images which may include identifying corresponding landmarks in two images;
b. aligning two images in an optimally matching position;
c. transformation of pixels of at least one image to align corresponding pixels in two images; and
d. a blending or smoothing operation between two images that removes or diminishes between two aligned images a transition edge created by intensity differences of pixels in a connecting transition area. A region of intensity change is in a range of 50 pixels or less, preferably 10 pixels or less around a mergeline.

The above steps for registering images are known and are for instance provided in Zitova, Barbara and Flusser, January: "Image registration methods: a survey" in Image and Vision Computing 21 (2003) pages 977-1000, which is incorporated herein by reference in its entirety. Another overview of registering techniques is provided in Image Alignment and Stitching: A Tutorial, by Richard Szeliski, Technical Report MSR-TR-2004-92, Microsoft, 2004, available on-line which is incorporated herein by reference. Szeliski describes in detail some blending operations. A more recent survey of image and video stitching is in Wei LYU et al. A survey on image and video stitching in Virtual Reality and Intelligent Hardware, Vol. 1, Issue 1, February 2019 pages 55-83, downloaded from https://www.sciencedirect.com/science/article/pii/S2096579619300063 which is incorporated herein by reference.

A processor, which may be a dedicated image processor, may be enabled to perform several tasks related to creating a panoramic image. It may be enabled to find the exact points of overlap of images. It may be enabled to stitch images. It may be enabled to adjust the seam between two stitched images by for instance interpolation. It may also be able to adjust intensity of pixels in different images to make stitched images having a seamless transition.

It is possible that the three image lens/sensor units are not optimally positioned in relation to each other. For instance, the units may be shifted in a horizontal plane (pitch) in vertical direction. The sensor units may also be rotated (roll) related to each other. The sensor units may also show a horizontal shift (yaw) at different focus settings of the lenses. The image processor may be enabled to adjust images for these distortions and correct them to create one optimized panoramic image at a certain focus setting of the lens of unit 102.

At a certain nearby focus setting of the lenses it may no longer be possible to create a panoramic image of acceptable quality. For instance, parallax effects due to spacing of the lens units may be a cause. Also, the multiplier effect of lens and sensor systems (sizes) in digital cameras may limit the overlap in a sensor unit configuration as shown in FIG. 1. However, the configuration as shown in FIG. 1 is still able to create quality panoramic images in a digital camera, for instance in a camera phone. In a further embodiment of the present invention, the focus settings of the lenses of unit 101 and 103 by motors 105 and 107 are coordinated with the focus setting of the lens of unit 102 by motor 106 controlled by autofocus unit 108 by the controller 109.

In a further embodiment, motors or mechanisms moving the actual position of units 101 and 103 in relation to 103 may be used to achieve for instance a maximum usable sensor area of aligned sensors. These motors may be used to minimize image overlap if too much image overlap exists, or to create a minimum overlap of images if not enough overlap exists, or to create overlap in the right and/or desirable areas of the images generated by the sensors. All motor positions may be related to a reference lens position and focus and/or zoom factor setting of the reference lens. Motor or mechanism positions may be established and recorded in a memory in the camera during one or more calibration steps. A controller may drive motors or mechanism in a desired position based on data retrieved from the memory.

System Calibration

A coordination of sensor/lens units may be achieved in a calibration step. For instance, at one distance to an object the autofocus unit provides a signal and/or data that creates a first focus setting by motor 106 of the lens of 102, for instance, by using controller 109. This focus setting is stored in a memory 110. One may next focus the lens of unit 101 on the scene that contains the object on which the lens of 102 is now focused. One then determines the setting or instructions to motor 105 that will put the lens of unit 101 in the correct focus. Instructions related to this setting are associated with the setting of the lens of 102 and are stored in the memory 110. The same step is applied to the focus setting of the lens of unit 103 and the motor 107. Thus, when the sensor unit 108 creates a focus of the lens of 102, settings related to the lenses of 101 and 103 are retrieved from memory by a controller 111 from memory 110. The controller 111 then instructs the motors 105 and 107 to put the lenses of units 101 and 103 in the correct focus setting corresponding to a focus setting of the lens of unit 101, in order for the image processor 111 to create an optimal panoramic image from data provided by the image sensor units 101, 102 and 103.

One then applies the above steps for other object distances, thus creating a range of stored settings that coordinates the settings of the lenses of multiple sensor units. One may have a discrete number of distance settings stored in memory 110. One may provide an interpolation program that allows controller 109 to determine intermediate settings from settings that are stored in memory 110.

One may store positions and settings as actual positions or as positions to a reference setting. One may also code a setting into a code which may be stored and retrieved and which can be decoded using for instance a reference table. One may also establish a relationship between a setting of a reference lens and the setting of a related lens and have a processor determine that setting based on the setting of the reference lens.

In a further embodiment, one may combine focus setting with aperture settings and/or shutter speed for different hyperfocal distance settings. One may have different hyperfocal settings which may be selected by a user. If such a setting is selected for one lens, the controller 111 may apply these settings automatically to the other lenses by using settings or instructions retrieved from memory 110. A camera may automatically use the best hyperfocal setting, based on measured light intensity.

In general, camera users may prefer a point-and-click camera. This means that a user would like to apply as few manual settings as possible to create a picture or a video. The above configuration allows a user to point a lens at an object or scene and have a camera controller automatically configure lens settings for panoramic image creation.

In general, image processing may be processor intensive. This may be of somewhat less importance for creating still images. Creation of panoramic video that can be viewed almost at the same time that images are recorded requires real-time image processing. With less powerful processors it is not recommended to have software find for instance stitching areas, amount of yaw, pitch and roll, register images and so on. It would be helpful that the controller already knows what to do on what data, rather than having to search for it.

In a further embodiment of the present invention, instructions are provided by the controller 109 to image processor 111, based on settings of a lens, for instance on the setting of the center lens. These settings may be established during one or more calibration steps. For instance, during a calibration step in applying a specific distance one may apply predefined scenes, which may contain preset lines and marks.

Different configurations of a multi-lens/multi-sensor camera and manufacturing processes for such a multi-lens/multi-sensor camera are possible. One configuration may have motors to change lateral position and/or rotational position of a sensor/lens unit in relation to the body of the camera. This may lead to a camera with a broader range of creating possible panoramic images. It may also alleviate required processing power for an image processor. The use of such motors may also make the tolerances less restrictive of positioning sensor/lens units with regard to each other. This may make the manufacturing process of a camera cheaper, though it may require more expensive components, including motors or moving mechanisms.

In a further embodiment, one may position the sensor/lens units in exactly a preferred fixed position of each other, so that no adjustments are required. Such a construction may put severe requirements on the accuracy of manufacturing, thus making it relatively expensive.

In yet a further embodiment, one may allow some variation in rotation and translation in positioning the sensor/lens units, thus making the manufacturing process less restrictive and potentially cheaper. Any variation of positioning of sensors may be adjusted by the image processors, which may be assisted by calibration steps. In general, over time, signal processing by a processor may be cheaper than applying additional components such as motors, as cost of processing continues to go down.

Figure 2:
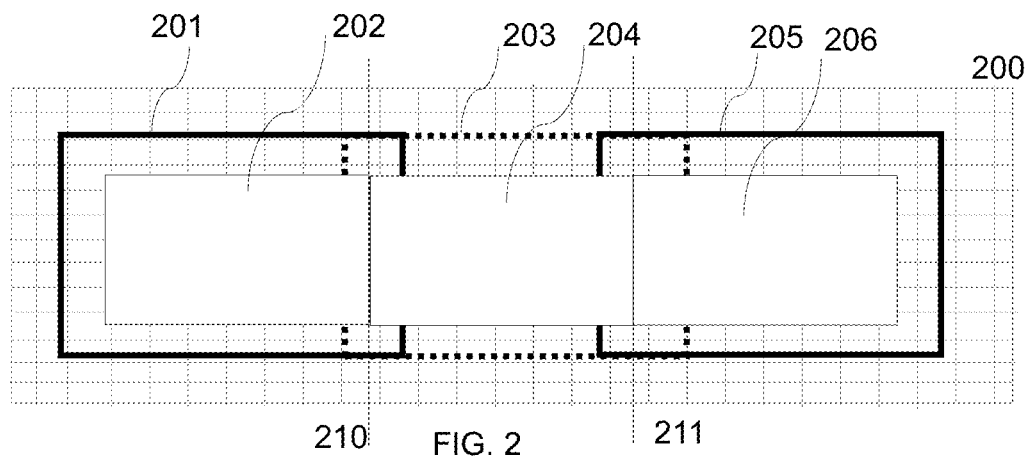
FIGS. 2, 3 and 4 illustrate a panoramic image created in accordance with an aspect of the present invention.
Figure 3:
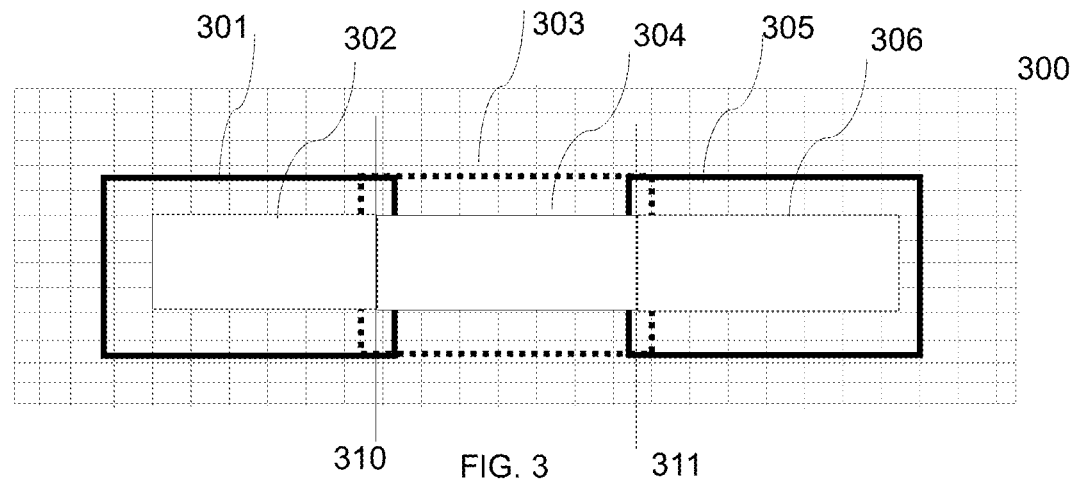

A first calibration step for a first illustrative embodiment of a set of 3 sensor units is described next. Herein, a set of three sensor/lens units is considered to be one unit. It is manufactured in such a way that three lenses and their sensors are aligned. The image created by each sensor has sufficient overlap so that at a maximum object distance and a defined minimum object distance a panoramic image can be created. A diagram is shown in FIGS. 2 and 3. In FIG. 2 a scene 200 provides a plurality of calibration points. One may relate images generated by the camera of FIG. 1 to images shown in FIGS. 2, 3 and 4. The image recorded by sensor/lens 102 in FIG. 1 is shown as window 203 in FIG. 2. This image will be used as the reference window in the examples. Other references are also possible. As one views an image in mirror in relation to the sensor/lens unit, the window 205 is related to sensor/lens 101. The window 201 is related to sensor/lens 103.

The sensor/lens units are aligned so that aligned and overlapping windows are created. In FIG. 2 the windows and thus the sensors have no rotation and/or translation in reference to each other. At a first calibration test it is determined that sensor areas 202, 204 and 206 will create an optimal panoramic image at that distance. The setting being associated with a focus setting of the center sensor/lens unit 102, and with this setting being associated focus settings of lenses of 101 and 103 corresponding to the setting of 102, relevant settings being stored in a memory 110 that can be accessed by a controller 109. It may be that at this setting lens distortion is avoided or minimized by selecting image windows 202, 204 and 206 of the sensor area. One may determine the coordinates of each image area in a sensor and store these coordinates for instance also in memory 110. When the present focus setting is applied the image processor 111 is instructed by the controller 109 to only process the image within retrieved coordinates of the image sensor which are associated with the setting in memory 110. One may provide a certain margin to allow the image processor to determine an optimal overlap with a very narrow margin. This limits the load on the processor and allows the image processor, based on predetermined settings to quickly create a stitched panoramic image.

When windows 201, 203 and 205 related to the image sensors are aligned it may suffice to establish a merge line 210 and 211 between the windows. In that case, one may instruct a processor to apply the image data of window/sensor 201 left of the merge line 210, use the image data of window/sensor 203 between merge lines 210 and 211 and the image data of window/sensor 205 to the right of merge line 211. One may save merge lines that are established during calibration as a setting. One may process the data in different ways to establish a panoramic image. One may save the complete images and process these later according to established merge lines. One may also only save the image data in accordance with the merge lines. One may for instance, save the data in accordance with the merge line in a memory, so that one can read the data as a registered image.

It is noted that one may provide the images for display on an external device, or for viewing on a display that is part of the camera. Image sensors may have over 2 Megapixels. That means that a registered image may have well over 5 Megapixels. Displays in a camera are fairly small and may be able to handle much smaller number of pixels. In accordance with a further aspect of the present invention, the recorded images are downsampled for display on a display in a camera.

One may repeat the above calibration steps at a different distance. It may be that certain effects influence distortion and overlap. This is shown in FIG. 3 as sensor windows 301, 303 and 305. Again sensor 102 of FIG. 1 may be the reference sensor. The effective overlap sensor areas for creating a panoramic image at the second distance may be sensor areas 302, 304 and 306 which may be different from sensor areas in FIG. 2. The coordinates of these sensor areas are again stored in a memory for instance 110 that is, for instance, accessible by the controller related to a focus setting. The area parameters in operation may be retrieved from 110 by controller 109 as being associated with a focus setting and provided by the controller 109 to the image processor 111 for creating a panoramic image from the sensor data based on the defined individual images related to a focus setting. Instead of saving a sensor area, one may also determine again a merge line that determines what the active area of a sensor should be. As an example, merge lines 310 and 311 are provided. It is noted that the merge lines are drawn as straight lines perpendicular to the base of a rectangular window. However, such a limitation is not required. First of all, a sensor does not need to be rectangular, and the active window of a sensor is also not required to be rectangular. Furthermore, a merge line may have any orientation and any curved shape.

One may repeat the steps for different distances and also for different lighting and image depth conditions and record focus setting and aperture setting and shutter setting and related sensor area parameters and/or merge lines in a memory. Such a system allows a camera to provide point-and-click capabilities for generating panoramic images from 2 or more individual images using a camera with at least two sensor/lens units.

Figure 4:
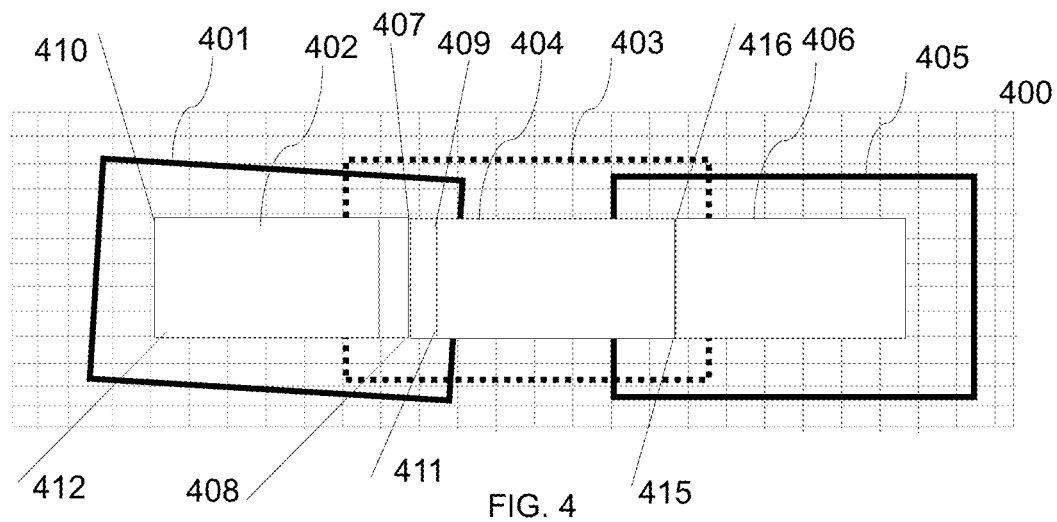

In a further embodiment, one may be less accurate with the relative position of sensor/lens units in relation to the central unit. For instance, a sensor/lens 101 may have a vertical shift of translation to a reference unit 102 as is shown in FIG. 4. Herein, window 405 has a lateral shift relative to window 403. Furthermore, sensor/lens 103 may be rotated relative to 102. This is shown as a rotated window 401. It should be clear that a window may have a rotational deviation and a vertical and horizontal deviation. These deviations may be corrected by an image processor. It is important that the sensor/lens units are positioned so that sufficient overlap of images in effective sensor areas can be achieved, with minimal distortion. This is shown in FIG. 4. At a certain distance, related to a focus setting of the sensor/lens 102 sensor areas 402, 404 and 406 are determined to be appropriate to generate a panoramic image from these images. One may then again store the coordinates of the effective sensor areas in a memory 110, related to a sensor/lens focus. These coordinates may be accessed by controller 109 and provided to the image processor 111 for processing the images. The processor may apply these coordinates directly. In a further embodiment, one may store a transformed image in a buffer applying rectangular axes.

In FIG. 4 to illustrate the aspect of sensor area coordinates is illustrated by identified points 409, 410, 411 and 412, which identify the active sensor area to be used for the panoramic image. The rectangle determined by corners 409, 410, 411, 412 is rotated inside the axes of the image sensor 103 related to window 401. One may provide the image processor 109 with transformational instructions to create standard rectangular axes to refer to the pixels for processing. One may also write the data related to the pixels into a memory buffer that represents the pixels in standard rectangular axes. The coordinates also include the coordinates of the separation/merge line 407-408 between windows 401 and 403. One may also provide the coordinates of the separation line 415-416 between windows 403 and 405. The image processor may be instructed, for instance by the controller 109 which retrieves all the relevant coordinates from memory 110 based on a setting of a reference lens, to combine the active sensor area image of 407, 408, 410, 412 of sensor unit 103 with active sensor area 407, 408, 415, 416 of sensor unit 102. One should keep in mind that the coordinates of line 407-408 in sensor 102 may be different from the coordinates of line 407-408 in sensor 103 if one does not use standardized buffered images.

In a further embodiment, one may start calibration on a far distance scene, thus assuring that one can at least create a far distance scene panoramic image.

In yet a further embodiment, one may start calibration on a near distance scene, thus assuring that one can at least create a near distance scene panoramic image. In one embodiment, a near distance scene may be a scene on a distance from about 3 feet. In another embodiment, a near distance scene may be a scene on a distance from about 5 feet. In another embodiment, a near distance scene may be a scene on a distance from about 7 feet.

Near distance panoramic images, may for instance be an image of a person, for instance when the camera is turned so that 2 or more, or 3 or more sensor/lens units are oriented in a vertical direction. This enables the unexpected results of taking a full body picture of a person, who is standing no further than 3 feet, or no further than 5 feet, or no further than 7 feet from the camera.

Figure 5:
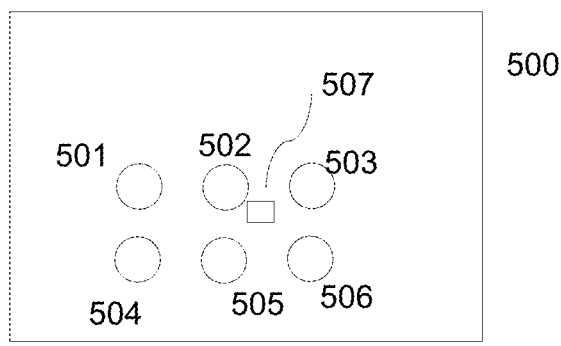
FIGS. 5 and 6 are diagrams of a camera for panoramic images in accordance with an aspect of the present invention.

In illustrative embodiments provided herein sensor/lens units with three lenses are provided. The embodiments generally provided herein will also apply to cameras with two lenses. The embodiments will generally also apply to cameras with more than three lenses. For instance, with 4 lenses, or to cameras with two rows of 3 lenses, or any configuration of lenses and/or sensor units that may use the methods that are disclosed herein. These embodiments are fully contemplated. FIG. 5 shows a diagram of an embodiment of a camera 500, which may be embodied in a camera phone, being a mobile computing device such as a mobile phone with a camera. This diagram shows 6 lenses in two rows. One row with lenses 501, 502 and 503, and a second row with lenses 504, 505 and 506. The camera also has at least an autofocus sensor 507 which will be able to assist a reference lens to focus. All lenses may be driven into focus by a focus mechanism that is controlled by a controller.

Motor Driven Calibration

Figure 6:
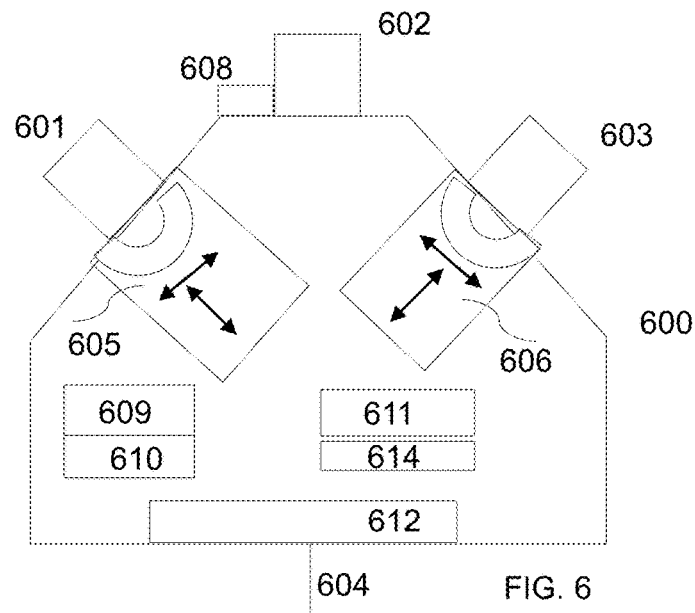

In a further embodiment of a camera, one may provide a sensor/lens unit with one or more motors or mechanism, the motors or mechanism not being only for distance focus. Such a mechanism may provide a sensor/lens unit with the capability of for instance vertical (up and down) motion with regard to a reference sensor/lens unit. Such a motor may provide a sensor/lens unit with the capability of for instance horizontal (left and right) motion with regard to a reference sensor/lens unit. Such a motor may provide a sensor/lens unit with the capability of for instance rotational (clockwise and/or counterclockwise rotational motion) motion with regard to a reference sensor/lens unit. Such an embodiment is shown in FIG. 6. Rotational motion may turn the turned sensor/lens unit towards or away from a reference lens. Rotational motion may also rotate a sensor plane on an axis perpendicular to the sensor plane.

The camera of FIG. 6 is shown in diagram as 600. The camera has again 3 sensor/lens units as was shown in FIG. 1. These units are 601, 602 and 603. Unit 602 may be considered to be the reference unit in this example. It has an autofocus unit 608 associated with it. Each lens can be positioned in a correct focus position by a mechanism or a motor such as a piezo-motor. The system may work in a similar way as shown in FIG. 1. The camera may be pointed at an object at a certain distance. Autofocus unit 608 helps lens of unit 602 focus. Data associated with the distance is stored in a memory 610 that is accessible by a controller 609. Associated with this setting are the related focus settings of lenses of 601 and 603. Thus, a setting of the lens of 602 will be associated with a focus setting of 601 and 603 which will be retrieved from memory 610 by controller 609 to put the lenses of 601 and 603 in the correct focus position. An image processor 611 will process the images provided by sensor units 601, 602 and 603 into a panoramic image, which may be displayed on display 612. The panoramic image may be stored in a memory 614. It may also be provided on an output 604. All controls, sensors, actuators, memories and the like are in this example connected through a bus 699. However, individual direct connections are also contemplated as well as one-direction as dual direction connections.

The sensor unit 601 may be provided with a motor unit or a mechanism 605 that is able to provide the sensor unit with a translation in a plane, for instance the sensor plane. The motor unit 605 may also have a rotational motor that provides clockwise and counterclockwise rotation to the sensor unit in a plane that may be the plane of the sensor and/or that may be in a plane not being in the sensor plane, so that the sensor unit 601 may be rotated, for instance, towards or away from unit 602. Sensor unit 603 has a similar motor unit or mechanism 606. Sensor unit 602 is in this example a reference unit and has in this case no motor unit for translational and rotational movements; however, it has a focus mechanism. Each unit of course has a focus motor for each lens. These motors are not shown in FIG. 6 but may be assumed and are shown in FIG. 1.

The calibration steps with the camera as provided in diagram in FIG. 6 work fairly similar to the above described method. One will start at a certain distance and lighting conditions and with unit 608 have a focus setting determined for 602 which will be associated with a focus setting for units 601 and 603 and which will be stored in memory 610 to be used by controller 609. Assume that the sensor units are not perfectly aligned for creating an optimal panoramic image. The sensor unit 601, 602 and 603 show the images of 702, 700 and 701. For illustrative purposes, a space between the images is shown, the images thus having no overlap. This situation of no overlap may not occur in real life if for instance no zoom lenses are used. However, the method provided herein is able to address such a situation if it occurs and thus is shown.

Figure 8:
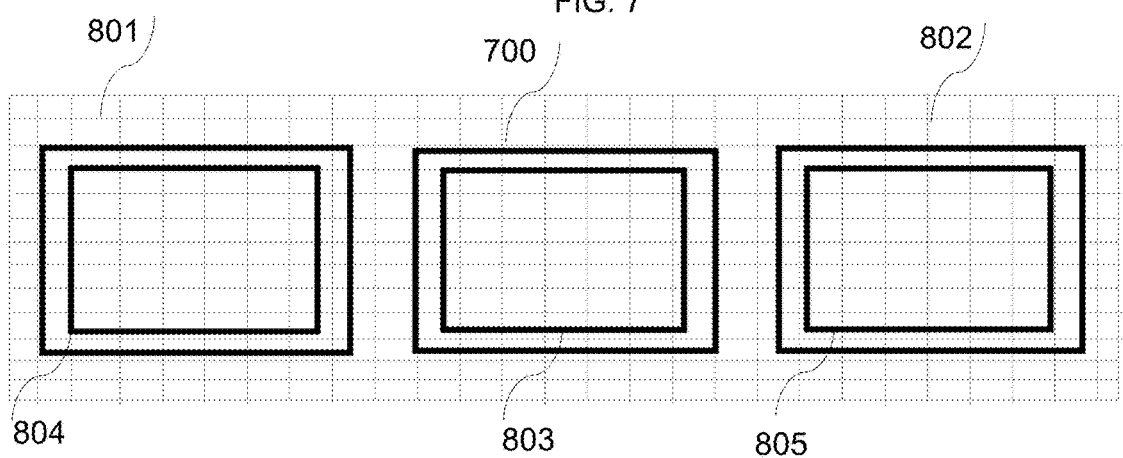
Figure 9:
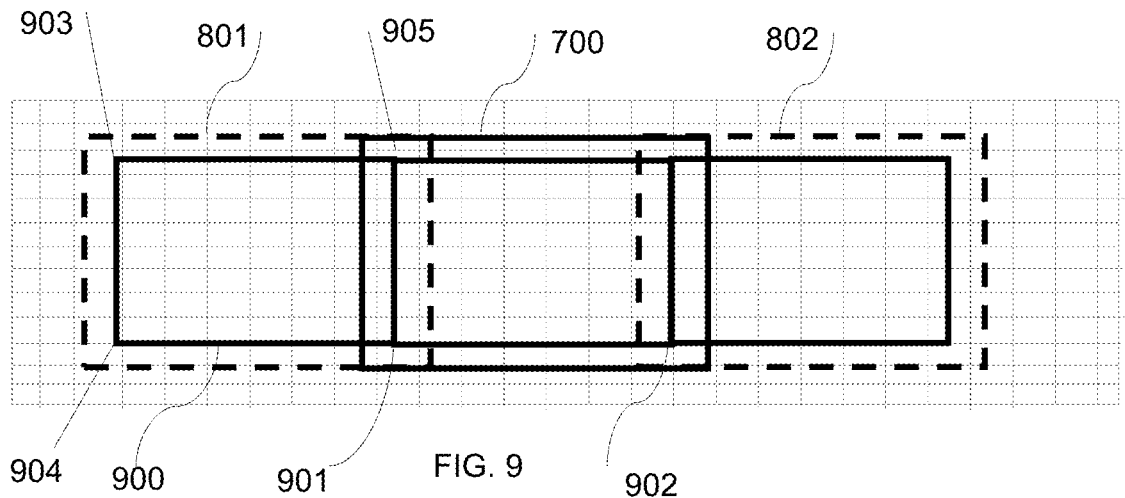

As a next step the motor units 605 and 606 are instructed to align the windows 701 and 702 with 700. This is shown in FIG. 8. Herein, windows 801 and 802 created by the sensor units 603 and 601 which were adjusted in position by the motor units 606 and 605. It may be determined that sensor areas 804 and 805 need to be combined or registered with area 803 as shown in FIG. 8 to generate an optimal panoramic image by image processor 611, which may require a lateral movement of units 601 and 603 by mechanisms 605 and 606. Furthermore, it is determined that sensor areas 803, 804 and 805 provide the best panoramic image for the applied distance in a stitched and registered situation. The motor units are then instructed to put the sensor units 601 and 603 in the positions that provide the correct image overlap as shown in FIG. 9. This creates a panoramic image formed by image sensor areas 804, 803 and 805 touching at position 901 and 902 as shown in FIG. 9 and forming panoramic image 900. All motor instructions to achieve this setting are stored in memory 610 where it is associated with a focus setting determined by unit 608. Furthermore, also stored in memory 610 are the coordinates of the respective sensor areas and the separation lines that will be retrieved by controller 609 and provided to image processor 611 to create an optimal panoramic image. These coordinates are also associated with a focus setting. As an illustrative example of the coordinates 903, 904 and 905 are shown as part of defining the active image sensor area of window 801. By knowing the active sensor areas per sensor including the separation lines, one may easily combine the different images into a stitched or panoramic image. If required, one may define a search area which can be very narrow to optimize stitching and to correct for any alignments inaccuracies by the image processor.

One can repeat the calibration setting for different distances. There may be a difference in field of view between images at difference distances for instance due to the digital multiplier of a sensor unit. Also, parallax may contribute to a need to adjust angles of the sensor/lens units 601 and 603. Zoom settings, of course, will also affect the field of view. It may be possible to align the sensor/lens units in one plane in the manufacturing phase without adjusting the relative position of sensor/lens units. It may still be beneficial to adjust the relative settings of the sensor/lens units. In such a case, the motors or mechanisms may for instance only be rotational motors.

Figure 10:
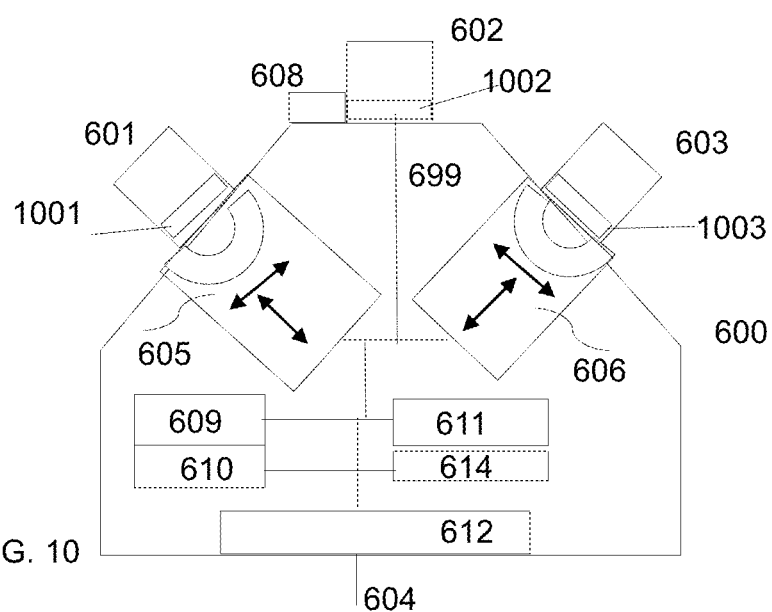
FIGS. 10, 11, 12, 13, 14 and 15 are diagrams of a camera for panoramic images in accordance with one or more aspects of the present invention.

For instance, zoom motors may be required in case the lenses are zoom lenses. In that case, the field of view changes with a changing zoom factor. Such a camera is shown in diagram in FIG. 10. The camera has the same elements as the camera shown in FIG. 6, including a distance focus motor for each lens that are not shown but are assumed. Furthermore, the camera of FIG. 10 has a zoom mechanism 1001 for sensor/lens unit 601, a zoom mechanism 1002 for sensor/lens unit 602, and a zoom mechanism 1003 for sensor/lens unit 603. Calibration of the camera of FIG. 10 works in a similar way as described earlier, with the added step of creating settings for one or more zoom settings per distance settings. A zoom mechanism may be controlled by a controller. A calibration step may work as follows: the lens of unit 602 is set in a particular zoom setting by zoom mechanism 1002. This zoom setting is stored in memory 610 and the lenses of units 601 and 603 are put in a corresponding zoom position with mechanisms 1001 and 1003. The instructions to units 1001 and 1003 to put lenses of 601 and 603 in their corresponding zoom positions are stored in memory 610 and associated with the zoom position of 602 affected by 1002. So, when the lens of 602 is zoomed into position, controller 609 automatically puts the lenses of 601 and 603 in corresponding positions by retrieving instructions from memory 610 and by instructing the motors of 1001 and 1003.

In a further embodiment, the mechanism of 1002 may contain a sensor which senses a zoom position. In such an embodiment, a user may zoom manually on an object thus causing the lenses of 601 and 603 also to zoom in a corresponding manner.

The combination of a distance with a zoom factor of unit 602, which is the reference unit in this example, determines the required position, zoom and focus of the units 601 and 602. As above, all instructions to achieve these positions for 601 and 603 are associated with the corresponding position of the reference unit 602 and stored in memory 610 which is accessible to controller 609. Included in the stored instructions may be the coordinates of the actively used sensor areas, which will be provided to image processor 611 to process the appropriate data generated by the sensors into a stitched and panoramic image as was provided earlier above.

As a consequence of creating a panoramic image of several images one may have created an image of considerable pixel size. This may be beneficial if one wants to display the panoramic image on a very large display or on multiple displays. In general, if one displays the panoramic image on a common display, or for instance on the camera display such high resolution images are not required and the processor 611 may have an unnecessary workload, in relation to what is required by the display. In one embodiment, one may want to provide the controller 609 with the capability to calculate the complete area of the panoramic image and the related pixel count. The controller 609 may have access to the pixel density that is required by a display, which may be stored in a memory 610 or may be provided to the camera. Based on this information the controller may provide the image processor with a down-sampling factor, whereby the images to be processed may be downsampled to a lower pixel density and the image processor can process images in a faster way on a reduced number of pixels. Such a downsizing may be manually confirmed by a user by selecting a display mode. Ultimate display on a large high-quality HD display may still require high pixel count processing. If, for instance, a user decides to review the panoramic image as a video only on the camera display, the user may decide to use a downsampling rate which increases the number of images that can be saved or increase the play time of panoramic video that can be stored in memory.

Figure 11:
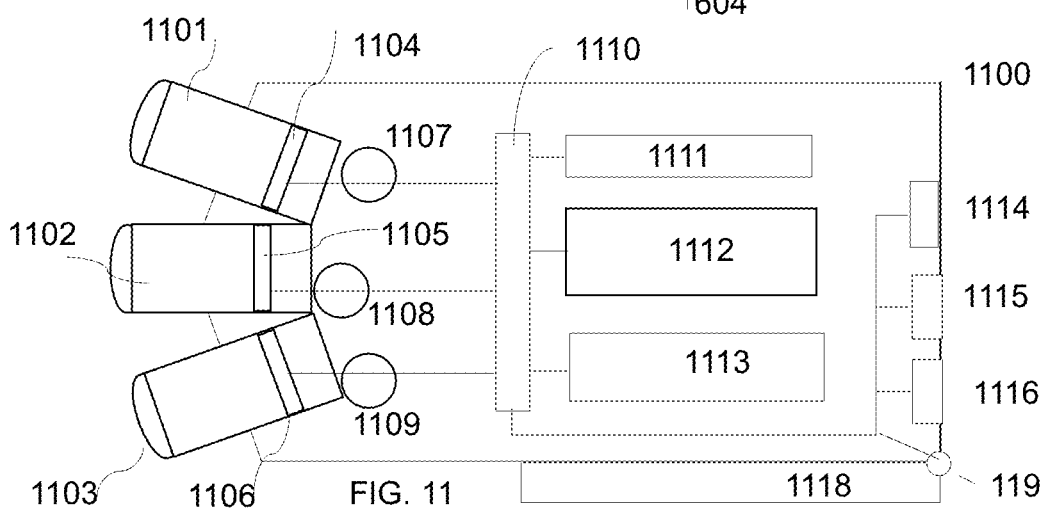

FIG. 11 shows an illustrative embodiment 1100 of a camera that can record at least 3 images concurrently of a scene from different perspectives or angles. The camera may provide a single multiplexed signal containing the three video signals recorded through 3 different lenses 1101, 1102 and 1103 and recorded on image sensors 1104, 1105 and 1106. The sensors are connected on a network which may be a bus controlled by bus controller 1110 and may store their signals on a storage medium or memory 1112 which is also connected to the network or bus. Further connected to the network is a controller 1111 with its own memory if required, which controls the motor units and may provide instructions to the image processor 1113. Also connected to the network are three motors units 1107, 1108 and 1109 for zooming and focusing lenses and moving lenses or lens units laterally or rotationally as required to put the lenses in one plane. Motor unit 1108 may only have zoom and focus capabilities in a further embodiment as lens unit 1102/1105 may be treated as the reference lens. The motors may be controlled by the controller 1111. Also connected to the network is an image processor 1113 with its own memory for instruction storage if required. Furthermore, the camera may have a control input 1114 for providing external control commands, which may include start recording, stop recording, focus and zoom commands. An input command may also include record only with center lens and sensor. An input command may also include record with all three lenses and sensors.

The camera also may have an output 1115 which provides a signal representing the instant image at one or all of the sensors. An output 1116 may be included to provide the data that was stored in the memory 1112. It should be clear that some of the outputs may be combined to fulfill the above functions. Furthermore, the camera may have additional features that are also common in single lens cameras, including a viewer and the like. A display 1118 may also be part of the camera. The display may be hinged at 119 to enable it to be rotated in a viewable position. The display is connected to the bus and is enabled to display the panoramic image which may be a video image. Additional features are also contemplated. The camera has at least the features and is enabled to be calibrated and apply methods as disclosed herein.

In a first embodiment, a user may select if images from a single lens or of all three lenses will be recorded. If the user selects recording images from all three lenses, then via the camera controller a control signal may be provided that focuses all three lenses on a scene. Calibrated software may be used to ensure that the three lenses and their control motors are focused correctly. In a further embodiment, the image signals are transmitted to the memory or data storage unit 1112 for storing the video or still images.

In yet a further embodiment, the signals from the three lenses may be first processed by the processor 1113 to be registered correctly into a potentially contiguous image formed by 3 images that can be displayed in a contiguous way. The processor in a further embodiment may form a registered image from 3 images that may be displayed on a single display.

The processor in yet a further embodiment may also process the images so that they are registered in a contiguous way if displayed, be it on one display or on three different displays.

After being processed the processed signals from the sensors can be stored in storage/memory unit 1112. In yet a further embodiment, the signals are provided on an output 1115.

The reason for the different embodiment is the preference of a user for display and to make a camera potentially less complex and/or costly. One may, for instance, elect to make sure that all lenses and their controls are calibrated as to focus and/or zoom correctly. One may register images already in the camera through the processor 1113. However, one may also provide the three images either directly or from memory as parallel signals to a computing device such as a personal computer. The computing device may provide the possibility to select, for instance in a menu, the display of an image of a single lens/sensor. It may also provide a selection to display all three images in a registered fashion. The computing device may then have the means to register the images, store them in a contiguous fashion in a memory or a storage medium and play the images in a registered fashion either on one display or on three different displays.

For instance one may provide a signal available on output 1116, which may be a wireless or radio transmitter. Accordingly, a camera may make 3 or more video images, which may be multiplexed and registered or multiplexed and not registered available as a radio signal. Such radio signal may be received by a receiver and provided to a computing device that can process the signals to provide a registered image. A registered image may be provided on one display. It may also be provided on multiple displays.

There are different combinations in processing, multiplexing, registering, storing, outputting and displaying. One may elect to do most processing in the camera. One may also do the majority of the processing in the computing device and not in the camera. One may provide lens setting parameters with image data to facilitate processing by a computing device for processing and consequently displaying the registered images.

Figure 12:
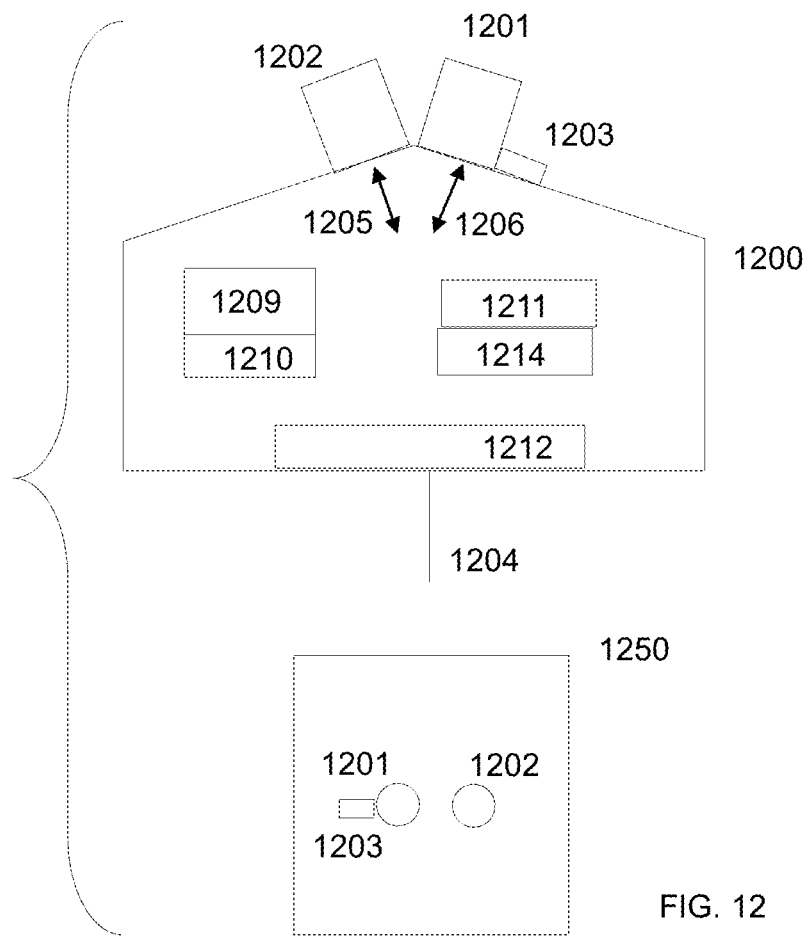

FIG. 12 shows a diagram of a camera for creating and displaying panoramic images by using 2 sensor/lens units 1201 and 1202 and having at least one autofocus unit 1203. Sensor/lens unit 1202 has at least a focus motor 1205 and sensor/lens unit 1201 has at least a focus motor 1206. The camera also has a controller 1209 which may have its separate memory 1210, which may be ROM memory. The camera also has an image processor 1211 which can process image data provided by sensor/lens units 1201 and 1202. A memory 1214 may store the panoramic images generated by the image processor. Motors may be controlled by the controller 1209, based in part on instructions or data retrieved from memory 1210 related to a setting of the autofocus unit 1203. Associated with a focus setting may be coordinates of sensor areas within sensors of units 1201 and 1202 of which the generated data will be processed by the image processor 1211. The controller 1209 may provide processor 1211 with the required limitations based on a focus setting. All settings may be determined during calibration steps as described earlier herein. A display 121 may be included to display the panoramic image. Signals related to a panoramic image may be provided on output 1204. In a further embodiment lens unit 1202 may be provided with a motor unit that can control lateral shifts and/or rotation of 1202 in relation to unit 1201. Settings of this motor unit may also be determined in a calibration setting. Diagram 1200 provides a top view and cross sectional view of the camera. Connections are not drawn in FIG. 12 in order to focus on components. However, all components where required are connected and/or interconnected, for instance through a bus structure. Diagram 1250 provides a front view.

Figure 13:
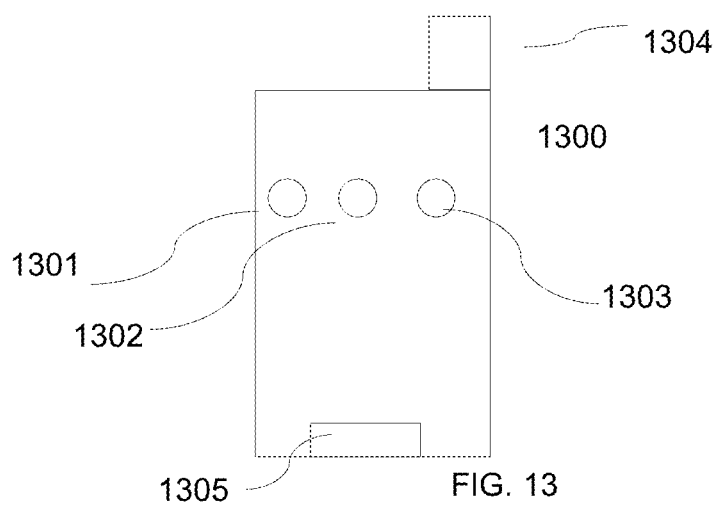

A diagram is shown in FIG. 13 of a mobile computing device 1300 which may communicate in a wireless fashion with a network, for instance via an antenna 1304. While the antenna is shown it may also be hidden within the body. As an illustrative example the device has 3 lenses 1301, 1302 and 1303 which are enabled to record a scene in a way wherein the three individual images of the scene can be combined and registered into a wide view panoramic image, which may be a video image. The device has a capability to store the images in a memory. The device has a processor that can create a combined image. The combined image, which may be a static image such as a photograph or a video image, can be stored in memory in the device. It may also be transmitted via the antenna 1304 or via a transmission port for output 1305 to an external device. The output 1305 may be a wired port for instance a USB output. It may also be a wireless output, for instance a Bluetooth output.

Figure 14:
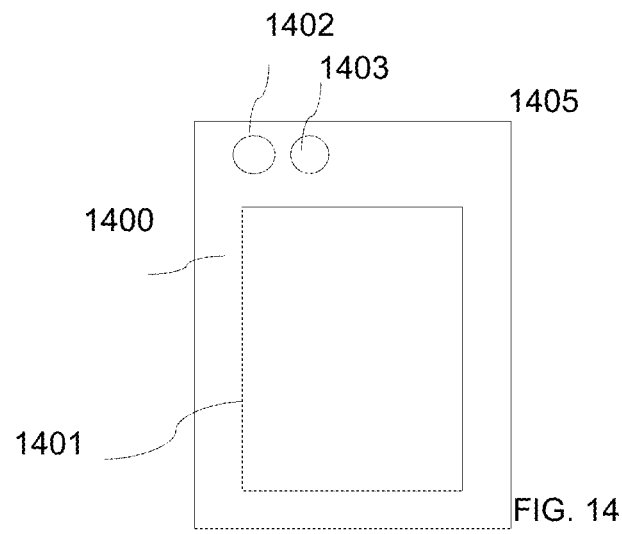
Figure 15:
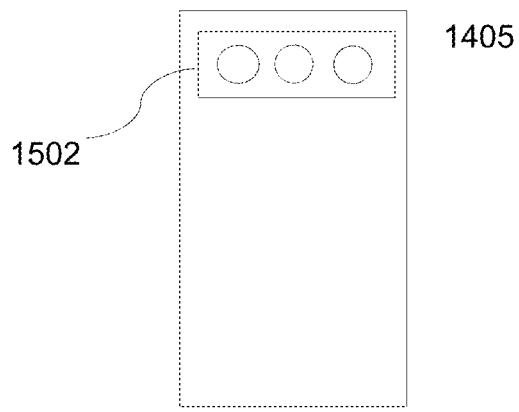

Viewing of the image may take place real-time on a screen 1401 of a smartphone 1405 with body 1400 as shown in FIG. 14. Screen 1401 may be a touchscreen. Smartphone 1405 may have 2 or more user facing cameras 1402 and 1403. These cameras may be used for selfies, for teleconferencing or other user-facing applications. Other device components are usually internal to the body. There may be outside controls such as power control and connectors. These may all be assumed to be present when required. They are not shown as to keep the drawing uncrowded. The reverse side of 1405 is shown in FIG. 15 with, for illustrative purpose 3 cameras 1502.

In one embodiment, one may assume that the surface of the device as shown in FIG. 13 is substantially flat. In that case, the camera lenses 1301, 1302 and 1303 have a combined maximum field of view of 180 degrees. This may be sufficient for cameras with 3 lenses wherein each lens has a maximum field-of-vision of 60 degrees. In a further embodiment, one may have more than 3 lenses, enabling a combined field-of-vision of more than 180 degrees, or the field of view of the lenses adds up to more than 180 degrees. In such an embodiment, the surface may be curved or angled, allowing 3 or more lenses to have a combined field-of-view of greater than 180 degrees.

Figure 16:
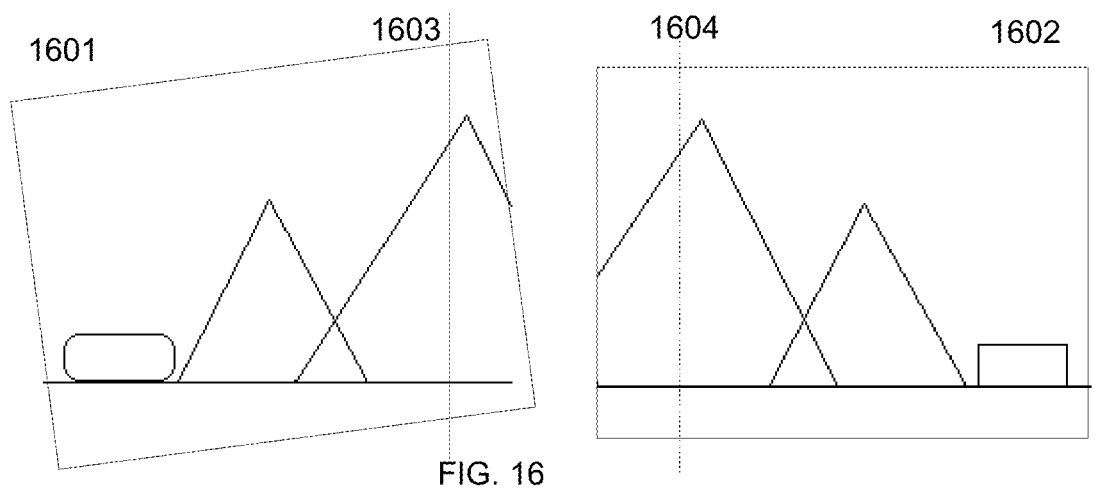
FIGS. 16 and 17 illustrate a panoramic image created in accordance with an aspect of the present invention.

In diagram in FIG. 16 it is shown how scenes are seen by the lenses 1402 and 1403. Lens 1402 'sees' scene 1602 and lens 1403 'sees' scene 1601. It is clear that the two sensor/lens units are not well oriented in regard to each other. As was described earlier above one may calibrate the camera to achieve an optimal and aligned panoramic image by good calibration. A processor in the camera may stitch the images together, based on control input by a calibrated controller. From a calibration it may be decided that lines 1603 and 1604 are merge lines which may be applied to image data. This again allows created registering of images without having to search for a point of registration. The 'stitching' may be as simple as just putting defined parts of the images together. Some edge processing may be required to remove the edge between images if it's visible. In general, the outside of an image may suffer from lens distortion.

Figure 17:
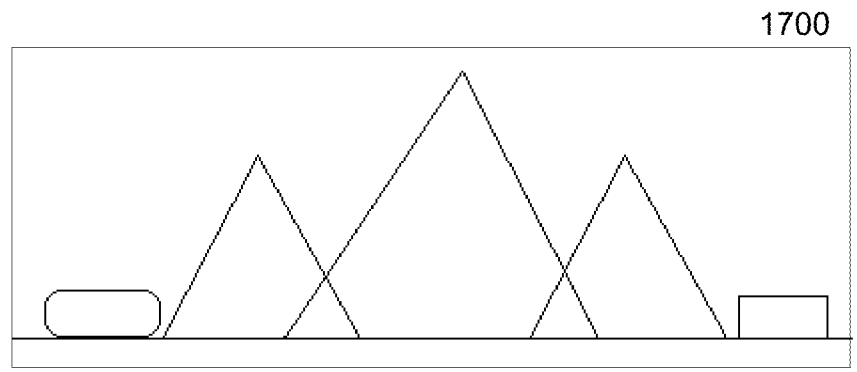

FIG. 17 shows then the registered and combined image 1700. The image may be a photograph. It may also be a video image.

The embodiment as provided in FIG. 15 and its result shown in FIG. 17 is unusual in at least one sense that it creates a center of an image by using the edges of the images created by two lenses. In general, as in some aspects of the present invention, one assigns one lens to the center and presumably an important part of the image. The above embodiment allows for creating a good quality image by using inexpensive components and adjusting the quality of a combined image by a set of instructions in a processor. Except for a focus mechanism not other motors are required. Thus, relatively inexpensive components, few moving parts and a calibrated controller and an image processor with memory provide a desirable consumer article. Prices of electronic components go down while their performance constantly increases. Accordingly, one may create the above camera also in a manufacturing environment that not applies expensive manufacturing tolerances on the manufacturing process. Deviations in manufacturing can be off-set by electronics performance.

Figure 18:
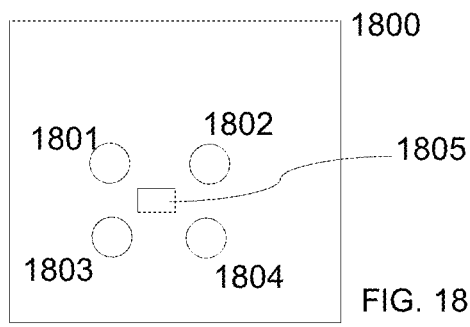
FIGS. 18 and 19 are diagrams of a camera for panoramic images in accordance with yet another aspect of the present invention.

The methods provided herein may create a panoramic image that makes optimal use of available image sensor area. In some cases, this may create panoramic images that are not conforming to standard image sizes. One may as a further embodiment of the present invention implement a program in a controller that will create a panoramic image of a predefined size. Such a program may take actual sensor size and pixel density to fit a combined image into a preset format. In order to achieve a preferred size it may cause to lose image area. One may provide more image size options by for instance using two rows of sensor/lens units as for instance shown in FIG. 5 with two rows of 3 image sensors/lenses, or as shown in FIG. 18 by using two rows of 2 image sensors/lenses. Especially if one wants to print panoramic images on standard size photographic paper one may try to create an image that has a standard size, or that conforms in pixel count with at least one dimension of photographic print material.

In a further embodiment of the present invention one may adjust the size of an image sensor to allow creating standard size images or at least with one dimension such as the vertical dimension in a standard size and standard quality or higher.

Panoramic image cameras will become very affordable as prices of image sensors continue to fall over the coming years. By applying the methods disclosed herein one can create panoramic cameras with inexpensive sensors and electronics, having an excess of sensor area and/or lenses substitute for a need for motors, mechanisms and mechanical drivers.

It is to be understood that deviations of placement of sensors in the drawings herein may have been greatly exaggerated. It is to be expected that mis-alignment of sensors can be limited to about 1 mm or less. That may still represent a significant amount of pixels. Rotational positioning deviations may be less than about 2 degrees or 1 degree. That may still require significant sensor area adjustment. For instance, with a sensor having 3000×2000 pixels at a rotation of 1 degree without a lateral shift may have a shift of pixels of about 50 pixels in any direction and a shift of 1 pixel in an x direction. Clearly, such a deviation requires a correction. However, the required mechanical adjustment in distance may well be within the limits of for instance piezo-motors. For larger adjustments other types of known motors may be applied. It also clear that though shifts of 50 pixels or even higher are unwanted, they still leave significant sensor area for usable image.

Due to the multiplier effect of the image sensor, zoom effects and other effects related to lens, lens position, image sensors and lighting conditions and the like one may have different lens settings of the lenses related to a reference lens. It is clearly the easiest to generate as may different conditions and settings during calibration as possible and save those settings with the related image areas and further stitching and blending parameters in a memory. A certain setting under certain conditions of a reference will be associated with related settings such as focus, aperture, exposure time, lens position and zoom of the other lenses. These positions may also be directly related with the active areas and/or merge lines of image sensors to assist in automatically generating a combined panoramic image. This may include transformation parameters for an image processor to further stitch and/or blend the separate images into a panoramic image.

Calibration of a panoramic camera system, including determination of active sensor areas, possible corrective warpings, color correction settings, distance dependencies and other parameters takes place as part of a manufacturing process after or during fixing or placing cameras in a body. Further calibration may be performed during usage of the panoramic system, including color correction and calibration of merge-lines prior to actively applying the parameters. For instance a stitching procedure may be used just prior to recording a video to determine one or more merge-lines of image sensors. The search is limited to a small area and relatively fast (less than 5 seconds and preferable less than 1 second) and may be implemented as a fixed parameter during active recording.

It should be clear that lens settings between two extreme settings, such as for instance close-up object, or far away object may be significant. It is also clear that there may be only a finite number of calibrated settings. One may provide an interpolation program that interpolates between two positions and settings. The images may be video images. One may move a camera, for instance to follow a moving object. One may provide instructions, via a controller for instance, to keep a reference lens in a predetermined setting, to make sure that when the object temporarily leaves the field of vision of the reference lens that settings are not changed.

In a further embodiment of the present invention, images in a static format, in a video format, in a combined and registered format and/or in an individual format may be stored on a storage medium or a memory that is able to store a symbol as a non-binary symbol able to assume one of 3 or more states, or one of 4 or more states.

A combined, also called panoramic image exists as a single image that can be processed as a complete image. It was shown above that a combined and registered image may be created in the camera or camera device, by a processor that resides in the camera or camera device. The combined image, which may be a video image, may be stored in a memory in the camera or camera device. It may be displayed on a display that is a part or integral part of the camera device and may be a part of the body of the camera device. The combined image may also be transmitted to an external display device. A panoramic image may also be created from data provided by a multi-sensor/lens camera to an external device such as a computer.

Currently, the processing power of processors, especially of DSPs or Digital Signal Processors is such that advanced image processing methods may be applied real-time on 2D images. One of such methods is image extraction or segmentation of an image from its background. Such methods are widely known in medical imaging and in photo editing software and in video surveillance. Methods for foreground/background segmentation are for instance described in U.S. Pat. No. 7,424,175 to Lipton et al., filed on Feb. 27, 2007; U.S. Pat. No. 7,123,745 to Lee issued on Oct. 17, 2006; U.S. Pat. No. 7,227,893 issued on Jun. 5, 2007, which are incorporated herein by reference in their entirety and in many more references. For instance, Adobe's Photoshop provides the magnetic lasso tool to segment an image from its background.

Current methods, which can be implemented and executed as software on a processor allows for a combined and registered image to be processed. For instance, such an image may be a person as an object. One may identify the person as an object that has to be segmented from a background. In one embodiment, one may train a segmentation system by identifying the person in a panoramic image as the object to be segmented. For instance, one may put the person in front of a white or substantially single color background and let the processor segment the person as the image. One may have the person assume different positions, such as sitting, moving arms, moving head, bending, walking, or any other position that is deemed to be useful.

Figure 19:
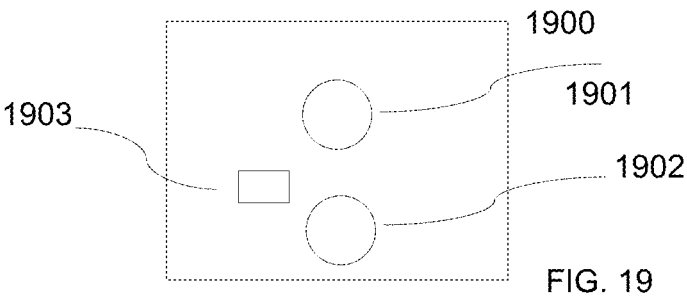

It is difficult to create a full body image with a single lens camera close to a person as the field of vision of the camera is generally too small. One may apply a wide angle lens or a fish-eye lens. These lenses may be expensive and/or create distortion in an image. A camera enabled to generate vertical panoramic images such as shown in FIG. 19 enables full body image games as provided above from a small distance. The camera as shown in diagram 1900 has at least two sensor/lens units 1901 and 1902 and at least one autofocus unit 1903. It is not strictly required to use one camera in one body with at least two lenses. One may also position at least two cameras with overlap in one construction and have an external computing device create the vertical panoramic image.

Lens units may have integrated focus mechanisms, which may be piezomotors or any other type of motor, mechanism or MEMS (micro-electro-mechanical system). Integrated zoom mechanisms for sensor/lens units are known. Liquid lenses or other variable are also known and may be used. When the term motor is used herein or piezo-motor it may be replaced by the term mechanism, as many mechanisms to drive a position of a lens or a sensor/lens unit are known. Preferably, mechanisms that can be driven or controlled by a signal are used.

Figure 20:
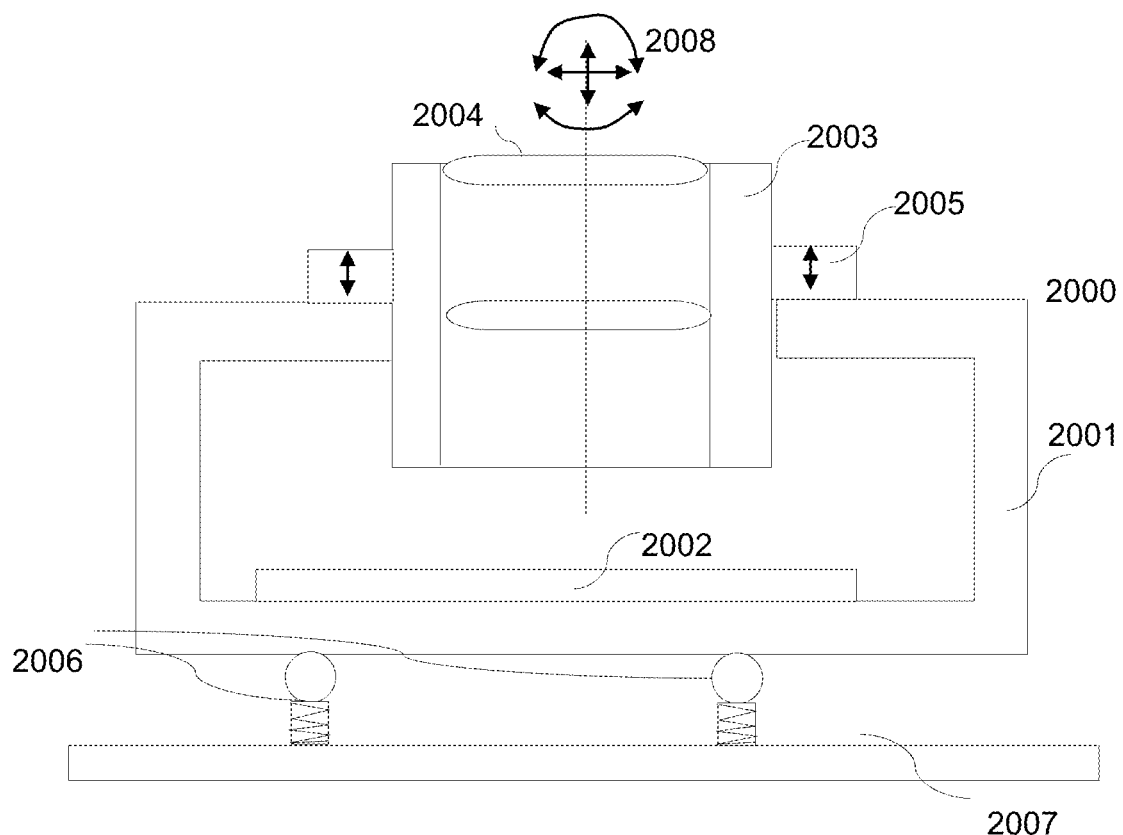
FIG. 20 is a diagram of a sensor/lens unit with moving mechanisms.

FIG. 20 shows a diagram of one embodiment of a sensor/lens unit 2000 in accordance with an aspect of the present invention. The unit has a body 2001 with a sensor 2002, a lens barrel 2003 which contains at least one lens 2004, the barrel can be moved by a mechanism 2005. The lens unit may also contain a zoom mechanism, which is not shown. The unit can be moved relative to the body of the camera by a moving mechanism 2006. The movements that may be included are lateral movement in the plane of the sensor, rotation in the plane of the sensor and rotation of the plane of the sensor, which provides the unit with all required degrees of freedom, as is shown as 208.

Figure 21:
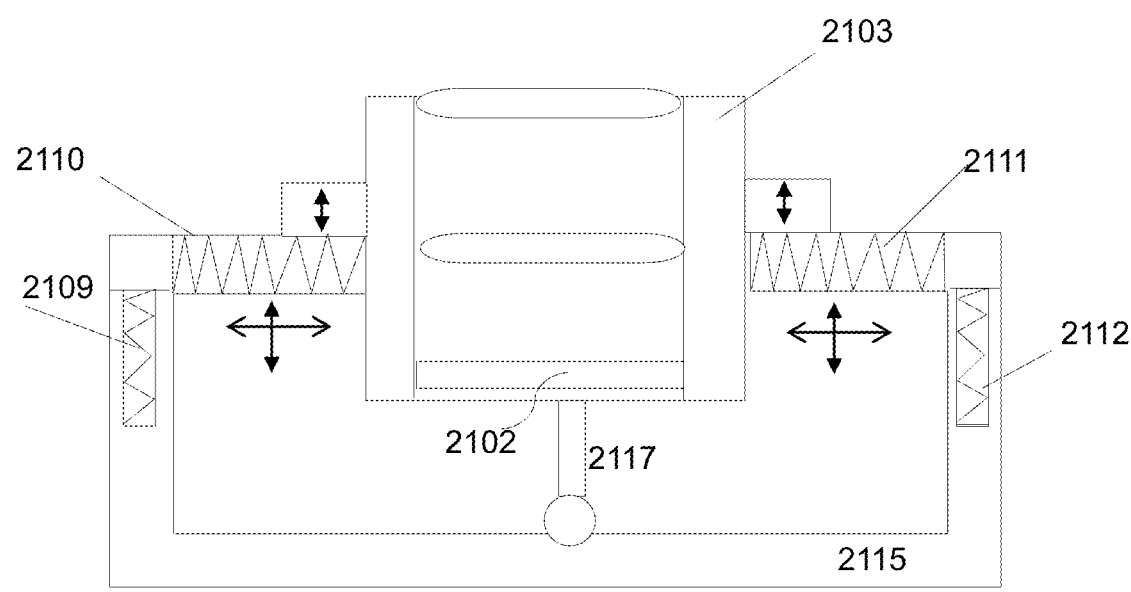
FIG. 21 is a diagram of another sensor/lens unit with moving mechanisms.

Other embodiments are possible. For instance, one may have the lens movable relative to the sensor as is shown in FIG. 21, wherein lens barrel 2103 may be moved in any plane relative to the sensor by lateral mechanisms 2109 and 2112 and by vertical mechanisms 2110 and 2111. The mechanisms may be micro-motors, piezo-motors or other driving mechanism that drive a screw or move a lever that changes a position of the lens. In one embodiment the lens position is changed relative to a position of a sensor 2002. In a further embodiment a mechanism drives a position of lens unit 2103 that contains a sensor 2102. Herein the lens/sensor unit 2103 can be moved relative to a fixed body 2115 that is fixedly part of a camera body. A motor/axis unit 2117 controlled by a controller is enabled to rotate 2103 relative to 2115. This allows rows of sensor elements as shown in 2201 and 2202 in FIG. 22 to be aligned in horizontal or row direction.

A mechanism may be driven by a controller. This means that the controller has at least an interface with the driving mechanisms in order to provide the correct driving signal. A controller may also have an interface to accept signals such as sensor signals, for instance from an autofocus unit. The core of a controller may be a processor that is able to retrieve data and instructions from a memory and execute instructions to process data and to generate data or instructions to a second device. Such a second device may be another processor, a memory or a MEMS such as a focus mechanism. It was shown herein as an aspect of the present invention that a controller may determine a focus and/or a zoom setting of a camera and depending on this setting provide. The terms controller and image processor may be interpreted as a distinction between functions that can be performed by the same processor.

For reasons of simplicity, the parameters for camera settings have been so far limited to focus, zoom and position and related active sensor areas. Light conditions and shutter speed, as well as shutter aperture settings, may also be used. In fact, all parameters that play a role in creating a panoramic image may be stored in a memory and associated with a specific setting to be processed or controlled by a controller. Such parameters may for instance include transformational parameters that determine modifying pixels in one or more images to create a panoramic image. For instance, two images may form a panoramic image, but require pixel blending to adjust for mismatching exposure conditions. Two images may also be matched perfectly for a panoramic image, but are mismatched due to lens deformation. Such deformation may be adjusted by a spatial transformation of pixels in one or two images. A spatial transformation may be pre-determined in a calibration step, including which pixels have to be transformed in what way. This may be expressed as parameters referring to one or more pre-programmed transformations, which may also be stored in memory and associated with a reference setting.

The calibration methods provided herein allow an image processor to exactly or nearly exactly match on the pixel two or more images for stitching into a panoramic image. This allows skipping almost completely a search algorithm for registering images. Even if not a complete match is obtained immediately, a registering algorithm can be applied that only has to search a very small search area to find the best match of two images. The image processor may adjust pixel intensities after a match was determined or apply other known algorithms to hide a possible transition line between two stitches images. For instance, it may be determined during calibration that at a lens setting no perfect match between two images can be found due to distortion. One may determine the amount of distortion at the lens setting and have the image processor perform an image transformation that creates two registered images. The same approach applies if the uncertainty between two images is several pixel distances, for instance, due to deviations in driving mechanisms. One may instruct the image processor to for instance perform an interpolation. The parameters of the interpolation may be determined from predetermined pixel positions.

A controller may be a microcontroller such as a programmable microcontroller. These controllers that take input from external sources such as a sensor and drive a mechanism based on such input and/or previous states are known. Controllers that control aspects of a camera, such as focus, zoom, aperture and the like are also known. Such a controller is for instance disclosed in U.S. Pat. No. 7,259,792 issued on Aug. 21, 2007, and U.S. Pat. No. 6,727,941 issued on Apr. 27, 2004, which are both incorporated herein by reference in their entirety. Such a controller may also be known or be associated with a driving device. Such a driving device is for instance disclosed in U.S. Pat. No. 7,085,484 issued on Aug. 1, 2006, U.S. Pat. No. 5,680,649 issued on Oct. 21, 1997 and U.S. Pat. No. 7,365,789 issued on Apr. 29, 2008, which are all 3 incorporated herein by reference in their entirety.

In one embodiment of the present invention, all images are recorded at substantially the same time. In a second embodiment, at least two images may be taken at substantially not the same time.

In a further embodiment, a camera has 3 or more lenses, each lens being associated with an image sensor. Each lens may be a zoom lens. All lenses may be in a relatively fixed position in a camera body. In such a construction, a lens may focus, and it may zoom, however, it has in all other ways a fixed position in relation to a reference position of the camera. As an illustrative example, lenses are provided in a camera that may be aligned in one line. Such an arrangement is not a required limitation. Lenses may be arranged in any arrangement. For instance 3 lenses may be arranged in a triangle. Multiple lenses may also be arranged in a rectangle, a square, or an array, or a circle, or any arrangement that may provide a stitched image as desired. The calibration of lenses and sensor area may be performed in a similar way as described earlier. Each lens may have its own image sensor. One may also have two or more lenses share a sensor. By calibrating and storing data related to active image sensor areas related to a setting of at least one reference lens, which may include one or more merge lines between image areas of image sensors one may automatically stitch images into one stitched image.

Aspects of the present invention are applied to the creation of panoramic images using two or more sensor/lens units. There is also a need to create stereographic images using two sensor/lens systems. The aspects of the present invention as applied to two lenses for panoramic images may also be applied to create stereographic images.

Figure 22:
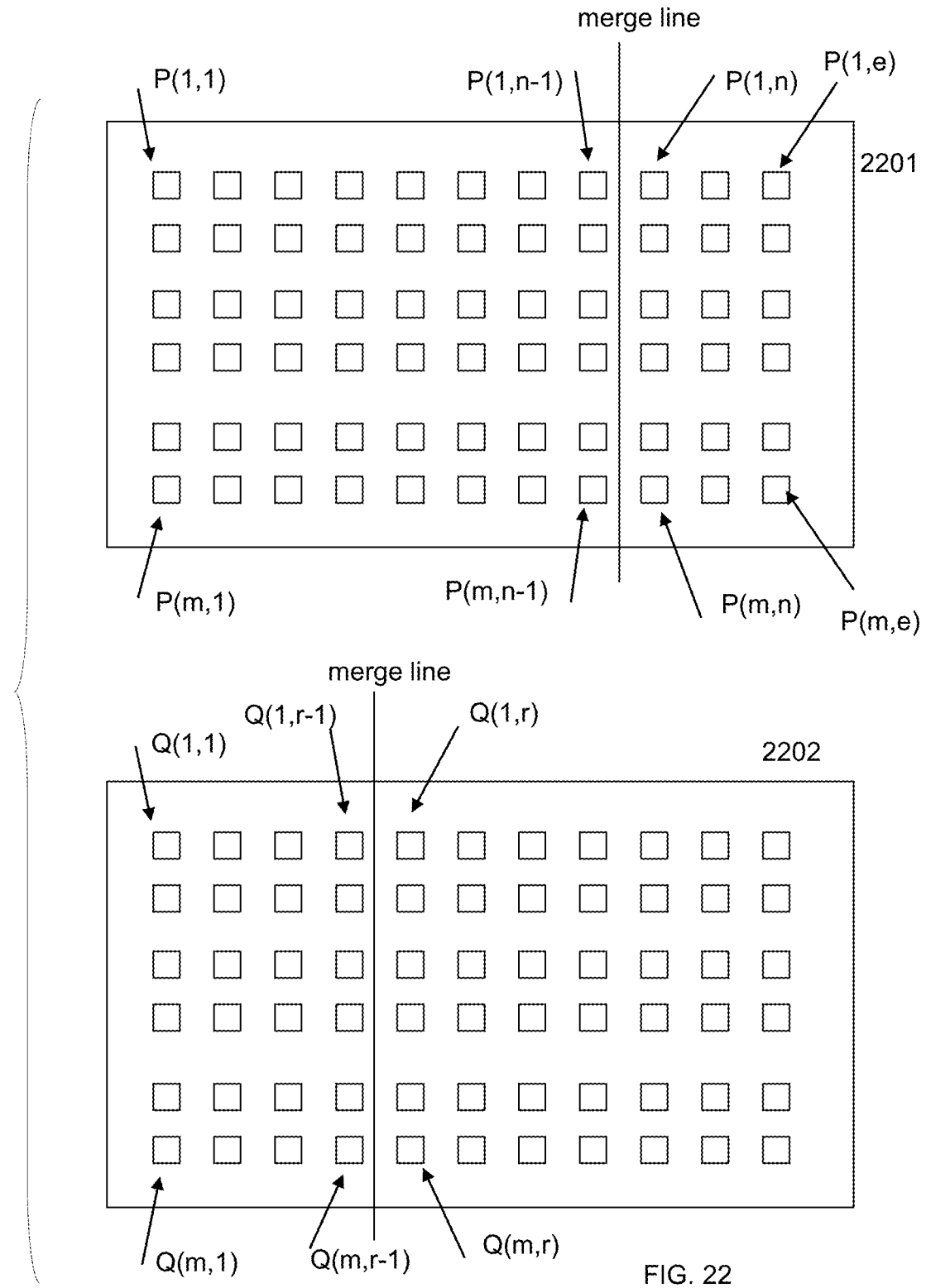
FIGS. 22, 23 and 24 illustrate capturing of images by multiple image sensors.

A further illustration of processing data of a limited area of an image sensor is provided in FIG. 22. Assume that an image has to be stitched from images generated by a sensor 2201 and a sensor 2202. For illustrative purposes, these sensors are pixel row aligned and are translated with respect to each other over a horizontal line. It should be clear that the sensors may also have a translation in vertical direction and may be rotated with respect to each other. For simplicity, reasons only one translation will be considered. Each sensor is determined by rows of sensor pixels which are represented in diagram by a little square. Each pixel in a sensor is assigned an address or location such as P(1,1) in 2201 in the upper left corner. A pixel P(x,y) represents how a pixel is represented as data for processing. What is called a sensor pixel may be sets of micro sensors able to detect for instance Red, Green or Blue light. Accordingly, what is called a sensor pixel is data that represents a pixel in an image that originates from a sensor area which may be assigned an address on a sensor or in a memory. A pixel may be represented by for instance an RGBA value.

A sensor may generate a W by H pixel image, for instance a 1600 by 1200 pixel image, of 1200 lines, each line having 1600 pixels. In FIG. 22 in 2201 the start of the lowest line at the lower left corner is then pixel P(1200,1). Assume that, during calibration, a stitched image can be formed from pixels along pixel line P(1, n−1) and P(m,n−1), whereby the merge line cuts off the data formed by area defined by P(1,n), P(1,e), P(m·n) and P(m,e) when the merge line is a straight line parallel to the edge of the sensor. However, other merge lines are possible. A second and similar sensor 2202 is used to provide the pixels of the image that has to be merged with the first image to form the stitched image. The sensor 2202 has pixel Q(x,y), which starting pixel at Q(1,1) and bottom pixel line starting at Q(m,1) and the merge line running between Q(1,r−1) and Q(1,r) and Q(m,r−1) and Q(m,r).

One may process the data generated by the image sensors in different ways. One may store only the 'useful data' in a contiguous way in a memory. This means that the non-used data such as generated by area P(1,n), P(1,e), P(m,n) and P(m,e) and Q(1,1) Q(1,r−1), Q(m,r−1) and Q(m,1) is not stored. In a first embodiment, one may process the pixels to be stored for blending and transformation before storage. Accordingly, a stitched panoramic image will be stored in memory.

In a second embodiment, one may store data generated by the whole sensor area in a memory. However, one may instruct a memory reader to read only the required data from the memory for display. During reading one may process the data for blending and transformation and display only the read data which may have been processed, which will form a stitched image.

Fixed Focus Lens, Digital Zoom, Barrel and Pincushion Distortion, Keystoning. Correction at Capture and Post-Capture. Merge Line, Fixed Overlap at Different Positions of Lens. Scaling Effects to Standard Format.

It was shown above in one embodiment that one may include a focus mechanism such as autofocus in a camera to generate a panoramic image. In one embodiment one may have a focus mechanism associated with one lens also being associated with at least one other lens and potentially three or more lenses. This means that one focus mechanism drives the focus setting of at least two, or three or more lenses. One may also say that the focus setting of one lens drives all the other lenses. Or that all (except a first) lens are followers or in a master/slave relation to the focus of a first lens. Each lens has an image sensor. Each image sensor has an active sensor area from which generated data will be used. It may be that the sensor has a larger area than the active area that generates image data. However, the data outside the active area will not be used. An active area of image sensor elements on an image sensor with image sensor elements is smaller than the complete area of image sensor elements of the image sensors.

The data of the entire sensor may be stored, and only the data defined by the active area is used. One may also only store the data generated by the active area and not store the other image data of the remaining area outside the active area. One may illustrate this with FIG. 22. For instance an active area of an image sensor 2201 may be defined as the rectangular area defined by pixels P(1,1) P(1,n−1), P(m,n−1) and P(m,1). In a first embodiment one may store all data generated by sensor area P(1,1), P(1,e), P(m,e) and P(m,1), wherein n, m and e may be positive integers with e>n. However, one may define the active area by for instance the addresses of a memory wherein only the data related to the active area is stored. Such an address may be a fixed address defining the corners and sides of the rectangle, provided with if required an off-set. The active sensor area is then defined by the addresses and range of addresses from which data should be read.

In a further embodiment on may also only store in a memory data generated by the active area. If areas are defined correctly then merging of the data should in essence be overlap free and create a stitched image. If one does not define the areas (or merge lines) correctly then one will see in merged data a strip (in the rectangular case) of overlap image content. For illustrative purposes rectangular areas are provided. It should be clear that any shape is permissible as long as the edges of images fit perfectly for seamless connection to create a stitched and registered image.

The active areas of image sensors herein are related to each lens with a lens setting, for instance during a calibration step. During operation a controller, based on the lens focus setting, will identify the related active areas and will make sure that only the data generated by the active areas related to a focus setting will be used to create a panoramic image. If the active areas are carefully selected, merged data will create a panoramic image.

Fixed Focus Lenses

In a further embodiment one may wish to use two or more lenses with a fixed focus. Fixed focus lenses are very inexpensive. In a fixed focus case the defined active areas of the sensors related to the lenses are also fixed. However, one has to determine during positioning of the lenses in the camera what the overlap is required to be and where the merge line is to be positioned. Very small lenses and lens assemblies are already available. The advantage of this is that lenses may be positioned very close to each other thus reducing or preventing parallax effects. A lens assembly may be created in different ways. For instance in a first embodiment one may create a fixed lens assembly with at least two lenses and related image sensors, the lenses being set in a fixed focus. One may determine an optimal position and angle of the lenses in such an assembly as shown in diagram in FIG. 23 for a set of two lenses. Three or more lenses are also possible. In 2301 and 2302 indicate the image sensors and 2303 and 2304 the related lenses of a 2 lens assembly.

Figure 23:
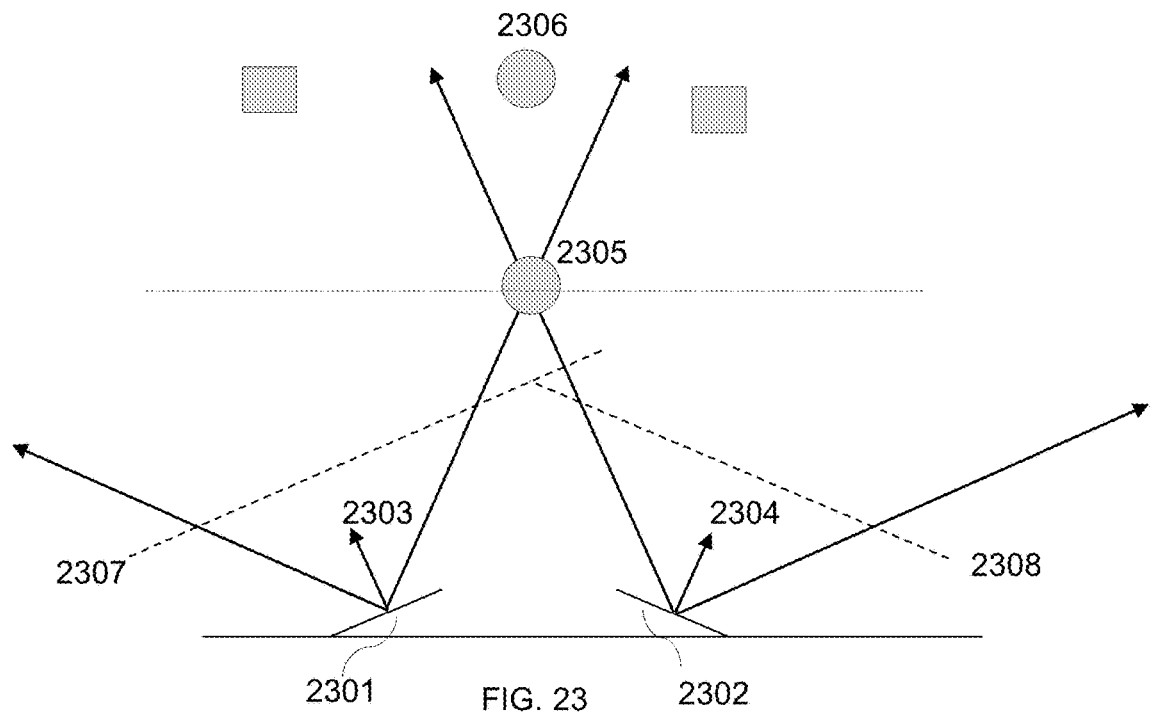

Each lens in FIG. 23 has a certain field-of-view. Each lens is positioned (in a fixed position in this case) in relation to the other lens or lenses. Lines 2307 and 2308 indicate a minimum distance of an object to still be adequately recorded with the fixed focus lens. 2305 and 2306 indicate objects at a certain distance of the camera. One has to determine in a pre-manufacturing step, based on the quality of the lens, the fixed focus setting, the required overlap and the desired view of the panoramic image and other factors what the angle is under which the two (or in other cases 3 or more) lenses will be positioned. Once that is determined, a lens assembly will be manufactured with lenses under such an angle. For instance, one may create a molded housing that accepts individual lenses with there sensors in a certain position. One may create an assembly with two or more lenses that can be integrated in a camera such as a mobile phone. One may also create a camera housing that accepts the individual lenses in a certain position, or any other configuration that creates a substantially repeatable, mass production type of lens assembly.

Figure 24:
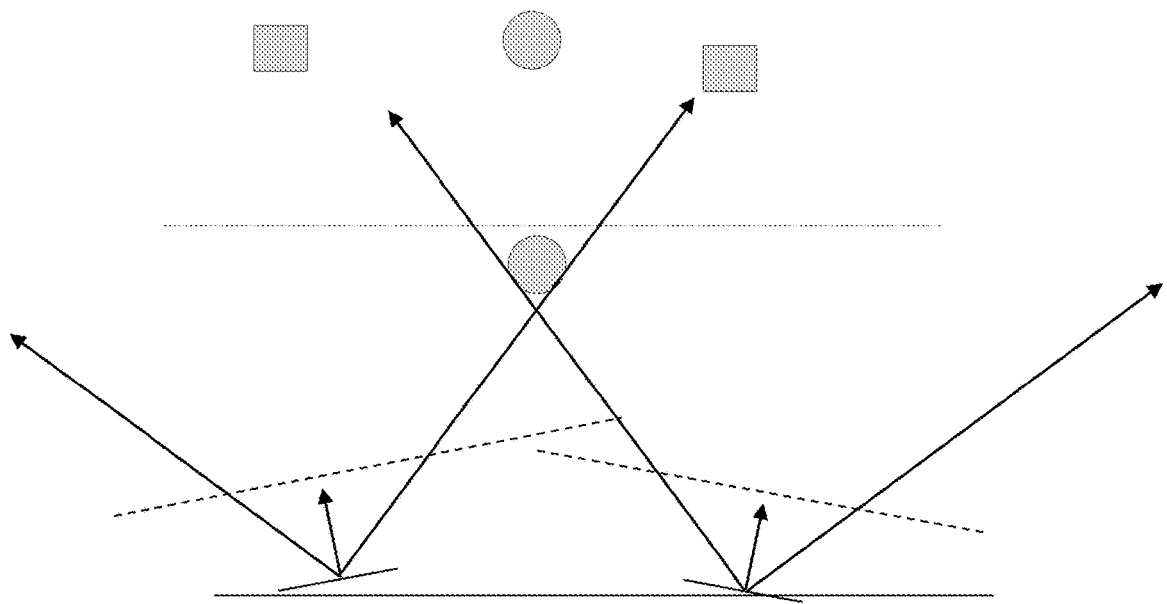

FIG. 24 demonstrates the effect of putting lenses under a different angle. Clearly, one has to decide based on different criteria, for instance how wide one wants to make the panoramic image and how close one wants an object to be in order to be put on an image. Quality of lenses may also play a role. Once the decision is made on the angle of the lenses, unless one installs mechanisms to rotate or move lenses, the angle and position of lenses are pretty much fixed. One can then make an assembly of lenses with lenses fixed to be put into a camera, or one may put 2 or more lenses in a fixture on a camera.

In both cases one most likely will have to calibrate the active sensor areas related to the fixed lenses. In a preferred embodiment the lenses will be put in an assembly or fixture with such precision that determination of active sensor areas only has to happen once. The coordinates determining an active area or the addresses in a memory wherefrom to read only active area image data may be stored in a memory, such as a ROM and can be used in any camera that has the specific lens assembly. While preferred, it is also an unlikely embodiment. Modern image sensors, even in relatively cheap cameras, usually have over 1 million pixels and probably over 3 million pixels. This means that a row of pixels in a sensor easily has at least 1000 pixels. This means that 1 degree in accuracy of positioning may mean an offset of 30 or more pixels. This may fall outside the accuracy of manufacturing of relatively cheap components.

While an image sensor may have 3 million pixels or more, that this resolution is meant for display on a large screen or being printed on high resolution photographic paper. A small display in a relatively inexpensive (or even expensive) camera may have no more than 60.000 pixels. This means that for display alone a preset active area may be used in a repeatable manner. One would have to downsample the data generated by the active image sensor area to be displayed. There are several known ways to do that. Assuming that one also stores the high resolution data one may for instance selectively read the high resolution data by for instance skipping ranges of pixels during reading. One may also average blocks of pixels whereby a block of averages pixels forms a new to be displayed pixel in a more involved approach. Other downsample techniques are known and can be applied.

In a further embodiment one creates an assembly of lenses and associates a specific assembly with a memory, such as a non-erasable, or semi-erasable or any other memory to store coordinates or data not being image data that determines the image data associated with an active area of an image sensor. One does this for at least two image sensors in a lens assembly, in such a way that an image created from combined data generated by active image sensor areas will create a registered panoramic image.

A large market for panoramic cameras is the smartphone market where the smartphone camera is a preferred if not only available camera. The smartphone market is constantly evolving with better cameras (better lenses, higher resolution sensors, better software) and higher resolution smartphone screens. In a way this acts against installing stitching software on a multi-camera smartphone, at least for generating real-time panoramic video. Aspects of the present invention can actually address certain issues that currently hampers wider use of generating real-time panoramic images. A real-time panoramic video is a panoramic video image with a frame-rate of at least 12 frames per second and preferably a frame-rate of at least 24 video frames per second. A real-time static panoramic image is a panoramic image that is generated within preferably one second after activating a camera to take an image.

A next issue is then what a quality panoramic image is. A panoramic image by itself is an image of a scene that is a combination of two or more images of the scene, wherein a field of view provided by the panoramic image is greater than the field-of-view of a single image in the combination. A low quality panoramic image is one wherein two images of the combination are noticeably coming from different cameras and/or different exposures. Edges on the different images in a high-quality panoramic image highly match. That is, all pixels on edges of the images align and any misalignment is only detectable after careful studying images preferably under condition of enlargement on a screen. However, there may be a color difference between images as edge areas are not blended or equalized. Furthermore, overlap in images is affected by uncorrected distortion. Medium quality panoramic images also have good alignment, edge and/or transition areas are equalized or blended so there is little noticeable transition in color or focus between images. Overlap quality is good. A careful review may show some distortion. However, on a small screen of a smartphone for instance smaller than 5 by 7 inch, the quality is good and better than acceptable and definitely better than low quality.

A high quality panoramic image is of a quality wherein an average viewer viewing the image on a screen considers a panoramic image as being of a similar quality as a single camera/single exposure image. It is acknowledged that a quality measure for an image is subjective to viewers. One measure of quality (low, medium, high) is applying the above criteria to a group of 20 viewers who each are smartphone users and who are reviewing panoramic images on a screen of a smartphone according to criteria provided above. Each image may be viewed for up to 5 seconds in a normal viewing mode by a reviewer. A normal viewing mode is how a reviewer looks in daily life normally at an image on a smartphone. A reviewer provides a quality measure as above to the reviewed image not reviewed longer than 5 seconds. The 15 highest ratings for each image determines a quality measure of a panoramic image. The same applies for static images and video images.

As previously explained, there are at least two ways to create a panoramic image. The first one is stitching of two images. This is a highly processor intensive approach which makes creating real-time stitching of high-quality images for video difficult if not unattainable in commercial smartphones. An example is the article Hardware-accelerated video stitching on GPU by Vincent Jordan, Oct. 29, 2020 downloaded from https://levelup.gitconnected.com/faster-video-stitching-with-opengl-9e9132c72def which is incorporated herein by reference. Achieving real-time panoramic video appears not to be achieved, while a high-quality panoramic video (but not real-time) was generated.

The problem of real-time image stitching is further explained in Real-Time Image Stitching, CS205 Computing Foundations for Computational Science Final Project, Group 4: Weihang Zhang et al. Harvard University, Spring 2018, published on https://cs205-stitching.github.io/ (hereinafter: "Zhang") and incorporated herein by reference. This article explains where computational bottlenecks are in stitching in a section called Profiling. It shows execution time for stitching images of different resolution. It shows that keypoint detection, description and matching cause a significant amount in latency of image generation. Warping estimation or transformation estimation may be another source of latency.

In a medium quality panoramic image one may skip warping to counter distortions if one applies sufficient image overlap so common distortion areas are minimized. However, Zhang indicates that for resolution of 2016×1512 pixels warping latency may be acceptable in latency. That means if one can eliminate or diminish keypoint processing then warping may play a not limiting role. In accordance with an aspect of the present invention keypoint processing is eliminated or limited to a small area of less than 50 pixels, preferably less than 25 pixels and more preferably less than 5 pixels and most preferably 1 pixel or less by fixing keypoints in the images by setting the active areas of the image sensors as described herein. Eliminating or reducing these processing steps may dramatically increase the generation of real-time registered and/or panoramic images and especially panoramic video images.

As explained earlier above, one may eliminate certain if not all parts of processor stitching when one creates a combined image from pre-determined active areas of individual areas of image sensors in a multi-camera panoramic camera. The actual active area of a sensor has to be at least as great and preferably greater than the selected active area of an image sensor. It has also been explained that certain shape and perspective distortions as well as color distortions may happen. The distortions may be limited by constructive measures in creating the multi-sensor camera, for instance by using curved image sensors.

A significant amount of lens distortion takes place at the edges or at least the outside of the sensor area illuminated by the outside of a lens. One measure to counter that is to use high quality lenses (or lens combination) and/or to use as selected active areas of an image sensor the area that is least affected by lens distortion. This is what one may call area of image overlap, with the understanding that image sensors do of course not overlap, but images of a scene generated by different sensors in a multi-camera may.

Assuming one has minimized lens distortion areas, one may then further minimize distortion or other misalignments by aligning cameras in a multi-camera setting as good as possible. First of all one should use cameras that have well defined properties. They also should in at least one embodiment be as identical or similar in properties as possible. If one selects matching merge-lines in sensors that may generate overlapping images, the image pixels on that merge-line of both sensors should be as close to identical as possible with close to or perfect overlap. A translation of one or more pixels in a vertical direction of a merge-line may be corrected by translation of the pixels in a memory so that they are aligned horizontally. This means that a horizontal line or feature in a scene recorded by multiple cameras will show up as a continuous line in the combined image constructed from the selected active areas of the sensors. Multiple cameras in a multi-camera panoramic camera should be fixed in a body in an aligned manner.

Figure 7:
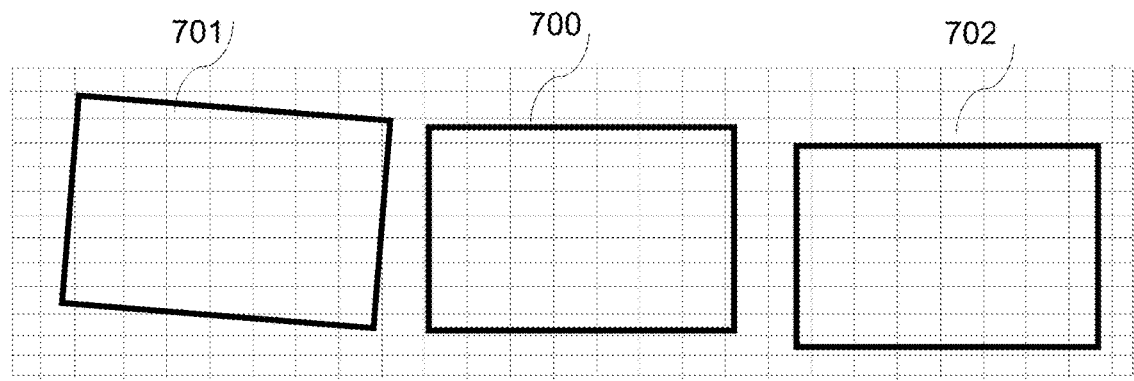
FIGS. 7, 8 and 9 illustrate a panoramic image created in accordance with a further aspect of the present invention.

Lines in a horizontal direction should continue in a horizontal manner. This means that sensors should be rotationally aligned. Image sensors in general have arrays of physical pixel elements to record light intensity. The reading of pixels generally happens along an axis of the array. One may correct misalignment by modifying the reading line of pixels to counter an unwanted alignment. However, in one embodiment one makes sure that rotation of one sensor compared to another one is absent or held to a very low angle. Alignment, translation and rotation are illustrated in FIG. 7 and FIG. 8. It should be clear that while sensors are drawn as in one 3D plane, in reality they may be located in different planes to create sufficient overlapping images when cameras have a common viewpoint from a single body.

The state of micro-machining, laser machining and micro-positioning is sufficient to ensure optimal alignment of small cameras in a smartphone to create well aligned cameras. There are actually different ways to achieve optimal, mechanical alignment. One may select static alignment, wherein all cameras are fixed in carriers and bodies and any correction, if needed takes place via image processing techniques on image data collected from selected active areas of image sensors. Another form is dynamic alignment wherein devices are used to tune and/or correct any misalignment.

Figure 25:
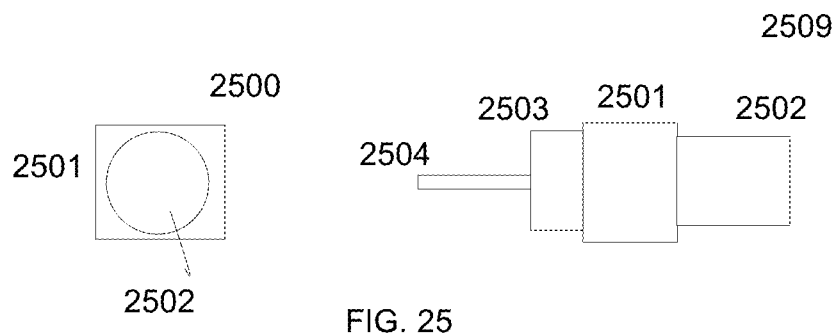
FIGS. 25, 26, 27, 28 and 29 illustrate a device to receive and hold a camera.

FIG. 25 illustrates schematically a small camera 2500 as currently used in smartphone cameras. From a top view one can see packaged lens system 2502 fixed on a body 2501. The same camera is schematically drawn in side view 2509, again with packaged lens 2502 on a body 2501 which contains the sensor and some electronics. A precisely machined base 2503 is fixed to 2501. The sensor may be placed on a rotational platform that may be rotated by an axis 2504 that sticks out of 2503. Not shown are connectors and leads required to power the camera and to collect image data and required microelectronics. These parts are known and standard on micro-cameras and are omitted as to not over-crowed the drawing. Preferably at least two or three or more cameras 2500 are identical and images taken by cameras 2500 held in identical position and orientation will generate identical and overlapping images.

Figure 26:
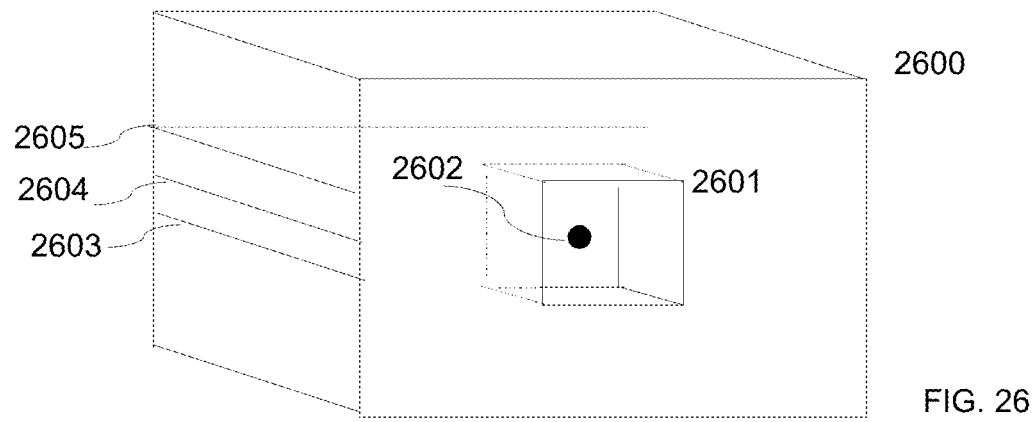

FIG. 26 illustrates schematically a camera carrier 2600, which may be made of metal or ceramics or a synthetic plastic a combination thereof and has a precisely machined or constructed opening that is configured to receive and seat base 2503 of camera 2500. If 2500 has an axis then 2600 is provided with a through hole 2602 that is partially shown in FIG. 26. The axis may be driven by an external motor or rotational source that allows rotationally aligning the images sensors to a preferred position. In one embodiment a rotational or motor source may be internal to 2500 so that no external source is required. This allows for dynamic alignment.

The state of the art in micro-forming, micro-machining and micro-ablation either with lasers, injection molding or other means is such that both 2500 and 2600 may be manufactured with ultra-precision on a close to nano-meter scale. Physical pixels or pixel elements on an image sensor have a size in the order of 1 micron, which is well documented in the technical literature. This means that alignment of cameras may take place on a pixel element scale or better if required.

A minimum of two cameras is required to form a panoramic multi-sensor camera. In some cases one would desire the opportunity to take a single picture (and not a panoramic picture). In that case it is beneficial to have a central camera in 3 or more cameras that may be switched to single camera mode and that then applies its entire usable sensor area and skips the parts of generating a panoramic image. The camera may later be switched back to panoramic mode. With the understanding that a panoramic camera may have few as two cameras, as an example of a 3-camera panoramic camera an embodiment of a 3 camera carrier is illustrated in FIG. 27.

Figure 27:
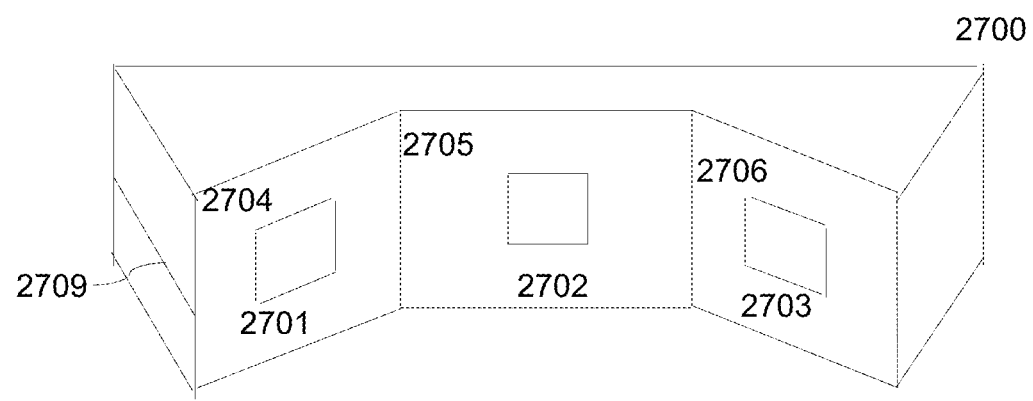

A body 2700 to seat and hold cameras as illustrated in FIG. 25 is illustrated in FIG. 27. The body has three precisely dimensioned openings or windows 2701, 2702 and 2703 each enabled to receive and accurately position and seat a camera as illustrated in FIG. 25. Each window may be dimensioned as in FIG. 26 to receive and accurately seat a camera as in FIG. 25. The structure 2700 is called a calibrated body. This means that a camera 2500 positioned into windows 2701, 2702 and 2703 are correctly positioned to establish active sensor areas that are aligned horizontally and rotationally to generate aligned images from the active areas of the cameras in 2701, 2702 and 2703.

The body 2700 has three faces i.e. 2704, 2705 and 2706 with respective receiving windows 2701, 2702 and 2703. The angle of the surfaces with receiving windows is predetermined to create a desired set of aligned images. A body 2700 may be manufactured in different ways. For instance one may start with one body, for instance from ceramic or metal or thermoplastic that is machined into a desired shape. One may also form the desired shape by high-precision injection molding. One may also form individual blocks that are shaped and then combined into body 2700.

It is further understood that the drawings present one embodiment that may be improved with different variations. For instance micron and submicron precision may make fitting the camera 2500 into a window 2701 for instance very difficult, due to alignment requirement. This may be solved by shaping opening 2601 in a funnel-like manner with an opening that is wider than the base 2503 and is tapered to guide the camera into its correct position when it is inserted into a window. The guiding may be further assisted by additional shaping of the window and the base, for instance by using tapered polygon shapes. The purpose of the shapes is that a window is enabled to receive a camera with a base and that seats the camera securely and with high precision when it is fully inserted into the receiving window. Additional bonding may be used to permanently hold the camera in its window. The shape of a base 2503 may also be cylindrical or ellipsoidal with a shape matching the base of window 2601. Preferably the base 2503 and the rear or inward side or face of 2601 are matching so when the bottom of 2503 rests or is seated on the rear of 2601, the camera axis of 2500 is pointed in a desired angle relative to the body of 2700.

Accordingly, shapes as provided herein are to demonstrate matching inserted and receiving shapes to securely and accurately seat cameras in the body 2700.

Mass production may create cameras and/or bodies that do not entirely meet the accuracy requirements of a panoramic camera. In that case one may decide to use a dynamic seating process. For instance, the size of a window 2601 may be slightly larger than the base 2503 and additional measures are required to fixedly seat the camera in its receiving window. The axis 2504 placed through opening 2602 may be used to correctly position the camera. In one embodiment the camera is activated during its seating and the body 2700 is held in a fixed position and all windows face a preset calibration scene on a predetermined distance. The calibration scene may be one panel or it may be 3 panels or as many panels as there are camera windows in 2700. The calibration panel may also be a curved panel. During calibration one camera that is activated before permanently seated in window 2702 is positioned so that a pattern from the scene with horizontal and vertical lines is optimally aligned with a pattern generated by the sensor of the camera being positioned in 2702.

Positioning of the camera may take place by a micro-precision robot arm that holds the camera for instance at axis 2504 placed through opening 2602 at the rear of 2700. The robot arm is enabled to rotate and translate the camera over any desired angle and distance, which preferably is determined by the need for correctional movement. In that case all dimensions of the window and through opening 2602 have dimensional tolerances to allow correctional movement. Placement of cameras in 2701 and 2703 follow a similar process, with as additional condition that alignment takes place relative to an image generated by the camera in 2702 during calibration. This calibration process ensures that there is an optimal alignment and at least not a visible mismatch between the cameras. Preferably the robot arm has all required freedom of movements in rotation and translation to optimize alignment. Furthermore an active area of an image sensor has already be determined, for instance based on the desired field of vision of the panoramic camera and on the known properties of the camera lens or lens set. Calibration will take place based on preset merge lines and active areas. Mismatch, translational misalignment and rotational misalignment may thus be prevented or at least minimized, so that minimal processing is required to generate a panoramic image.

One the positioning and optimization of the camera alignment is completed, which in FIG. 27 pertains to three cameras, but may be 2 or more cameras in desired location in a body, the cameras have to be fixed in place so the robot may release its grip. Fixing may be achieved by mechanical means, such as screw like pins that firmly holds a camera in place, or bonding or cementing the cameras in place. Once the cameras are fixed, the robot may release its grip and the body may be removed from its holding platform.

The static and dynamic positioning differ in several aspects. One main feature of static positioning is that dimensions of all parts are such that placement of the cameras in precisely dimensioned windows and surfaces guarantees placement of cameras within preset tolerances. In a hybrid form, cameras are placed in accurately dimensioned windows and minor correction, for instance placement in depth of window or a minor rotation to counter manufacturing deviations of the camera are enabled. This requires of course some wider tolerances in the dimensions of the windows.

A body that seats or receives a camera as in FIG. 26 and FIG. 27 does not have to be closed. For illustrative purposes several horizontal cutlines 2603, 2604 and 2605 are shown in FIG. 26. A horizontal cut provides easier access to the window 2601 and provides space for dynamic positioning as well space for electrical leads from the camera. It is to be understood that a cut may be a real cut into a workpiece for 2700. A cutline may also be an edge of a body that determines the dimensions of a workpiece like 2700. The same reasoning applies to the body 2700 where a cutline 2709 which is one of many possible cutlines or dimensional limitations in body 2700.

A body 2700 may now be packaged in a covering body and with dimensions and fixtures to be placed in a camera body or housing, in a smartphone, in a laptop, in a security camera housing, in a tablet housing or in any housing for holding a panoramic camera.

Figure 28:
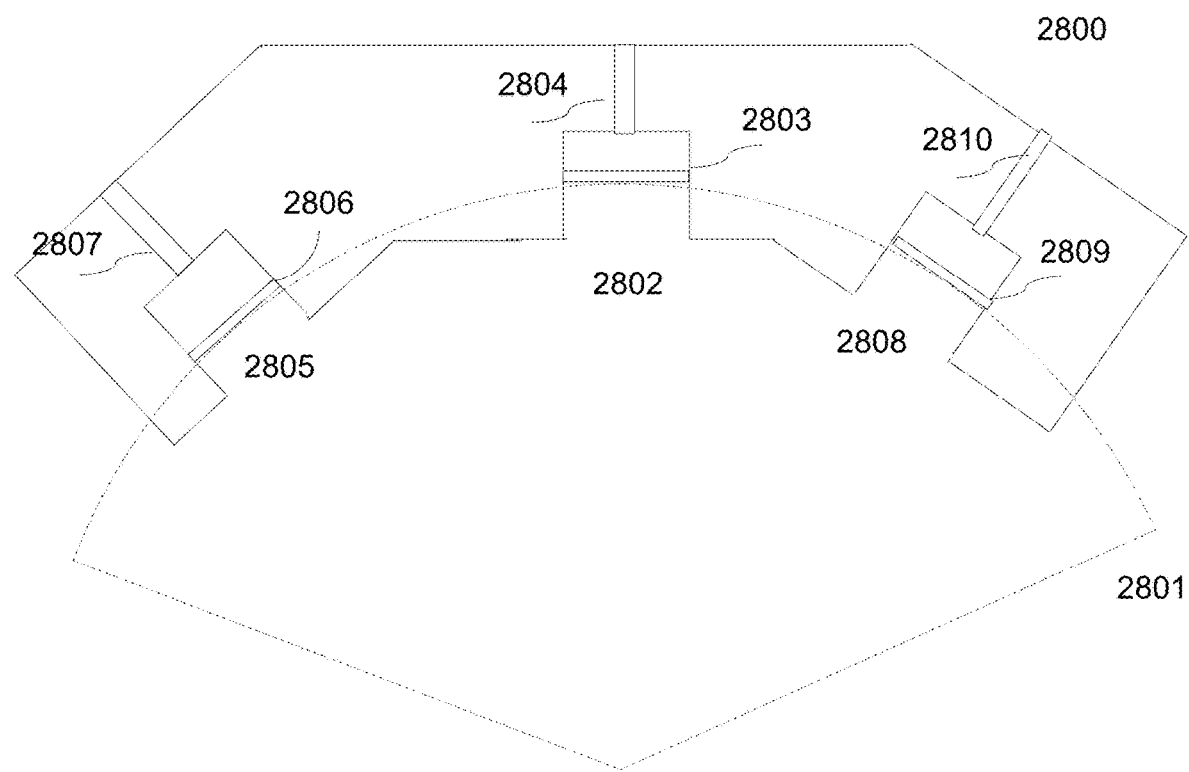

FIG. 28 illustrates positioning and shape of the windows 2805, 2802 and 2808 in a body 2800 in a top view cross-cut of a body as illustrated in for instance FIG. 27. The view of FIG. 28 cuts through the 3 windows now identified as 2805, 2802 and 2808. A preferred position of image sensors of cameras seated in the windows is illustrated as 2806, 2803 and 2809. Also shown are through openings 2807, 2804 and 2810 which may be used to put through the axis of a camera to be gripped by a gripper of a positioning arm, which may be a robot arm. The position and shapes of the windows and openings should preferably be such that the image sensors in preferred positions 2806, 2803 and 2809 are positioned tangential to a virtual circle 2801. Images taken by cameras in those positions are well suited to create a panoramic image.

Figure 29:
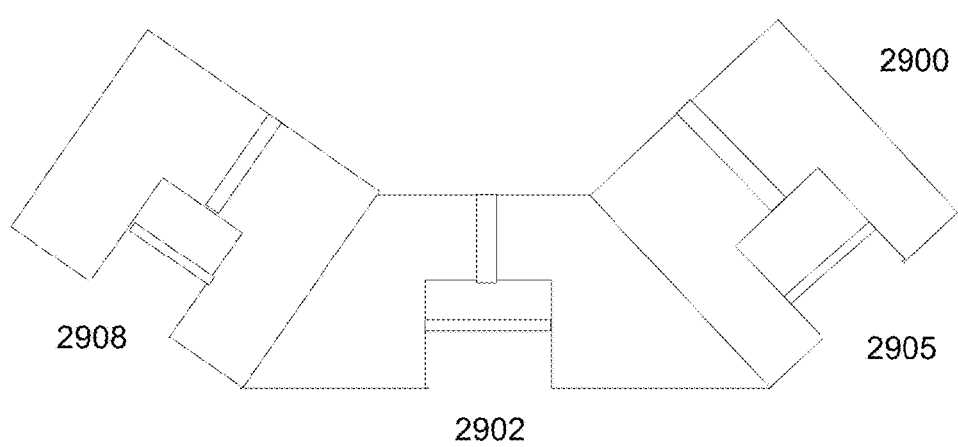

A further illustrative embodiment is schematically shown in FIG. 29. One may say that the body 2800 as shown has a concave shape relative to the housing as it dips into the housing. FIG. 29 body 2900 shows a modified form that sticks out or has, as shown, a convex shape. The position of the center window has been maintained but, from perspective of the central camera in 2802 the right looking camera in 2808 has been moved to window 2908 or is now positioned to the right of the viewing direction from 2902 and left viewing camera in 2805 has been moved to the left of 2902 in 2905. The embodiment as in FIG. 29 may better accommodate to a shape of the housing of the panoramic camera or smartphone. The drawing of FIG. 29 shows different parts of a body 2900. It is contemplated that 2900 (like 2800) may be a combination of parts. However 2900 and 2800 may also be formed from a single piece of material that is machined, injection molded or 3D printed or otherwise formed in a single body.

Figure 31:
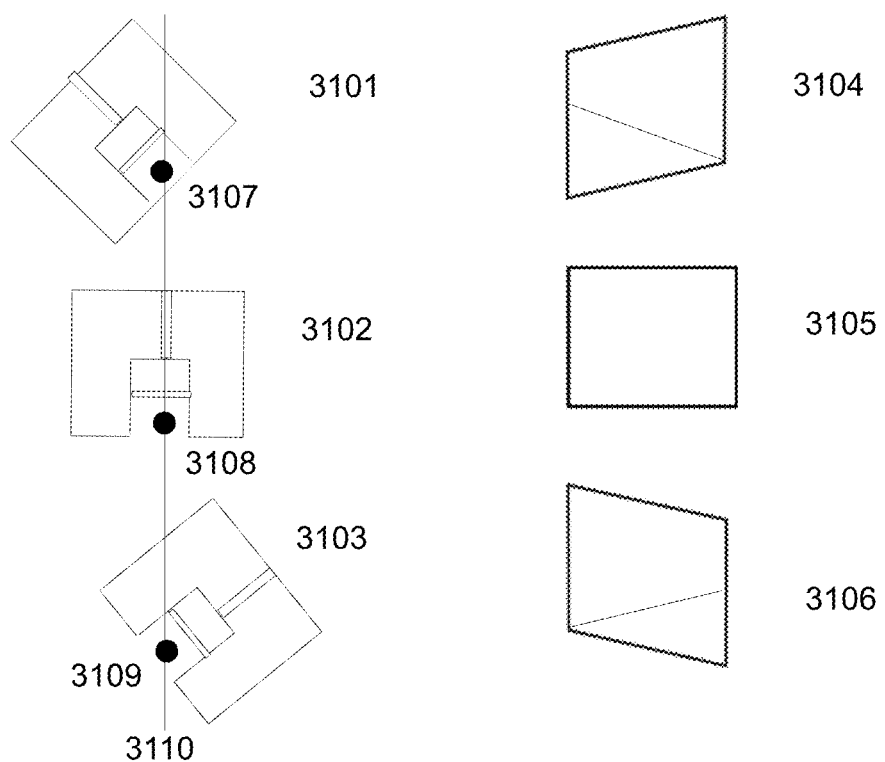
FIG. 31 illustrates schematically a device for holding multiple cameras.

Camera holding bodies illustrated as 2509, 2600, 2700, 2800, 2900 and in FIG. 31 are high accuracy manufactured bodies within precise tolerances that guarantee alignment of cameras within precise and well defined tolerances that are sub pixel size and are called calibrated bodies herein.

It is known that a combination of curved lenses and a flat projection surface, such as an image sensor creates image distortion and resolution problems at the fringes of the image. To address the negative effects of a flat focal plane fairly complex and volume requiring lens combinations are required. Physically, negative projection effects may be prevented or substantially minimized by using a curved focal plane, or a curved image sensor that matches a lens and that effective increases a distortion limited and high resolution active and usable area of an image sensor without extensive image processing.

Curved image sensors are known and were mainly a lab-oriented solution for addressing focal issues. One example is U.S. Pat. No. 9,560,298 issued Jan. 31, 2017 to Lewkow et al. which is incorporated herein by reference. Other examples are US Patent Application 2019/0035718 published Jan. 31, 2019 to Seddon et al, and U.S. Pat. No. 10,304,880 issued May 28, 2019 to Kim, which are both incorporated herein by reference. The article: Highly curved image sensors: a practical approach for improved optical performance, by Guenter et al., 2017, and downloaded from oe-25-12-13010.pdf (osapublishing.org) which is incorporated herein by reference details technology to create a curved image sensor. Silina, a company located in France recently announced successful creation of a waferscale manufacturing of curved sensors. Some details may be found at an i-Micronews article entitled: SILINA, a deep tech startup . . . —An interview by Yole Developpment dated Apr. 22, 2021 and available at https://www.i-micronews-.com/silina-a-deep-tech-startup-to-curve-cmos-image-sensors-at-industrial-scale-an-interview-by-yole-developpement/?cn-reloaded=1 which is incorporated herein by reference.

Figure 30:
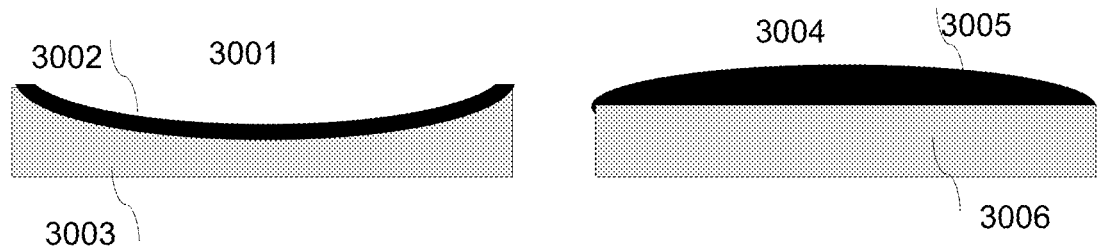
FIG. 30 illustrates a curved image sensor.

There are commonly two shapes of curved image sensors: 1) concave as shown in FIG. 30 3001 in cross-section and 2) convex as shown in FIG. 30 3004 in cross-section. The shape may be close to or identical to a section of a sphere. A cross-section of 3001 or 3005 in a direction perpendicular to the current view will generally show a similar cross-section. In some embodiments the curvature may be only on 2 opposing sides, like the vertical sides of a sensor, but may be flat on the top side and the bottom side. Furthermore, in some embodiment a curvature is created only at the edges of the sensor, like in the 10% or 5% of the edge area, while the center is flat. Generally a photo sensitive array, for instance of CMOS elements 3002 is paced on top of a carrier or substrate 3003 in the concave case and a CMOS array 3005 is placed on substrate 3006 in sensor 3004.

It is to be understood that the structure of 3001 and 3004 beside being curved is like a normal (flat) image sensor and contains several layers, including interconnection and outside lead connections and others, which have been omitted from FIG. 30 as to prevent overcrowding of the drawing, but are of course included.

The construction of the panoramic camera in accordance with an aspect of the present invention is formed from individual cameras with curved image sensors, which may be concave image sensors, but may also be convex image sensors. The use of curved image sensors affects the structure of the individual cameras. It may make them smaller, due to simpler lenses and improves the quality of images at the edges. In general, higher quality panoramic images may require an overlap of around 10% to 20% of the field of view of individual cameras. One may apply smaller overlap with curved sensor image sensors, like 10% or even 5%. One may also reduce demands on warping operations or homography operations by a processor to diminish image distortion in the generated image. One may also use cameras with a smaller field of view and smaller, curved image sensors and use more cameras with limited overlap to create panoramic images.

A curved image sensor may also provide better quality at the top and bottom of an image. In accordance with an aspect of the present invention, cameras are stacked in panoramic manner with image overlap in a housing. This allows cameras to be stacked with a common no-parallax point (NPP) or a vertical axis through a common NPP. The small sizes of cameras would provide limited vertical parallax that may be ignored for relatively remote scenes and may be addressed by a translation of image data in storing the combined data of a panoramic image. A choice has to be made what supposedly is worse: vertical or horizontal parallax.

Vertical stacking of individual cameras is illustrated in FIG. 31 with 3 stacked camera windows 3101, 3102 and 3103 in cross-section, each with a presumed no-parallax point (NPP) to position received cameras being 3107, 3108 and 3109 respectively. The camera windows and received cameras are stacked vertically with their expected NPPs being aligned on a virtual axis 3110. The camera windows are positioned in a body so that 3101 and 3103 have an optimal angle for image overlap of received cameras. In a front view of the body one sees window 3105 that receives a camera pointing perpendicular to a body or housing of a panoramic camera and/or smartphone. A viewer facing the panoramic camera sees window 3104 turned to the right and window 3106 turned to the left. Preferably the windows and thus the cameras are stacked as close as possible, wherein the distance between the top of the lens of camera 3101 and the bottom of the lens in 3103 is preferably equal or less than 3 cm, more preferably equal or less than 2 cm, and more preferably equal or less than 1.5 cm.

Cameras should be positioned so that images generated by the sensors have in overlap regions preferably at least one vertical image line fully aligned. A vertical image line is an image generated by pixel elements in the same column of a pixel array on an image sensor.

It is to be understood that embodiments as illustrated in FIG. 25, FIG. 26 and FIG. 27, FIG. 29 and FIG. 30 are illustrative examples and that different embodiments ranging from 2 to more than 3 cameras may be constructed and are fully contemplated.

Figure 32:
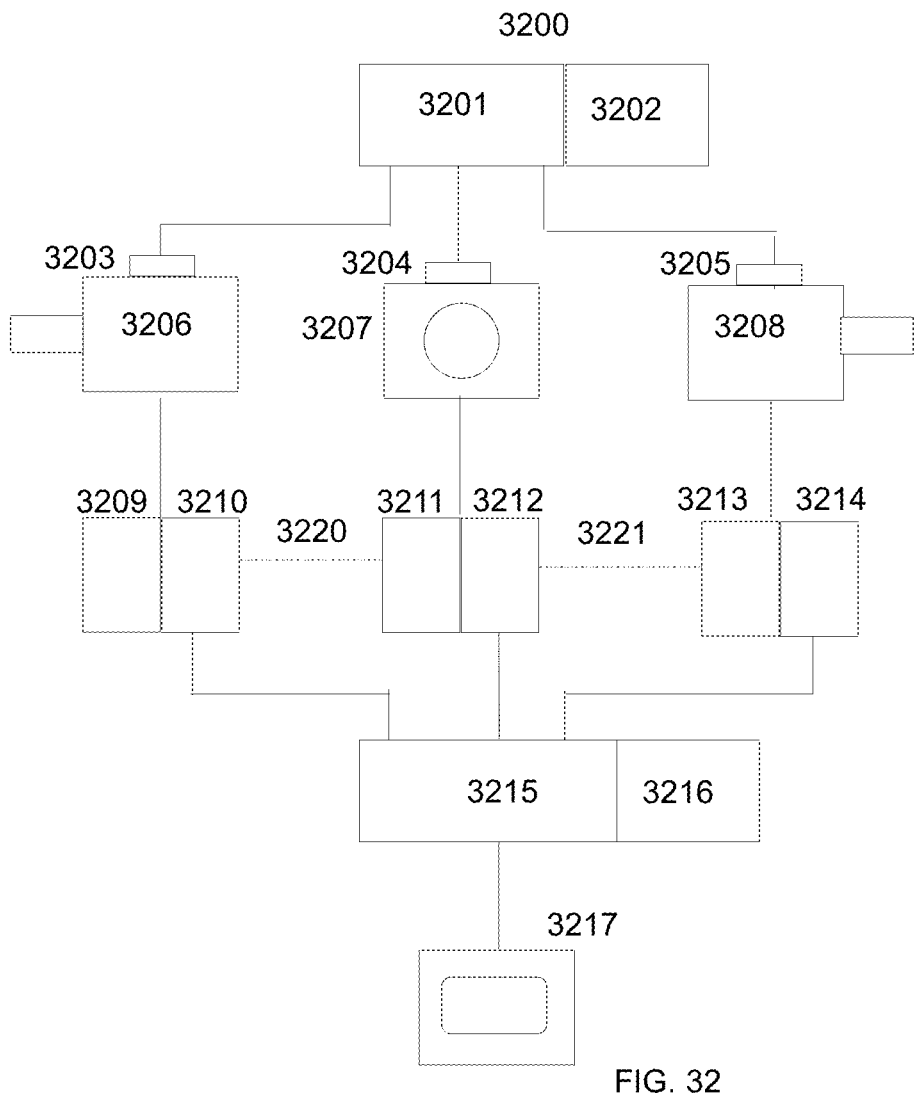
FIG. 32 is a diagram of a system for panoramic video recording in accordance with an aspect of the present invention.

Data from image sensors may be read horizontally or vertically in accordance with scan lines as will be explained later. Preferably image sensors are aligned and have a merge line that defines an active area of each of the image sensors. Each sensor may have a different active area. Preferably an active area is defined by a border line or merge line (mergeline) that is a column in an array of image sensing pixels as is known in the art. A horizontal scanline of an image sensor may be a line of n=1600 pixels in unmodified form. A camera may be a central camera as one of 3 cameras as illustrated in FIG. 32. Assume for illustrative purposes an active area that is 90% of the usable area of the image sensor of the central camera. The cut-off areas may be symmetrical. This means that the active data of a horizontal scan-line is used after the first 5% or 80 pixels, so storage starts with pixel 81 on a scan line and continues until pixel 1520 and the remaining 80 pixels of the 1600 pixel elements are not used for generating stored data. A pixel element on a CMOS image sensor is generally a combination of 4 photo elements with a Bayer filter for color detection and reconstruction. In one embodiment of the present invention, the active area of an image sensor forms a rectangle in shape that is smaller than the usable part of the image sensor.

FIG. 32 illustrates schematically a camera or camera system 3200 in accordance with one or more aspects of the present invention, enabled to generate a registered image, preferably a video image, in real-time at a speed of at least 10 frames per second. It has been noted herein and in the literature that the aspect of finding common overlap and stitching areas is one of the most processing intensive operations to form a combined panoramic image, which may be part of a panoramic video. This aspect is addressed by having individual cameras in a calibrated and defined position, each with a calibrated and well defined active image sensor area that is smaller than the total usable image sensor area. One is referred to sections above. Preferably, cameras are used that are identical or as close to identical as possible and which are calibrated so a warping may be determined to correct distortions as required. Furthermore, related frames taken at the same time or about the same time should be synchronized. There are several ways to do that, depending on the used video shutter system. The issue is identified and solved in for instance Chapter 20, Camera Synchronization for Panoramic Videos, Gaddam et al. Springer International Publishing AG, part of Springer Nature 2018 M. Montagud et al. (eds.), MediaSync, https://doi.org/10.1007/978-3-319-65840-7_20, as part of the Bagadus video training system, 2018, which is incorporated herein by reference. Shutter control may be enforced by using a common trigger signal, which is easy to distribute of a multi-camera system of identical cameras. A clock signal with appropriate properties (repetition rate and if needed duration of activation) is generated from a clock signal circuit as known in the art.

Furthermore, the identical or close to identical cameras are calibrated for color and if needed color correction or blending. While color interpretation should be identical and images are taken at essentially the same time, the cameras have different orientation potentially leading to some color mismatch. This will not be as severe as taking images with different types of cameras and stitching images taken at different times, but some blending may be required. Several issues related to video image stitching are described in an interesting thesis: Wei Xu, Panoramic Video Stitching, Ph. D. Thesis, University of Colorado, 2012, from https://scholar.colorado.edu/concern/graduate_thesis_or_dissertations/02870w10j ("Xu") which is incorporated herein by reference. The thesis deals with several important issues, but deals specifically with color adjustment/correction.

Returning to FIG. 32 being a multi-camera system 3200 using for illustrative purposes 3 cameras 3206, 3207 and 3208, preferably fixed in a single body. The number of cameras is at least 2, shown is one set of 3 cameras for illustrative purposes. However, there may be more cameras. Images (and related image sensor areas) may be aligned in multiple rows. Preferably, the cameras are identical or close to identical. Close to identical means that a calibration of the optical characteristics including distortions and color interpretation apply to all cameras without a need for individual calibration. In one embodiment of the present invention, a calibration difference between individual cameras is not more than 5% and preferably not more than 1% and more preferably less than 1%. Thus using identical calibration and correction for each camera will generate a minimal and preferably acceptable distortion in a generated panoramic image.

Furthermore, individual cameras are positioned so that a minimum or acceptable amount of distortion is created and preferably curved image sensors are applied to minimize need for warping of correction.

Assuming an optimal positioning of cameras 3206, 3207 and 3208 so that vertical alignment or almost perfect vertical alignment of image sensors is achieved. The active areas of the individual cameras are determined during a calibration step. Furthermore, the need for color correction and warping for correcting distortion is also determined. The need for correction may depend on a distance of a scene to the camera, lighting conditions and situational orientation. Situational orientation is the placement and orientation of objects in a scene relative to the cameras. For instance, one scene may be a mountain range in a distance, which will require almost identical distortion correction for each camera. In one situation a central and left camera are directed to a remote scene, while the right camera captures objects that are closer by. Presumably an image generated by the right camera may require more correctional warping. Furthermore, certain lighting conditions generating shadows may require more color correction in one camera.

During calibration, different scenes and scene scenarios may be recorded and adjusted. It may require different determination of merge lines, blending operations and warping operations. Color blending may be restricted to a limited transition area between image sensors, or to different levels of color correction as the image is processed from an edge to a center. A number of conditions may be captured and parametrized as to which corrective operation should be applied. The conditions may be parametrized based on one or more readings from light measurement and distance measurement by for instance an autofocus mechanism.

Camera color is defined in a color space, for instance RGB (red-green-blue) color space. Derived from RGB is the YCrCb color space. Another color space is the Lab color space. So is CMYK. Color correction methods are available in different color-spaces and are described in the literature and are available for instance in OpenCV and the earlier mentioned Xu reference.

A problem in current panoramic image technology is that common points have to be determined and the need for correction. This generally means that huge amounts of image data have to be retrieved from memory, processed and restored in matching status. By using pre-determined active sensor areas, much of this may be avoided, which dramatically increases the speed or rather reduces the latency in generating a panoramic image. Furthermore, because each of a limited series of conditions has a fixed parameter, it may also be assigned to a corresponding corrective computer processing. During calibration one may vary the conditions and for each condition vary the solution parameters that provide an optimal or at least an acceptable image. Preferably one operates as long as possible on raw (not Bayer de-mosaiced) image data. This approach in accordance with an aspect of the present invention allows for parallel processing of image data of at least each camera, rather than the processor/memory intensive processing of an entire very large panoramic image.

Stitching may be ultimately then no more than reading the image data of the processed image data generated by the active areas of the images sensors of the individual cameras. Processing image data of individual cameras or even of sections of active areas of image sensors may create a tremendous speed-up of processing that fully enables real-time and preferably high-quality panoramic video images. The use of processor cores or separate GPUs for parallel processing of image data for generating panoramic images in many cases is limited by the requirement of retrieving and storing joint amounts of image data. This creates delays and latency in processing as the cores or GPU processors or waiting for data being transported. In many cases there is a limitation on how many processors or core threads are useful, which appears to hover around 5. This is different when one processes separate tiles or mosaics offline with huge memory and bandwidth availability. Speed ups of a factor 20 to 60 (from 26 minutes to 26 seconds) are no exceptions. However, the need for searching common points in different images prevents these speed-ups. Because of the novel approach of using pre-determined active areas, the parallel speed-ups are now enabled and further illustrated in FIG. 32.

A camera system 3200 of at least 2 cameras has a control processor 3201 and a memory 3202. The memory 3202 contains the settings, including setting of the active areas of image sensors of cameras 3206, 3207 and 3208. Further associated with the cameras are color correction, distortion correction, parallax correction, perspective correction and other desired corrections determined during a calibration. Each calibration setting is determined based on environmental conditions which may include one or more of: distance of a camera to a scene, a focus setting of a camera lens, a light condition and a temperature. Preferably distance and light conditions may be determined per camera. A temperature condition for a camera may be used for correction temperature effects on determination of active image sensor area to correct possible expansion effects.

In one embodiment there are two conditions per parameter per camera. For instance distance near and far, light bright and dim and no warping required. Each condition is then associated with its own settings for a camera. This may include a color correction based on calibration conditions or a calculated color correction based on shared pixels in overlap areas of image sensor areas.

One may also determine required warping for generating an optimal panoramic video image. One may also include a more fine-tuned set of conditions, such as distances form 3 feet, 6 feet, 12, feet, 24 feet, far away, very bright, sunny, overcast, dusk, dawn, object in shadow, flash light conditions, etc. Each distance may require different warping and different light conditions may require different color conditions. Parameters may be downloaded from memory 3202 based on determined conditions. Parameters may also be calculated from conditions, for instance based on image conditions.

Based on determined conditions controller processor 3201 may download parameter settings for each camera from 3202 and provide these to a local controller of each camera, such as local controller 3203 for camera 3206, local controller 3204 for camera 3207 and local controller 3205 for camera 3208. FIG. 32 illustrates connections between devices by single lines. This is to prevent overcrowding the figure with too many details. The connections may be dedicated serial or parallel connections. Connections may also be a shared bus structure as known in the art. By providing local memory and processing power, one may limit a need for too much internal data exchange which is known to create significant latency in processing. Connections may be one-directional or bi-directional. Furthermore, a bi-directional bus structure allows data being exchanged between components for which no direct connections have been drawn.

Preferably each camera has its own processor, which may be a thread or core in a general processor, a GPU or GPU-like processor or its own dedicated processor to perform processing of the data of the active area of its image sensor, including warping if desired and color correction. While it may appear that all data per camera may be processed independently and autonomously, it may not be the case in some conditions. In that case it may be required for a processor to use data available from a neighboring camera. For instance a need for color correction may be determined from overlap image data by determining for instance a difference in intensity and color composition. Furthermore, a wider overlap may be required under certain conditions. For that reason "shadow" connections 3220 and 3221 are included in FIG. 32. It indicates a possibility to borrow or use data from neighboring cameras to determine a more accurate correction for instance. Camera 3206 has a dedicated processor or core or GPU or the like as 3209 and memory 3210 to store data generated by 3206 and to buffer data generated by 3209. In a similar manner camera 3207 has processor 3211 and memory 3212 while camera 3208 has processor 3213 and memory 3214. While lines 3220 and 3221 are drawn as shown in FIG. 32 they may exist at any place where such data is available, but prior to processing by local processors.

Multiple processors may be assigned to process image data generated by a single image sensor. For instance certain regions of an active area of an image sensor may be assigned to process image data from such a region. These cores work in parallel and are programmed with instructions that may be retrieved from 3202. For instance image data from an active area of image sensor 3206 may be processed by separate processing units, such as a processor core, a GPU or a dedicated FPFAs that work in parallel to generate image data that represents an image generated by an active image sensor area of camera 3206 and that is stored on for instance 3216 as part of a panoramic image or image frame in a video. Thus herein a processing group is a group of one or more processing units that is dedicated to process image data from a particular well defined active sensor area of a particular camera. In one embodiment in a group of 2 or more cameras in a panoramic camera system, a majority of image data of a first camera is processed in a first group of processing units and a majority of image data of a second camera is processed in a second group of processing units to form a single registered image which preferably is an image frame in a panoramic video. A single processor herein is a single circuit on a chip, and may also be called a single CPU. Current general processor chip are provided with multiple cores such as Intel® i5 with 6 cores. They are provided as a single multi-core circuit. A GPU is usually a single circuit device with a highly parallel architecture. One may create a multi-core GPU wherein each GPU core is assigned to a specific image region.

In one embodiment of the present invention the final image data is collected and stored in memory 3215 and may be processed for display (including de-mosaicing) by processor 3216 to display a panoramic video image on display 3217. The image data is being pipe-lined through the different threads as explained above, enabling a high-quality real-time panoramic video system from multiple cameras. The use of curved image sensors may further limit a need for distortion correction.

Throughput demands on processors, including frame size, number of frames per second, coding size of pixels, caching requirements, channel bandwidth and so on determines a performance of a processor controlled panoramic and stereoscopic camera. For instance a reasonable panoramic video image in a 256 grey scale at 10 frames per second may be easily realized in accordance with the current and prior disclosures. Especially the use of active image sensor areas as disclosed herein greatly reduces processing demands, making in camera processing of panoramic video images possible. However, pixel size of cameras and displays on smartphones continues to increase. Also framerates of video images also increases. This places again higher demands on processing power.

Image processing capabilities on commercially available processors including GPUs and FPGA systems is rapidly expanding. Many operations, including blending, lens distortion and perspective distortion correction are now possible for real-time video generation. Unfortunately, real-time panoramic video stitching appears to be always a step behind available real-time availability. That is why the herein disclosed approach is beneficial. As explained earlier, the search for overlap between images is one of the major sources of latency in achieving a high quality panoramic images in real-time. Because of the "active area" approach a selection can be made to address quality limiting distortions. One way to address this is to apply multi-core processors or single or multiple processors such as Graphic Processing Units (GPUs) or customized and optimized Field Programmable Gate Arrays (FPGAs). For instance Intel® Multi-core processors may be optimized and applied for generating panoramic video. Cores may be programmed individually as threads to process designated parts of images in accordance with pre-determined correction. Certain aspects are illustrated for instance in an Intel Patent Application US 2020/0074716 Published on Mar. 5, 2020 to Adam Kaplan, which is incorporated herein by reference.

NVIDIA® as a producer of GPU chips has long been involved in image processing. NVIDIA offers a set of tools in real-time image processing, including tools developed in OpenCV. An example of NVIDIA is real-time Homography is explained on the website entitled HomographyLab library by HUA Minh Duc available on https://www.i3s.unice.fr/hua/node/6 which is incorporated herein by reference. It shows a real-time warping of a video camera.

Customized FPGAs or image blocks from a library may be used. One example is the Xilinx® LogiCORE™ IP Video Warp Processor as explained in Video Warp Processor, LogiCORE IP Product Guide PG396 (v1.0) Jul. 15, 2021 which is incorporated herein by reference.

Real-time fisheye lens distortion correction is an application of image processing software that is described in M. Lee et al.: Correction of Barrel Distortion in Fisheye Lens Images Using Image-Based Estimation, IEEE Access, Vol. 7, 2019 downloaded from https://ieeexplore.ieee.org/document/8678625 which is incorporated herein by reference.

Ln accordance with an aspect of the present invention, the processing expensive step of finding object identifiers and matching images is avoided and only the required steps of color matching and distortion correction as available in the art are applied. This enables generation of good quality panoramic videos on a cellphone or smartphone screen, in color at framerate of 10 frames per second (fps), more preferably at least at least 24 frames per second, with at least a resolution of at least 480 p (854*480 pixels) per camera image, more preferably a resolution of at least 720 p (1280*720 pixels) per camera image.

In accordance with an aspect of the present invention, a lowest performance (10 fps) and 480p of panoramic video is executed on a smartphone, allowing a user/reviewer to see in real-time a panoramic video on a smartphone. At the same time all image data of at least 2 cameras and preferably of 3 or more cameras in the smartphone is stored on a memory in the smartphone. Preferably setting parameters like active image sensor area are associated with image frames and stored on a memory. The real-time panoramic video is created by sampling image data as generated by cameras, for instance using one in 4 image lines and ignoring three in 4 pixels on a line and using one in 6 frames.

Figure 33:
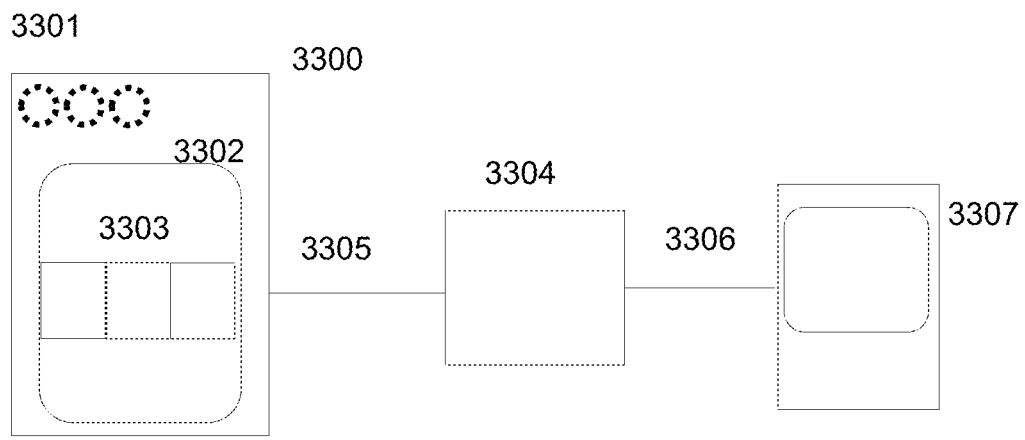
FIGS. 33 and 34 illustrate a system for creating panoramic images.

In accordance with an aspect of the present invention image data is processed off-line and not necessarily real-time in high-quality mode, such as 60 fps with 1080 or higher resolution. The processing may take place on the smartphone. For instance when the phone is not in use and may be connected to an external power source. All data (image data and processing parameters) may also be off-loaded to an external processor which may be more powerful. This is illustrated in FIG. 33. A housing 3300 which may be part of a smartphone or a camera housing has at least 2 and preferably 3 cameras 3301, illustrated in FIG. 33 as dotted lines as they are in this case pointed away from the viewer. A lower quality panoramic video 3303 may be generated in real-time on a screen or display 3302 for viewing by a user for instance. Based on an action by a viewer, the complete image and parameter data may be transferred via a connection 3305 to a processor based computing device 3304 for further processing. Connection 3305 may be a wire or a wireless connection. Connection 3305 may be one-directional or bi-directional. Device 3304 may have more or more powerful processors for generating a full quality panoramic video, compared to device 3300.

In accordance with an aspect of the present invention device 3304 generates a panoramic video off-line or with some latency. Device 3304 may upload the high-quality panoramic video back to 3300 for display on 3302. In one embodiment the latency of 3304 is negligible for viewing purposes and instead of on 3300 generated video 3303 a high quality continuous panoramic video generated by 3304 is displayed on 3300. The processing unit 3304 may then be a portable and mobile processing pack that may be connected by a user to 3300 when the need arises. In one embodiment a powerful image processing unit 3304 is an integral part of a panoramic video imaging system. This may be an automotive system wherein 3304 is built in or attached to the dash or other parts of a vehicle such as a car or a truck.

In accordance with an aspect of the present invention a camera system 3300 with at least 2 cameras and preferably at least 3 cameras 3301 is connected through a connection 3305 with a server 3304. The server 3304 may be a powerful server with sufficient processing capability to easily create a panoramic video in real-time. This may require a bandwidth of 25 Mbit/s per video channel upload for 3 channels from 3300 to 3304 and a download bandwidth of around 75 Mbit/sec for download of the finalized panoramic video from 3304 to 3300, if processing takes place in real-time. If bandwidth is available (as in 5G wireless, which goes up to 15 Gb/sec), one may thus receive a from a server a complete and high-quality panoramic video that is generated in real-time or close to real-time. The latency theoretically may be 2 video frames, but may be a bit longer due to equipment latency, especially memory or storage latency. At no or limited resource limitations, device 3300 receives and is able to display a high quality panoramic video with a delay of certainly not more than 1 second and preferably within 10 video frames, more preferably a delay of not more than 5 video frames.

In order to achieve such low latency a server 3304 has stored data required to process the 2 or 3 video channels from cameras 3301. This may include data or maps related to the image sensors and the active areas of these sensors, the calibration of lenses and the required correction (lens distortion, color distortion, perspective distortion) and position of cameras relative to a scene. Some of this data is camera dependent and may be stored already at the server. Conditional data such as focus distance, light condition and thus aperture related data may be determined during image recording and transmitted separately from 3300 to 3304. Part of a recording procedure may be a re-calibration of which the results may be transmitted to 3304. Based on system parameters and received image data, server 3304 is enabled to generate a high-quality panoramic video. Preferably, device 3300 transmits raw image data (not demosaiced) to 3304.

In accordance with an aspect of the present invention a system 3300 is a multi-camera system that generates at least 2 and preferably at least 3 different video images of a scene to an image processing system 3304 via a transmission connection 3305. The image processing system 3304 combines the video images into a high quality panoramic video which is transmitted via a channel 3306 to a display 3307. The combination 3300, 3304 and 3307 then establishes a real-time panoramic video broadcasting or streaming system. There may be some delay or latency between the cameras 3301 and display 3307. But because the delay is uniform, the appearance at 3307 is of a continuous panoramic system. A computing system 3300 is a single housing system such as a smartphone or a single housing multi-camera system.

Figure 34:
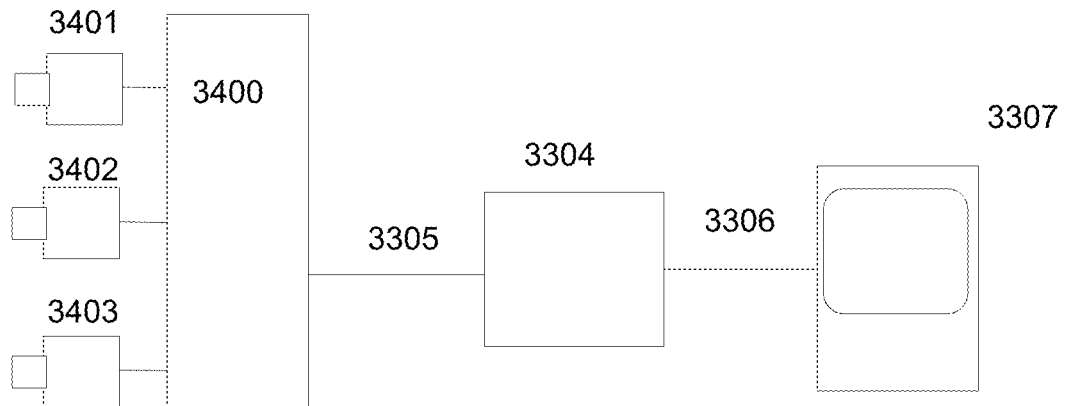

In accordance with an aspect of the present invention, a camera system is provided with at least 2 and preferably 3 cameras which do not have a common nodal point or no-parallax-point and may be located at a distance from each other as illustrated in FIG. 34. Cameras 3401, 3402 and 3403 which are preferably identical cameras with similar lenses and image sensors are positioned at a common scene. They have a focal length and/or a distance to a scene so that the cameras when their optical axes are parallel will record different parts of a scene. This may be when the focal length are relatively large and they record a scene relatively close up. Or the scene is so wide that a single camera cannot capture it. The cameras are preferably so positioned that a combination of images generated by the cameras from active areas create a panoramic image. Preferably there is limited translation and rotation of cameras and/or image sensors so that limited correction is required. With sufficiently high quality lenses or longer focal length limited distortion correction is required. The cameras signals are combined in computing device 3400 which may also control harvesting of active area signals of the individual cameras and management/control of camera parameters.

For instance cameras 3401, 3402 and 3403 may be part of a broadcast recording system of a sports field like a soccer or football field. A system as illustrated in FIG. 34 may also be part of a system that records a local scene in a relatively small room where cameras are for instance fixed in a wall. This allows use of a plurality of micro-cameras placed at regular distances that record an entire room.

An individual camera dedicated processor is herein a processing circuit, a CPU, a GPU, a processor core, a customized processing circuit like an FPGA that processes substantially image data generated by an active area of an image sensor of one of 2 or more individual cameras. Substantially in this context means at least 51%, preferably at least 60% and most preferably more than 70% of data processed during a video frame period is image data generated by an active area of an image sensor of one of at least 2 preferably at least 3 cameras in a multi-camera system. The processing circuit is enabled to be programmed individually and largely independently (except required overhead for coordination) of co-existing processing units to enable a parallel processing of data generated by 2 or more cameras operated and generated data at the same time.

In accordance with an aspect of the present invention, a merge line between overlapping image data generated by at least 2 and preferably at least 3 cameras is determined from image data during a calibration step. A map of an image sensor, is stored in memory. Such a map may be a map of a complete sensor that maps generated image data to an actual pixel element, for instance indicated by an (x,y) coordinate system. Preferably, a map of an expected overlap region of an image sensor is stored in memory. During a calibration a mergeline which is preferably an optimal mergeline in image data is determined and mapped to actual physical pixel elements on a sensor. A controller is programmed to scan only the pixel elements on the active area of the sensor and store on a memory for processing. Some image data outside the active area may be stored separately or marked as being outside the active area for corrective measures.

In accordance with an aspect of the present invention all image data from the entire sensor area is stored in memory but is marked to distinguish between image data from active sensor area, such as being inside a mergeline determined area, and image data being captured outside the active area. For example by marking with a bit that is 1 when in active area and 0 when outside. Other markings are possible and fully contemplated. One may also have predetermined fields in a memory, for instance field INSIDE and field OUTSIDE. A processor may use data from OUTSIDE for determining corrective parameters, but only actively processes image data from field INSIDE for a panoramic image, to limit latency by processing only image data from active sensor areas.

Figure 35:
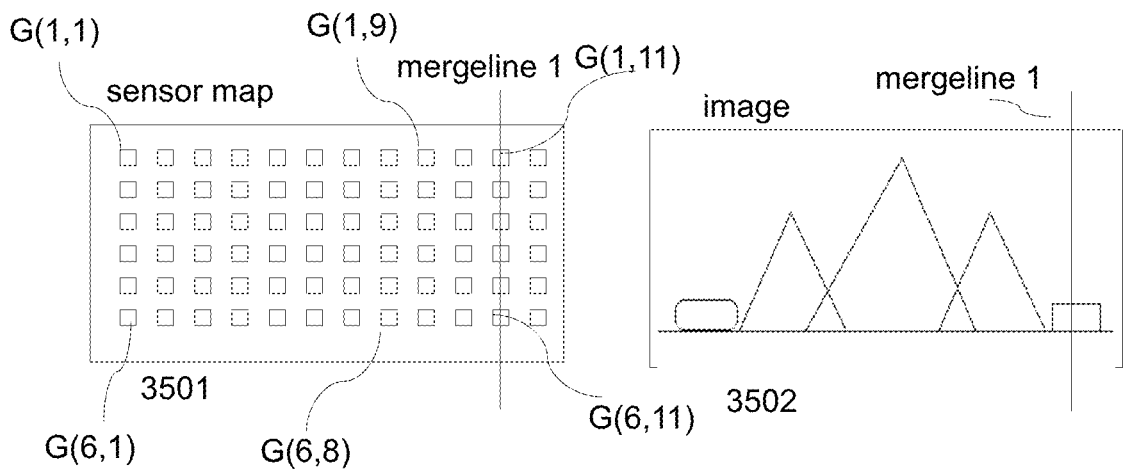
FIG. 35 illustrates a sensor map and its relation with a sensor generated image in accordance with an aspect of the present invention.

An image sensor, as is known in the art, comprises a grid or array of physical image sensor elements. In one embodiment of the present invention, a map of an image sensor provides coordinates of each sensor element. In one embodiment of the present invention a group of sensor elements, for instance a group of 4 elements in a Bayer group, or a single multi-color sensor element in a Foveon X3 sensor. At any rate, the map of an image sensor allows to identify a location of a sensor element or a group of sensor elements on an image sensor from an image that is generated from that sensor. This is illustrated in FIG. 35. It shows a sensor map 3501 and a generated image 3502. It illustrates that mergeline 1 determined by sensor pixel elements in column 11 (G(1,11)-G(6,11) in an illustrative example with a 6 by 12 sensor array) matches image pixels on mergeline 1 in image 3502.

In accordance with an aspect of the present invention at active areas of at least two image sensors and preferably three or more image sensors that are preferably part of a common body are determined, for instance in a calibration process. The image data of the active areas when combined form a registered image, preferably a registered video image. In one embodiment of the present invention distortion between images collected from the active areas is minimal. If correction is required, it may be one of pixel intensity difference in overlapping areas. This can be corrected by an intensity blending operation based for instance on pixel intensity equalization.

There are several effects that may affect a correct matching or registration operation in generating a panoramic image. A first effect may be a mismatch in overlap in active areas. Because of mechanical stress for instance caused by temperature changes the mergeline or the calculated stitchline that determines the mergeline may drift from a previously determined mergeline position. It may be assumed that the change in position of a mergeline due to stress or temperature change is limited. In one embodiment of the present invention that change is not more than 20 pixels from a previous position in any direction, preferably not more than 10 pixels in any direction and most preferably not more than 5 pixels in any direction. Preferably one selects the mergeline on one (for instance on a center image sensor) sensor as a fixed position. In a search procedure a matching stitchline with an image generated by a neighboring image sensor is determined and using a map of the image sensor the new corresponding mergeline is determined.

Because some image adjustment, like intensity equalization is required, it is advantageous to set one sensor as "constant" or reference. Only the image of the neighboring sensor may need to be adjusted. In one embodiment of the present invention the generation of a stitchline is dynamic and optimal and no sensor has a preferred mergeline position. Stitchline determination is a processing intensive process as common object points have to be identified as in classic image stitching. This searching may be limited in time because only a small image area has to be searched. Furthermore, a dedicated processor or processor core may be assigned to continuously search an image area defined by a mergeline in two image sensors for common image objects. Such a range may be less than 50 pixels on each side, preferably less than 25 pixels and more preferably less than 10 pixels. Furthermore, one may limit a search to horizontal searches or a search to one or more pixel lines that are perpendicular to a mergeline.

A processor in the camera may determine a stitchline on a regular basis, for instance every 50, 60, 100, 200 or 10,000 frames and checks the calculated stitchline against the active mergeline. When the calculated stitchline differs substantially from the mergeline, for instance at least 1 pixel, the calculated stitchline is activated via the maps to become the new mergeline. Keeping in mind that the mergelines determine active areas of sensors, while stitchlines are imaginary lines between images.

Figure 36:
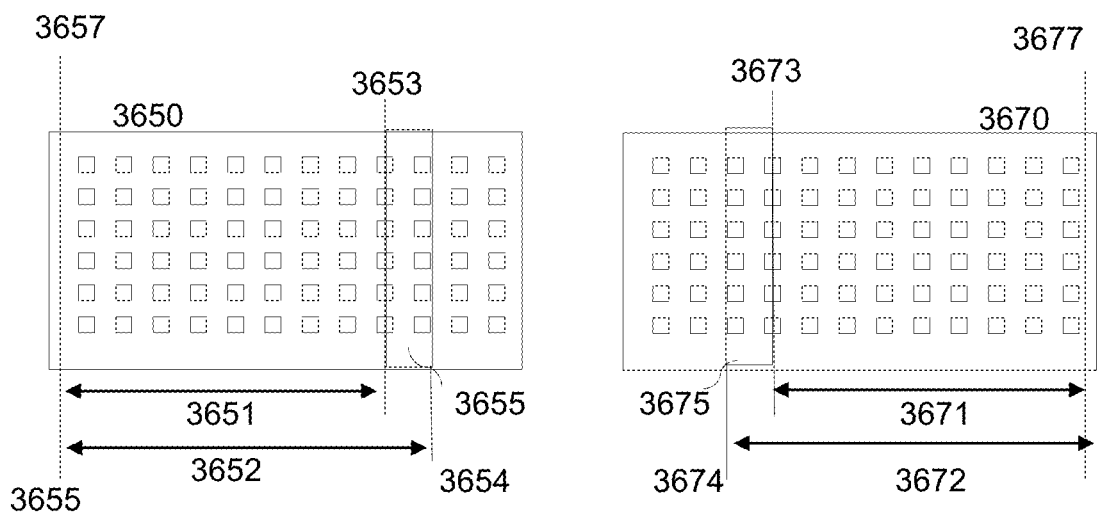
FIG. 36 illustrates a mergeline and an active image sensor area.

Preferably, image sensors are physically aligned so that horizontal lines of image sensor elements as illustrated in FIG. 36 are aligned. A mergeline will be preferably a line perpendicular to a row of sensor elements. Adjusting a mergeline due to a shifting stitchline will be preferably a horizontal shift of the mergeline as illustrated in FIG. 36.

An optimal stitchline and the resulting mergeline may not be a vertical line in some embodiments. This makes some operations such as transformations, blending by equalization a bit more complicated, but still very doable.

Figure 40:
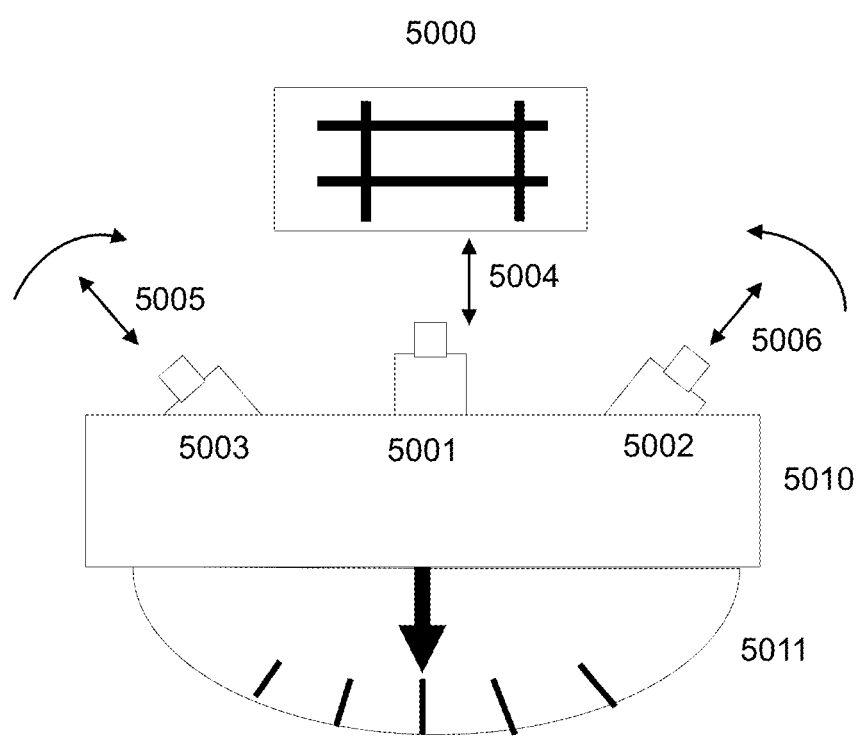
FIG. 40 illustrates schematically a calibration of a multi-sensor camera in accordance with various aspects of the present invention.

Preferably a mergeline is selected in matching areas of sensors and their lenses so that distortion changes are zero or almost zero. Preferably one applies sensors and lenses with identical properties so that mismatch effects are minimized. This is schematically illustrated in FIG. 40 wherein a combined camera in body 5010 has at least two but preferably at least 3 cameras 5001, 5002 and 5003. The cameras are preferably identical with identical optical parameters. The individual cameras 5001, 5002 and 5003 are positioned in body 5010 in such a way that an object like 5000 based on active areas determined as explained generate image data from active areas that are aligned as registered images. This can all be determined and adjusted during manufacturing and calibration of the camera, using fixed scenes with fixed objects to be imaged.

Object 5000 may be a scene, preferably a predetermined scene that is used to calibrate the cameras, including the mergelines and/or active areas of image sensors of the individual cameras. Nowadays, large (up to 45 inches diagonal) to very large (greater than 45 inches diagonal) high definition display screens are widely used at private homes. These screens may be used to display high definition patterns, such as horizontal and vertical lines, to be displayed. The display then may be used to calibrate or test calibration of camera 5010. Preferably, camera 5010 has already been calibrated for overlap as well as for required warping and color correction after or during manufacturing. At home calibration steps may be used to check correctness of calibration or to adjust for certain conditions.

In accordance with an aspect of the present invention a test or calibration pattern is generated on a display 5000. The pattern may depend on a distance 5004 of camera 5001 to display 5000. Preferably a specific test pattern is generated for a distance 5004 and an attitude or angle of 5001 relative to 5000. An angle may be measured by using a movable compass rose on which camera 5010 is preferably movably fixed. For instance a compass rose 5011 is printed on cardboard or a metal plate on which a camera holder, such as a smartphone holder or smartphone stand as available as consumer products is attached. For instance a circle shape may be attached on a bottom of the smartphone holder. A cutout in the compass board is configured to receive the circle attached to the smartphone holder. A degree scale printed on compass rose 5011 may be used to direct the camera to display 5000 under a fairly accurate angle. One may further direct camera 5002 to 5000 under a required angle and at distance 5006. The same applies for camera 5003 with a required distance 5005.

The pattern may change under different directions of the camera and at different pointing directions and/or under different lighting conditions. Based on a condition and pointing direction, a processor in the camera may determine an optimum mergeline and active area. The camera, which may be in communication with display 5000 may generate a panoramic image that is displayed on 5000, for instance in a separate image window. If a change is required a user may instruct a processor to accept a calculated setting of mergeline and active area. The processor may store the parameters of the calibration in a memory on the camera, which may be retrieved and activated either automatically under measured conditions or by an action of a camera user.

In another embodiment of the present invention, a panoramic camera 5010 may be placed in a calibration mode by a user in a particular position. A user may sweep a scene to allow a calibration for different positions. A processor in the camera or smartphone may determine optimal parameters for panoramic images within 5 seconds and preferably within 1 second. Such determinations are too slow for real-time video. However, the related parameters, once determined may be retrieved extremely fast and allow for the camera to apply attitude specific parameters, including active image sensor areas, and color correction for real-time video recording as described herein. Preferably the camera does not change attitude too rapidly. Real-time loading/changing of parameters while recording video and a rotational speed on a (virtual) axis perpendicular to the ground of not more than 15 degrees per second and preferably not greater than 30 degree per second may be achieved.

In accordance with an aspect of the present invention a calibration takes place by using sensing, location, distance measurement, compass and computational capabilities of a computing device such as a smartphone. For instance a user may take a smartphone to different locations in a scene that is covered by cameras in the smartphone. At each location coordinates such as GPS position of the location is determined by location capabilities of the smartphone. For determination of infinity distance of a lens a distance of 200 times the focal length of the lens may be applied. A user may then position to a calibration position and determine its location coordinates such as in GPS or any other enabled positioning system. The computer system or smartphone may then direct the attitude or angle of the phone based on calibration requirements. This may include optimal positions or angles relative to a central object at which a middle camera such as 5001 is directed and test/calibration positions of cameras 5003 and 5002. A camera display may direct a user to turn towards or away from a calibration object. The system may use an available compass and a required angle relative to a position of a marked position is a calibration scene. The computer system may optimize mergeline, active image sensor areas and warping, if required, based on the calibration scene. A user may evaluate a calibration image generated by the computer with newly determined panoramic parameters that may include but is not limited to required overlap from active sensor areas, shutter conditions, distance to objects, light conditions, color correcting and warping conditions or homography. A computer may offer a user to manually modify parameters within a certain range, for instance not more than 20%, preferably not more than 10% and most preferably less than 5%. Fine tuning should preferably come down to personal preference of a user and not to noticeable difference in image quality.

One may perform the above calibration on a motorized platform holding the camera housing or smartphone and instructions from a processor takes the motor through required activations to place the camera in required calibration positions to calibrate for making panoramic images in video mode.

Several tools exist that can be used to warp or to transform images to be stitched in a distortion limited panoramic image. A homography may be used based on the characteristics of a camera to transform an image. Warping, morphing and other homography techniques, including Moving Direct Linear Transformation or Moving DLT and techniques like As-projective-as-possible (APAP) are described in Wei LYU et al. A survey on image and video stitching, February 2019, downloaded from https://www.researchgate.net/publication/330288127_A_survey_on_image_and_video_stitching, which is incorporated herein by reference. Also incorporated by reference herein is: Zaragoza et al. As_Projective-As Possible Image Stitching with Moving DLT, 2013 downloaded from http://openaccess.thecvf.com/content_cvpr_2013/papers/Zaragoza_As-Projective-As-Possible_Image_Stitching_2013_CVPR_paper.pdf. Also incorporated by reference herein is Brown et al. Automatic Panoramic Image Stitching Using Invariant Features, 2006, International Journal of Computer Vision 74(1), 59-73, 2007. Also incorporated by reference herein is El-Saban et al. FAST STITCHING OF VIDEOS CAPTURED FROM FREELY MOVING DEVICES BY EXPLOITING TEMPORAL REDUNDANCY downloaded from https://www.researchgate.net/publication/224200459_Fast_stitching_of_videos_captured_from_freely_moving_devices_by_exploiting_temporal_redundancy.

Real-time panoramic imaging is becoming of greater interest as imaging techniques on devices such as cellphones/smartphones are becoming a commercial differentiator in an extremely crowded device market. The article by Zhi et al. "Realization of CUDA-based real-time registration and target localization for high-resolution video images", May 4, 2016 in J Real-Time Image Proc. (2019) 16:1025-1036, which is incorporated by reference herein, is at least one indication of the increasing interest in real-time video image registration. A smartphone herein is a computing device that has cellular phone capabilities, has at least a camera and a display to display images, including video images. Commonly a smartphone has additional capabilities, including connectivity to the Internet and access to different devices such as sensors and GPS.

In accordance with an aspect of the present invention, one or more transformation parameters for image data obtained from a sensor active area determined by a mergeline are determined for a position of mergeline on a sensor. Furthermore modification parameters are determined to generate a smooth and seamless or substantially seamless transition across a mergeline. These parameters, for image data for each active area of each image sensor are stored on a memory or storage device. The parameters are stored in a format that when retrieved can be applied in a transformation such as a homography performed by a processor to generate a partial image that is then combined with one or more images from other image sensors to form in combination a panoramic image. In one embodiment of the present invention this is applied for generating static panoramic images. In one embodiment of the present invention this is applied for generating panoramic video images.

At a video framerate of 25 frames per second this allows about 40 ms per sensor to generate a completely processed (warped and equalized) image. At 50 frames this corresponds to 20 ms. In accordance with an aspect of the present invention the estimation of parameters is substantially or even completely eliminated and all processing time can be focused on direct processing. In one embodiment of the present invention, for instance in static panoramic images or slow or low resolution panoramic video, this can be achieved with a single processor. Dedicated pipelined signal and image processors may be used to improve image processing speed. Examples of dedicated image processing units (IPUs) are for instance the Pixel Visual Core (PVC) as described in https://en.wikipedia.org/wiki/Pixel_Visual_Core which is incorporated herein by reference, or as described as an ASIC in U.S. Pat. No. 9,229,526 issued on Jan. 5, 2016 to Neglur et al. which is also incorporated herein by reference. Also a Graphic Processing Units (GPU) as known in the art may be used to offload image processing tasks from the general processor in a system like a smartphone.

While processors become more powerful, pixel counts on image sensors for high-resolution images also increases. In accordance with an aspect of the present invention a processor is dedicated to processing image data from an active area of an image sensor based on parameters determined during a calibration of a multi-camera/sensor device and retrieved from a memory based on a position of a mergeline. In certain cases two or more processors may be needed to adequately in time process image data of an active area. In those cases an active area of a sensor may be divided in sub-areas from which the image data is processed by a separate processor or a processor core.

Distance from an object to a camera may determine the amount of warping that is needed to correct or diminish distortion. In accordance with an aspect of the present invention, different parameters for image transformation are generated for each mergeline and for a distance of an object to a camera and stored on a memory or storage device. For that purpose at least one device that determines a distance from camera to object is included on the device. Such a device may be an autofocus device that associates a distance with a lens focus setting. The device may selectively determine distances or focus settings of a lens to one or more objects.

One may assume different distances of an object associated with a particular mergeline and store related transformation parameters associated with distance and mergeline on a memory or a storage device. In another embodiment of the present invention a processor may determine in an image generated by an active area of an image sensors a section with an object that is closer or more remote from the camera. In that case a processor may determine area specific transformations that diminish distortion of parts of an image. This technique may work well in static panoramic cameras, such as surveillance cameras that don't move. The embodiment may also work with moving cameras wherein distances to objects change. That means that blocks may have to be determined dynamically as well as the related transformations.

In one embodiment of the present invention an image generated by an active area of one image sensor is treated as a ground truth. For instance with an odd number of sensor/lens combinations a center sensor may be used to generate a ground truth. If necessary a ground truth image is generated using a transformation, though one may also use an image of an active sensor area that generates an image that is not or minimally distorted. One then determines the required transformations of the image data of the neighboring active sensor areas (left and right or above and below) to create a high quality panoramic image. High quality means with a defined amount and preferably little distortion.

One application of a panoramic camera may be in an augmented reality (AR) imaging system wherein images are inserted in an image of a real-life scene. In certain applications such as surveillance or manufacturing, machine vision or other applications that require interaction with a real-life scene it may be required to have a wide, panoramic view of a scene to obtain a correct context and/or understanding what is happening and how a scene develops. In that case it may be required to obtain a wide view, in the order of 100 degrees, 120 degrees, 150 degrees or 180 degrees or even greater. In that case it will be beneficial to have limited distortion of a panoramic image as explained above.

One application may be in smart glasses as for instance described in "Introducing Ray-Ban Stories: First Generation Smart Glasses" Sep. 9, 2021 at https://about.fb.com/news/2021/09/introducing-ray-ban-stories-smart-glasses/. ("FB glasses".) One may modify the two cameras in the FB glasses in accordance with structures disclosed herein to record a panoramic image and/or a panoramic video. One may also include at least one additional camera, for instance in the bridge of the Ray-Ban frame and slightly redirect the cameras at the outer edged of the frame to create a camera structure that is enabled to record a panoramic image and/or video image from at least 3 cameras. At the edges of 180 degree vision a human uses peripheral vision. Movement and action may be noticed, but clear visual details can only be obtained by directing the eyes into the direction of the scene, initially by moving eyes and in general by moving or rotating head and/or body. An improved peripheral vision may be obtained by projecting the appropriate camera images onto the eyes as in known in Smart Glasses for instance as a Virtual retinal display (VRD) or retinal projection or MicroLED display or other. This gives a wearer instant full 180 degree (or wider when provided with appropriately directed cameras) vision instead of peripheral vision.

Figure 39:
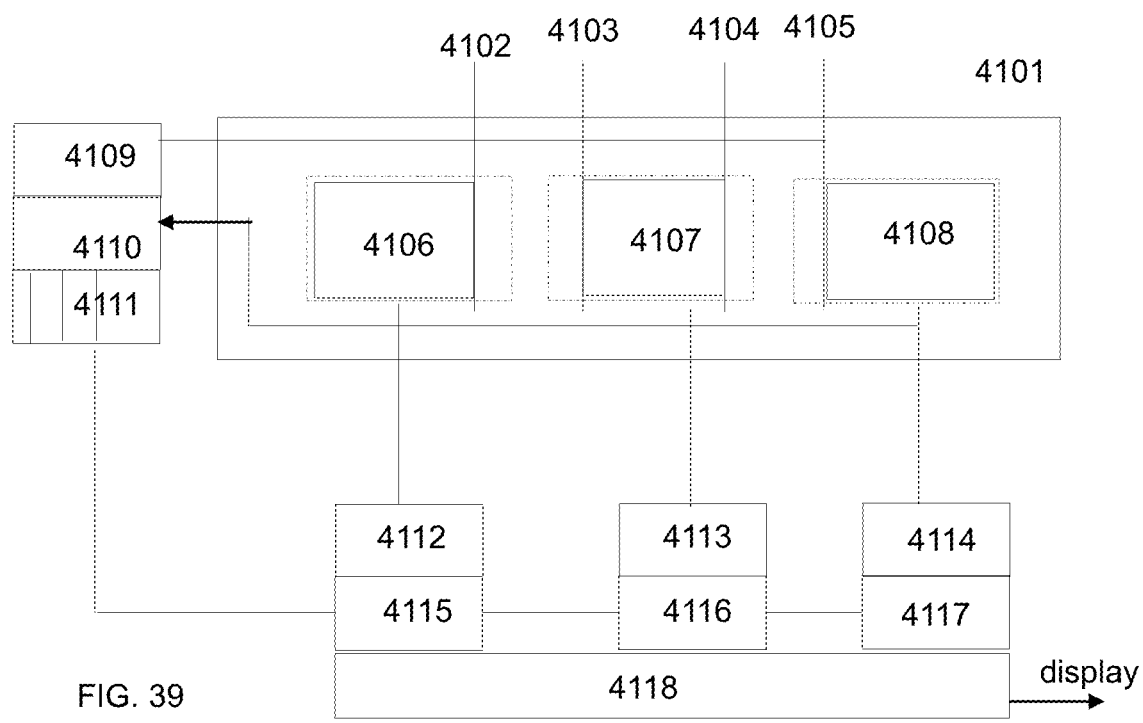
FIG. 39 illustrates a camera system for generating a panoramic image.

A physical structure of a panoramic video device is schematically illustrated in FIG. 39. In this figure connections are also provided schematically to avoid overcrowding the drawing. It may be assumed that all physical devices and component are able to exchange data, preferably in a parallel bus structure, even if not specifically drawn and/or named. FIG. 39 shows parts of a panoramic camera 4101 with image sensors 4106, 4107 and 4108. Camera 4101 may be part of another device such as a smartphone with a body or may be a dedicated camera body. The camera may be a panoramic camera for making photographs or for making panoramic video images or for making both. Elements like light sensors, lenses, focus sensors, focus mechanism and other elements that may be included are omitted in the drawing to prevent overcrowding. For illustrative purposes three image sensors are drawn, but there may be more or fewer image sensors.

In accordance with descriptions provided herein mergelines 4102 in sensor 4106, mergelines 4103 and 4104 in sensor 4107 and mergeline 4105 in sensor 4108 are determined under certain conditions and are stored in a memory 4109 managed by a processor 4110. Associated with the conditions of the mergelines are modification parameters stored in memory 4111. For each set of mergelines at least 2 sets of modification parameters are stored in memory 4111. In the case of 2 sets of modification parameters the image data of active area of image 4107 is considered a ground truth that is not being modified. In a further embodiment there are at least as many sets of modification parameters as there are image sensors. One may determine the sets of modification parameters, for instance for a modifying homography, during a calibration based on different conditions that may include different positions for the mergelines, wherein the mergeline have minimal changes in positions, for instance within a range of 5, 10, 20 and maximally 30 pixels. Based on active conditions the correct set of parameters associated with each active sensor area and mergeline position is retrieved by processor 4110 from memory 4111 and provided to local processors 4115, 4116 and 4117 which may be dedicated image processors associated with active areas of image sensors 4106, 4107 and 4108, respectively. For simplicity memory/storage 4111 is depicted as a single memory. Memory 4111 may be partitioned into several memories, each dedicated to a processor or processor core that is independently accessible and retrievable, allowing parallel retrieving and execution of instructions.

In general, modification parameters are static in the sense that they are determined during calibration and then implemented until changed. One exception may be intensity and/or blending parameters which may be adjusted "on-the-fly" by providing pixel intensity data around the merge-regions of the mergelines, so the interpolation/equalization parameters may change when light effects substantially (observably) change pixel intensities, so that pixels in overlap regions of two image sensors would have different intensities, creating undesirable "seams". By dynamically adjusting these parameters these seam effects can be minimized.

The processor 4110 provides the appropriate modification parameters from memory 4111 and if needed adjusted for intensities to local processors 4115, 4116 and 4117, respectively. The local processor process image data from their corresponding active areas stored in local image memory 4112, 4113 and 4114 and process these image data in accordance with the corresponding modification parameters. The processed data are then provided to the correct addresses in image display memory 4118 that when read by a display processor (including de-mosaicing when needed) as a panoramic image on a display (not shown in FIG. 39 but may be assumed). Because the separate processors work with matching or at least related parameters the resulting image read and displayed from 4118 is a panoramic image with minimized or at least reduced distortion compared by just combining image data from the active areas without modification. By using separate and dedicated image processors 4115, 4116 and 4117 that work in parallel very fast operations can be achieved. Based on processing capacities of current processors and known homography operations These operations may achieve generating panoramic image frames at a rate of about at least easily one panoramic image frame per 20 ms and likely one panoramic image frame per 10 ms, which is generation of real-time panoramic video. Processing speed depends on the size of image sensors in pixel numbers.

In the above illustrative example, each sensor is associated with a single image processor. In accordance with an aspect of the present invention an active sensor area is split-up in active blocks. Each block is then assigned an individual processor or at least a processor core. Presumably some areas of images (like edges) are more likely to require modification. The throughput time of images is then determined by the most time-consuming modification of data of an image sensor area. For instance 20% of an active area of a sensor supersedes the required throughput time to generate real-time panoramic video generation. Assume that the area supersedes the throughput by 40%. Splitting the active area in two blocks with appropriate modification parameters and assigning each block an individual processor core will solve the throughput issue.

There are currently many software tools to warp images, to align image features, to correct image distortion and to equalize image distinctions. They are available in different forms and in different products. It is believed that one of ordinary skill is familiar with the basics of these products and can easily use them with minimal training as most of these products are quite intuitive to use. In certain cases these tools are set in a specific application interface or environment. An application developer is able to easily adopt and adapt these programs into a specific application as described herein. Several application will be mentioned for illustrative purposes. However, there are many, many different image processing computer implemented tools that can be adapted or modified for the current purposes.

For instance Photoshop of Adobe® has very effective tools to remove distortions in local areas of images. This is illustrated in a demonstration in a Youtube video at https://www.youtube.com/watch?v=-jvh1CABG1w that demonstrates manual removal of perspective and barrel distortion in Photoshop. Lightroom® is another Adobe product that is used to correct distortions. The corrections are for instance found in the Photoshop manual Adobe® Photoshop® CC Help downloaded from https://helpx.adobe.com/pdf/photoshop_reference.pdf which is incorporated herein by reference. The advantage of this product is the interactive way to correct images. The video demonstrates how different image areas and thus image sensor areas may require different modifications. For instance the two towers on the left and right area of the image require straightening, while the center area shows a bulbous deformation that is corrected. Accordingly for at least each active area of image sensors it is determined, based on the determined mergeline, what corrections are required, which specific correction algorithms are needed, the amount of correction needed and the setting of the correction in the stored instructions. The sensors preserve their relative positions inside a body. So when no conditions change significantly, each processor associated with an active areas executes the selected and configured instructions for a specific active area and based on the mergeline.

A more technical way to calibrate a camera and remove or address distortion is described in Matlab's Computer Vision Toolbox™ User's Guide by the MathWorks, Inc., downloaded from https://www.mathworks.com/help/pdf_doc/vision/vision_ug.pdf and which is incorporated herein by reference. Other techniques such as performing estimations for correcting transformations are provided in Matlab's Image Processing Toolbox™ downloaded from https://www.mathworks.com/help/pdf doc/images/images_tb.pdf which is incorporated herein by reference.

There are also many open source image processing products, of which OpenCV (Open Source Computer Vision) available at opencv.org is one. For instance, the calib3d module provides instructions and examples of camera calibration and the stitching module provides examples and instructions to create panoramic images.

FIG. 35 illustrates a sensor map 3501. The sensor map is in one embodiment of the present invention a grid of preferably equally sized and spaced rectangles that represents the position, size and spacing of sensor elements on a grid. Each element on the map that represents a sensor element is provided with at least 2D coordinates. The size of the map is determined by the number of sensor elements on the image sensor. In fact the map in one embodiment of the present invention is a stored set of coordinates. When the physical sensor has a grid of n by m physical sensor elements (such as CMOS elements) then the map is a stored grid of n by m 2D coordinates.

In one embodiment of the present invention a sensor map is mapped to an image in a raster representation. Commonly a raster representation or bitmap of an image provides the color values (such as RGB) of a pixel at that location. In this embodiment of the present invention not a pixel value, but the coordinates of a sensor element on the image sensor are associated with the grid representation of the image sensor. There are millions of sensor elements on a sensor and it would make a map as displayed on a screen unreadable if all coordinates were to be displayed.

Preferably an empty map is displayed on for instance a computer screen with a contour that indicates the edges of the sensor. A pointer, for instance guided by a computer mouse, or an object on a touch screen or a touchpad, is moved inside the contour and is activated. As a result, the coordinates of the sensor element on the map is displayed on the screen. For instance a pointer activated inside the map may display G(1,1) or G(6,1) or G(6,8) on the illustrative 6 by 12 map 3301. A unit on a map may represent a single sensor element or a block of sensor elements. This does of course not matter if the correct representation of blocks in number, size and spacing is maintained on the map.

It should be apparent that an actual size of an image sensor is too small to be displayed as a map to be useful. The map may be enlarged on a screen as long as relative distances, numbers and spacing are maintained. A raster representation on a computer screen allows the map to be displayed and used to correctly identify sensor elements by translation of an origin of the map (for instance G(1,1)) relative to the raster of the screen. Furthermore, the size of the map is determined by number of sensor elements, not their actual physical size. This allows enlargement of the map, while allowing a processor to correctly identify the relative position G(k,p) on a sensor by activating a pointer inside a map.

Individual sensor elements may be read from an image sensor by addressing a specific row and column in a sensor array. This is taught in the known literature such as in U.S. Pat. No. 5,949,483 issued on Sep. 7, 1999 to Fossum et al. which is incorporated herein by reference. A system with X and Y addressing of individual sensor elements is taught in U.S. Pat. No. 6,509,927 issued on Jan. 21, 2003 to Prater et al. which is incorporated herein by reference. Another disclosure teaching row and column addressing in image sensors is U.S. Pat. No. 6,512,858 to Lyon et al. issued on Jan. 28, 2003 which is incorporated herein by reference. In accordance with an aspect of the present invention a stop and start address of a row in an image sensor as well as a start and stop address in a column are used. Accordingly, almost any pattern or curve or line that is used to define a mergeline and borders on a sensor map can be applied to define an active area on an image sensor and can be implemented on a processor to effectuate reading only image data from the defined active area. In one set of cases, the mergelines (and borders) are straight lines. In another set of cases, a mergeline or a borderline is slanted. In that case a standard analytic geometric formula such as y=mx+c can be used to express a line and implement the line on an image sensor as sensor elements that are closest to the line in order to generate their addressed to be read from. In some cases a line may be curved or may be random and approximated by a set of formulas that may be used to generate addresses. In any case almost any line and any shaped line can be implemented on a processor to generate corresponding sensor element addresses.

In accordance with an aspect of the present invention, the mergeline is applied as a masking line that defines an active area of the image sensor from which image data is obtained. This is illustrated in FIG. 36 with a sensor map 3650 of a first image sensor and a sensor map 3670 of a second image sensor. Image data is obtained of active sensor areas 3651 of the first image sensor and of active area 3671 of the second image sensor, and to store the data collected from active areas directly as a registered image such as a panoramic image prior to follow-on processing such as demosaicing, smoothing, interpolation and other possible image correction. The active area 3651 is defined by a permanent or semi-permanent border 3657 and a mergeline 3653. The mergeline 3653 is a virtual line that establishes the area beyond which no sensor data is directly applied and stored for the registered image. The corresponding active area in the second image sensor with map 3670 is 3671 with matching mergeline 3673 and border 3677.

The border may not be specifically defined but be merely the border of the sensor. However, if a specific format is desired any border in addition to the merge lines may be permanently or per occasion defined through the map by drawing or defining the border in the map. In one embodiment of the present invention, the lines of the map are translated by a processor into scanlines (direction and size in number of sensor elements) that are read into memory. For simplicity all lines in FIG. 36 are shown as being perpendicular. This needs not to be the case and borders as well as merge lines may have an angle relative to lines determined by rows of sensor elements on the sensors.

It is emphasized that lines 3653 and 3673 are different lines in different maps of different image sensors. Calibration is applied so that 3653 and 3673 are mergelines of images generated by active sensor areas. However, the sensors themselves are of course not overlapping. For illustrative purposes two sensors are shown in FIG. 36 to create a panoramic image. It is to be understood that this configuration is easily expanded to a system with more sensors, for instance to the left of 3650 or to the right of 3670 or to the top and/or bottom of 3650 and 3670.

Depending on the accuracy of calibration, the combined image data generated by active areas represented by 3651 and 3671 may be of sufficient quality for display as panoramic video images on a relatively small screen, but may show minor or larger flaws on a large screen. In that case, it is beneficial to have additional image data that may be used to fine-tune or repair the final images. For that purpose a safety line 3654 is established for the first image sensor to define an excess or safety area 3655 on the first sensor and a safety line 3674 on the second image sensor that defines an excess or safety area 3675 on the second image sensor. The data collected from the safety areas is also stored on memory but is not used to generate the real-time or close to real-time panoramic image which is preferably a video image. In one embodiment of the present invention the safety data on an image sensor is masked from use by the merge line. Access to the safety data by the processor is interdicted by for instance a code formed by the merge line. The merge line in that sense sets the addresses or virtual addresses in the memory that can be accessed for real-time generation of panoramic images including video images.

In accordance with an aspect of the present invention a safety area of image data generated by sensor elements located beyond a mergeline are associated with a specific row or line of image sensor elements and are stored either separately or are stored as part of an active area but are not directly accessible to generate a real-time image. In one embodiment of the current invention image data read from an active area of an image sensor is read into a buffer memory, for instance to store an image frame. Each image sensor has its own buffer. Based on the mergeline and alignment of pixels the image data from the active areas, without being demosaiced, the different buffers are read into a single memory as contiguous image data representing a panoramic image. The safety areas are read into a separate memory or storage medium associated with a frame and active area and can be used later to improve or correct a registered image.

The purpose for safety areas is to be able to correct errors that may show up in a display of images. Errors in overlap or in color correction may require knowledge of surrounding pixels in an image. Image processing may then take place on images created from the active areas plus the safety areas which are available for retrieval and re-use to improve an image. In one embodiment of the present invention the safety area is defined by an extension of a pixel or sensor element line of 5 sensor elements or less. In yet another embodiment of the present invention the safety area is defined by an extension of a pixel or sensor element line of 10 sensor elements or less. In yet another embodiment of the present invention the safety area is defined by an extension of a pixel or sensor element line of 50 sensor elements or less. In yet another embodiment of the present invention the safety area is defined by an extension of a pixel or sensor element line of 100 sensor elements or less. In yet another embodiment of the present invention the safety area is defined by an extension of a pixel or sensor element line of more than 100 sensor elements.

In one embodiment of the present invention a mergeline is determined from images of the two or more images sensors by finding mergelines or overlap lines by using at least part of stitching computer operations. Standard stitching computer applications or mosaicing operations are known. Examples are for instance SIFT and RANSAC and others. In general stitching of two images takes place by using a homography of objects in projective space. One may match points of interest in two images by a transformation. This may be caused by a rotation of a camera or by having applied a different perspective. In accordance with an aspect of the present invention all cameras with lenses and image sensors are fixed within a body within well defined limits. Presumably no significant rotation should take place that cannot be addressed by defining a correct mergeline. In one case a seam between images is determined by applying a translation of images with overlap. One may determine an optimal seam by finding a minimum matching error of pixels on the seam or close by the seam. Depending on lens settings one will find different optimal seams. One has to keep in mind that moving a seam towards the center of one image (with possibly less lens distortion) will move the seam in the other image away from the center which may increase distortion.

There are many known programs that can be used on a processor to optimize matching of images and thus can be used to have an optimal mergeline that defines active sensor areas. For instance Harris corner detection, SIFT and SURF algorithms can be used to find coordinates of matching features in images, as is known in the art. The computer language Matlab running on a processor, for instance, has the ability to find coordinates of matching features with the instruction matchFeatures as taught at https://www.mathworks.com/help/vision/ref/matchfeatures.html which is incorporated herein by reference. More recent fast seam processing using graph cuts is taught in "Panorama Weaving: Fast and Flexible Seam Processing" by Summa et al. published online on Jul. 13, 2012 at https://www-pequan.lip6.fr/~tierny/stuff/papers/summa_siggraph12.pdf which is incorporated herein by reference.

A sensor array provides consecutive or interlaced scan lines of pixel signals which are essentially a series of sampled signals which are provided to an Analog/Digital converter which may temporarily be stored in a buffer as raw data. The raw data is processed by a processor for a process that is known as de-mosaicing. Pixels in for instance a CMOS sensor are comprised of several components that have to be processed to create a smooth image. The raw data if not processed may also show artifacts such as aliasing, which affects the quality of an image. By processing steps, which may include smoothing, filtering, interpolation and other known steps the raw image data is processed into displayable image data which may be displayed on a display or printed on photographic paper. De-mosaicing is well known and is described for instance in U.S. Pat. No. 6,625,305 to Keren, issued on Sep. 23, 2003, which is incorporated herein by reference. One may, at the time of de-mosaicing, also resize the image so that the reference image and the image to be rotated have the same size at their merge line. De-mosaicing and resizing of raw data is described in U.S. Pat. No. 6,989,862 to Baharav et al. and issued on Jan. 24, 2006 which is incorporated herein by reference.

Figure 37:
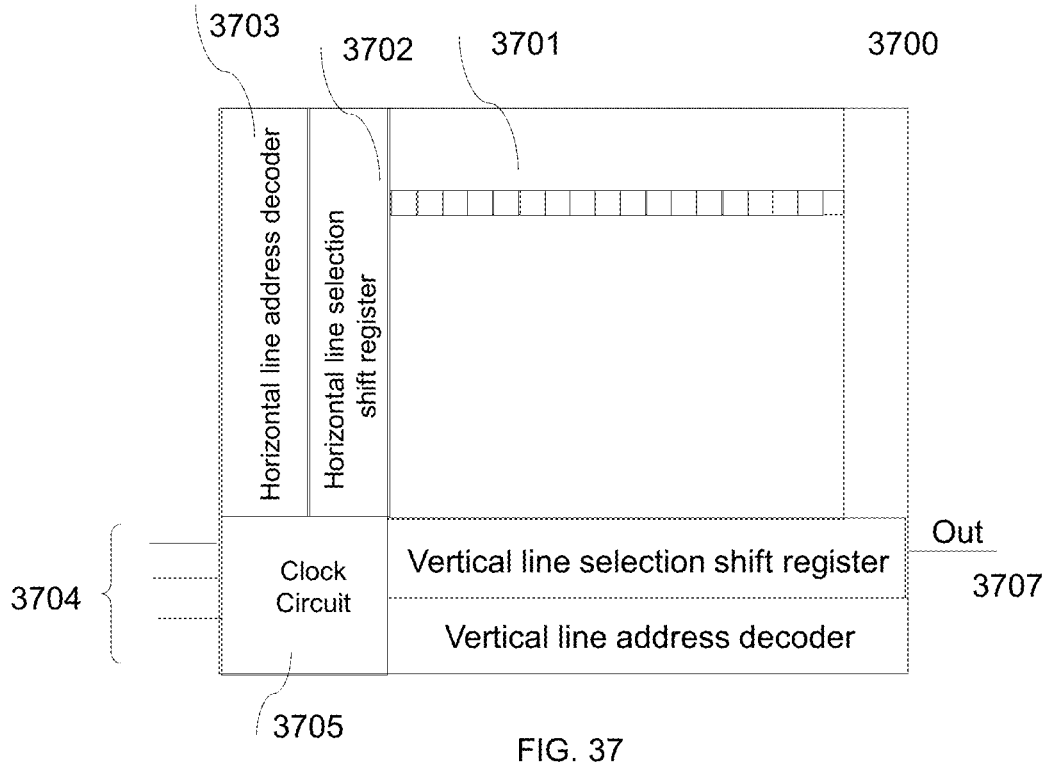
FIGS. 37 and 38 illustrate addressing sensor elements on an image sensor to read their content.
Figure 38:
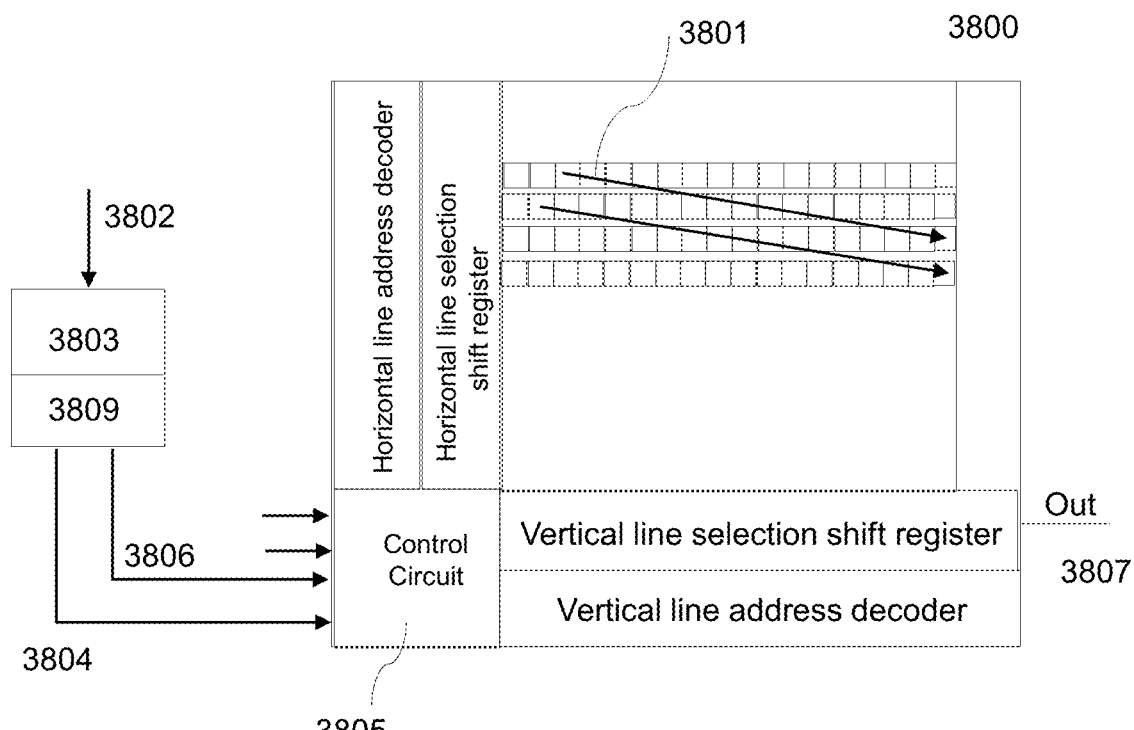

How to implement addressable scanlines is illustrated in FIG. 37 and FIG. 38. FIG. 37 illustrates a known addressing method and apparatus for reading an image sensor. It is for instance described in U.S. Pat. No. 6,900,837 to Muramatsu et al. issued on May 31, 2005, which is incorporate herein by reference. FIG. 37 is equivalent to FIG. 2 in Muramatsu. It shows a sensor 3700 with identified a row of sensor elements 3701. Once a line is activated a series of signals will generate a series of consecutive vertical addresses which allows activation by the vertical line selection shift register of consecutive vertical lines with as result a reading of consecutive pixels in a horizontal line. The read pixels are provided on an output 3707. Further identified are a clock circuit 3705 which will assist in timing of reading the pixels and inputs 3704. A processor that is programmed or configured to set and execute addresses for sensor elements to be read, preferably selectively, from an image sensor, is called an address generator or an image sensor address generator herein. The address generator provides the addresses to an address decoder. The reading system for an image sensor is thus similar to a reading system for, for instance, a RAM memory or a disk drive.

FIG. 38 illustrates an aspect of the present invention to scan the sensor elements under a small angle, preferably smaller than 1 degree, but certainly smaller than 5 degrees. Under small angles the distortion in an image may be considered minimal and not or barely noticeable. The structure of the sensor 3800 is similar to 3700. For illustrative purposes three horizontal lines of sensor elements are shown. The read scanlines are provided on an output 3807. The sensor has also horizontal and vertical address decoders and related line selection shift registers. The difference is a control circuit 3805 which may contain a clock circuit, which distributes appropriately the addresses to the horizontal and vertical address decoders. The addresses will be generated in such a way that the sensor elements are read according to a slanted line 3801 and not in a strictly horizontal or vertical line. This slanted reading was already explained above.

One should keep in mind that the angle of scanning is not yet determined and should be programmed by a signal on an input 3802. Such a signal may indicate the angle of scanning. A related signal may be generated that determines the angle of the merge line. For instance based on signals provided on 3802 one may provide to a processor 3803 sufficient data to determine the angle of scanning and the begin point of scanning for each slanted line which determines a scan area in which case one may want to scan from right to left. The coordinates of the scan area and the scan angle may be stored in a memory 3809, which may then provide data to the controller to generate the appropriate scanline element addresses.

It may be sometimes confusing to distinguish between pixels as picture elements in an image and as sensor elements with may be CCD elements or CMOS photodiodes with for instance amplification. The image pixel is image data associated with coordinates in an image which may be converted in an image point or segment of a particular color and intensity on a screen in an image. A sensor element is a physical device that generates a signal that is converted by an A/D converter into a data representation, such as a 24-bits word as a pixel representation. A sensor element thus generates image data, which as a result may be an image pixel. This distinction is important and was confirmed in a PTAB Appeal Decision on Dec. 4, 2017 in Appeal 2016-000011 of application Ser. No. 12/634,058 from which this disclosure depends and which decision is incorporated by reference herein.

Processing steps provided herein are performed by a processor, such as a microprocessor or a controller that executes instructions upon data. The processor has access to memory that contains stored and retrievable data including instructions and the processor can store data retrievably on the memory. The processor controls remote devices including motors, address generators and image sensors and can obtain data from these devices. A processor may have access to a communication network, such as the Internet, Wi-Fi a cellphone network or any other network. A processor has input devices such as a mouse, a keyboard, storage, sensors, touchscreen and output devices such as storage, a screen, memory and a printer. In certain cases instructions for a processor is prepared software such as SURF, SIFT, RANSAC and other image registering software.

In accordance with an aspect of the present invention one or more image processing algorithms known in the art and of which some are described herein are stored on a memory to be retrieved by a processor for execution. This may be a memory 4111 as illustrated in FIG. 39. Several algorithms may be stored of which only one or a limited number or all may be configured by parameters determined based on a mergeline.

Figure 41:
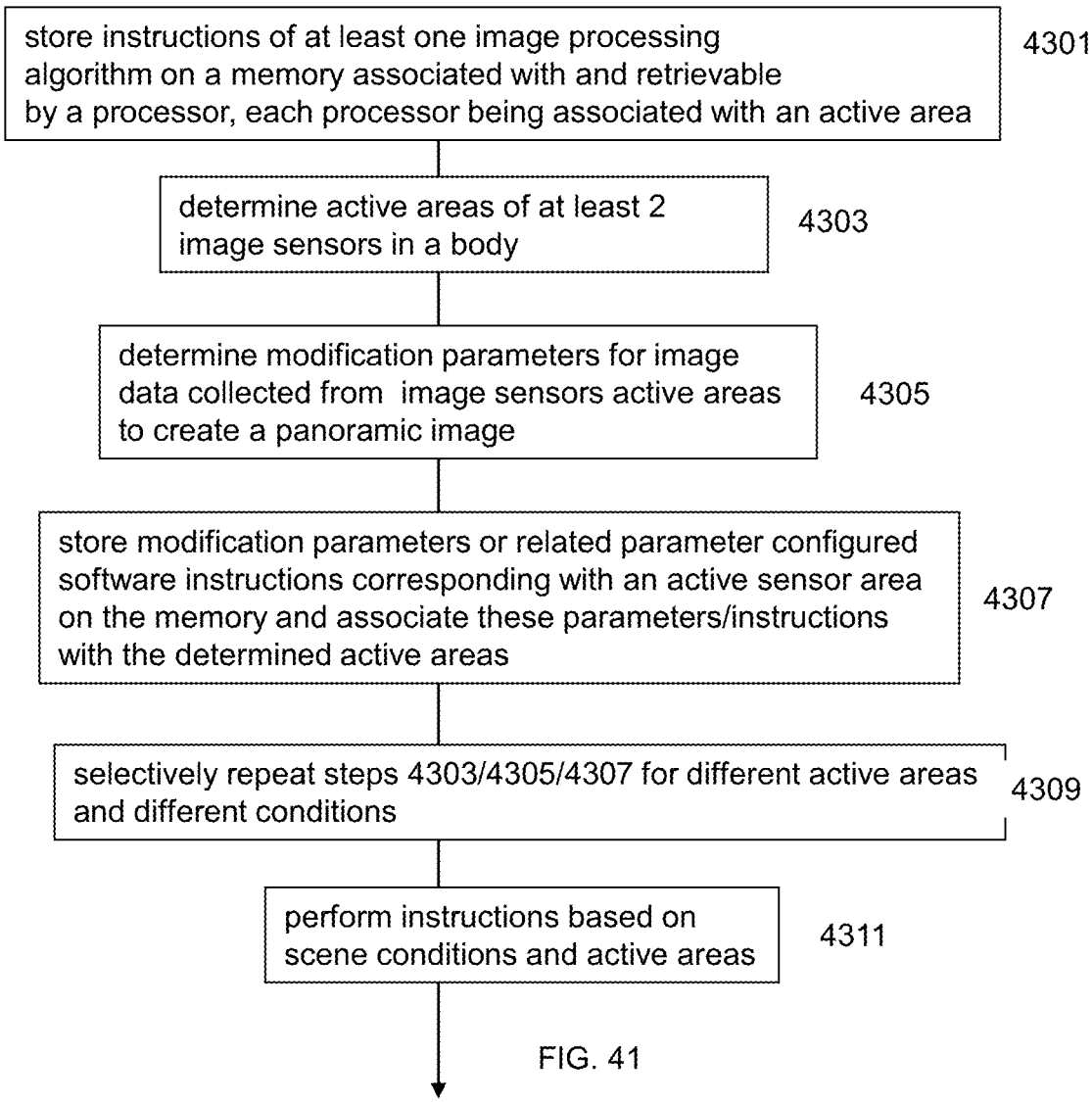
FIG. 41 illustrates a series of steps performed by a processor in accordance with various aspects of the present invention.

The steps for configuring a device to generate panoramic images using multiple image sensors and multiple processors/processor cores are illustrated in flow diagram of FIG. 41. In step 4301 instructions of one or more configurable image processing algorithms are stored on a memory, the memory preferably dedicated to a single active area/processor. Preferably there are at least as many processors/processor cores as image sensors. If needed one may expand the number of processors by dividing active sensor areas in blocks with a processor/core assigned to each block. There are at least 2 image sensors in a device to generate a panoramic image, but preferably 3 or more image sensors. For simplicity it is assumed that there are 3 image sensors and 3 active sensor areas and 3 image processors with 3 instruction memories that may be configured. It is understood that there may be more or fewer components.

In step 4303 the mergelines are determined, preferably by determining stitchlines first and then mapping to active area of an image sensors. Other methods are also possible. In step 4305 the parameters are determined for processing image data of each of the active areas, where as a result the processed image data in combination (and demosaiced) is displayed as a panoramic image. In step 4305 an identified image distortion is addressed by selecting specific parameters/instructions to generate a more desirable result. Based on the desired outcome parameters or configurations of the stored algorithms are set and stored as an instruction block associated with a mergeline position in step 4307. The order of steps 4301, 4303 and 4305 is flexible. For instance, only a limited number of modifications may be needed. In that case one may only store and associate an instruction set with that particular mergeline and/or environmental conditions. This limits the amount of instructions that has to be accessed retrieved and processed by a processor/processor core.

In step 4309 previous steps 4303/4305/4307 are selectively repeated for different mergelines and/or different environment conditions. Different environment conditions may involve different light conditions or distances of an object to a lens. For instance a scene wherein an object is close to a lens may require a different correction compared to the object being more distant, even at the same mergeline conditions. One estimate of different mergeline positions may be a travel between 1 to 25 pixels to the left or right. The effect on actual change of parameters may be minimal with exception of equalizing edges around the mergeline. In step 4311 instructions for each processor/processing core are activated based on the active mergeline and when appropriate on detected environmental conditions. The processed image data are combined into a panoramic image and displayed on a display. Either as a still image or as part of a panoramic video.

Many textbooks, articles, patents, websites, softwares, algorithms, videos and other teaching media on Image Processing exist. The teachings in the instant disclosure identify known and so far unaddressed bottlenecks in creating high quality panoramic videos on relatively inexpensive, portable and mobile computing devices. A recent textbook that addresses common image processing techniques and their technical implementation is Burger et al. Digital Image Processing, Second Edition, 2016, Springer-Verlag London which is incorporated herein by reference.

Panoramic images are registered images. Stereoscopic images are also registered images but of 2 images. While some techniques as disclosed herein may be applied to stereoscopic images, panoramic images are different in that they often use 3 cameras. While there have been shown, described and pointed out, fundamental novel aspects of the invention as applied to preferred embodiments thereof, it will be understood that various omissions and substitutions and changes in the form and details of the methods, systems and devices illustrated and in its operation may be made by those skilled in the art without departing from the spirit of the invention. It is the intention, therefore, to be limited only as indicated by the scope of the claims or their equivalents appended hereto.

The invention claimed is:

1. A camera system, comprising:
   at least a first and a second camera fixed in a single body, each of the at least first and second cameras including a lens and an image sensor;
   a first processor group of one or more processing units to process image data from image sensor elements in an active area of the image sensor of the first camera, the active area of the image sensor in the first camera being smaller than a total area of image sensor elements of the image sensor in the first camera, the active area the active area of the image sensor in the first camera being determined by one or more parameters stored on a memory;
   an instruction memory storing instructions for the processing units of the first processor group to process image data from the active area of the image sensor of the first camera to modify at least part of the image data from the active area of the image sensor of the first camera based on the one or more parameters being stored on the memory;
   a display memory to store processed image data from active areas of the at least first and second cameras; and
   a display to display the processed image data from active areas of the at least first and second cameras as a panoramic image.

2. The camera system of claim 1, further comprising a second processor group of one or more processing units to process image data from image sensor elements in an active area of the image sensor of the second camera, the active area of the image sensor in the second camera being smaller than a total area of image sensor elements of the image sensor in the second camera, the active area the active area of the image sensor in the second camera being determined by one or more parameters stored on a memory.

3. The camera system of claim 1, wherein a processing unit is selected from the group consisting of a single processor, a core of a processor, a graphics processing unit (GPU) or a Field Programmable Gate Array (FPGA).

4. The camera system of claim 1, wherein a modification of at least part of the image data from the active area of the image sensor of the first camera includes a modification of an intensity of image data.

5. The camera system of claim 1, wherein a modification of at least part of the image data from the active area of the image sensor of the first camera includes a warping of image data.

6. The camera system of claim 1, wherein a modification of at least part of the image data from the active area of the image sensor of the first camera includes a correction of an identified distortion.

7. The camera system of claim 1, further comprising 3 or more cameras, each camera including a lens and an image sensor.

8. The camera system of claim 1, wherein the panoramic image is part of a video image with an frame rate of at least 12 frames per second.

9. The camera system of claim 1, wherein the image sensor of the first camera is a curved image sensor.

10. The camera system of claim 1, wherein the first and the second camera are fixedly held in a calibrated body.

11. The camera system of claim 1, wherein the one or more parameters are determined during a calibration.

12. The camera system of claim 11, further comprising:
 a processor executing instructions of image stitching to determine a stitchline; and
 the processor executing instructions that map the stitchline in an image to a mergeline on the active area of the image sensor of the first camera.

13. The camera system of claim 1, wherein the camera system is part of a smartphone.

14. A method for image processing, comprising:
 reading image data from image sensor elements in an active area of an image sensor of a first camera being part of a camera system in a body with at least the first and a second camera, each camera having at least an image sensor and a lens, the active area of the image sensor in the first camera being smaller than a total area of image sensor elements of the image sensor in the first camera, one or more parameters determining the active area of the image sensor in the first camera being stored on a memory;
 storing instructions on an instruction memory for a first processor group of one or more processing units to process image data from the active area of the image sensor of only the first camera to modify at least part of the image data from the active area of the image sensor of the first camera based on the one or more parameters determining the active area of the image sensor in the first camera;
 displaying on a display the processed image data from active areas of the at least first and second cameras as a panoramic image in a video.

15. The method of claim 14, wherein a modification of at least part of the image data from the active area of the image sensor of the first camera includes a modification of an intensity of image data.

16. The method of claim 14, wherein a modification of at least part of the image data from the active area of the image sensor of the first camera includes a warping of image data.

17. The method of claim 14, wherein a modification of at least part of the image data from the active area of the image sensor of the first camera includes a correction of an identified distortion.

18. The method of claim 14, further comprising 3 or more cameras, each camera including a lens and an image sensor.

19. The method of claim 14, wherein the image sensor of the first camera is a curved image sensor.

20. The camera system of claim 14, wherein the first and the second camera are fixedly held in a calibrated body.

* * * * *